(12) United States Patent
Ji et al.

(10) Patent No.: US 12,521,356 B2
(45) Date of Patent: Jan. 13, 2026

(54) COMPOSITIONS AND METHODS FOR TREATING PAIN, INFLAMMATION, INFECTION, MALARIA, AND SEPSIS

(71) Applicant: Duke University, Durham, NC (US)

(72) Inventors: Ru-Rong Ji, Durham, NC (US); Sangsu Bang, Durham, NC (US); Zhen-Zhong Xu, Durham, NC (US)

(73) Assignee: Duke University, Durham, NC (US)

( * ) Notice: Subject to any disclaimer, the term of this patent is extended or adjusted under 35 U.S.C. 154(b) by 707 days.

(21) Appl. No.: 15/734,543

(22) PCT Filed: Jun. 4, 2019

(86) PCT No.: PCT/US2019/035432
§ 371 (c)(1),
(2) Date: Dec. 2, 2020

(87) PCT Pub. No.: WO2019/236607
PCT Pub. Date: Dec. 12, 2019

(65) Prior Publication Data
US 2021/0228499 A1   Jul. 29, 2021

Related U.S. Application Data

(60) Provisional application No. 62/698,229, filed on Jul. 15, 2018, provisional application No. 62/680,133, filed on Jun. 4, 2018.

(51) Int. Cl.
| | |
|---|---|
| *A61K 31/05* | (2006.01) |
| *A61K 31/202* | (2006.01) |
| *A61K 31/352* | (2006.01) |
| *A61K 31/357* | (2006.01) |
| *A61K 38/18* | (2006.01) |
| *A61P 29/00* | (2006.01) |
| *C07K 14/475* | (2006.01) |
| *C07K 14/72* | (2006.01) |

(52) U.S. Cl.
CPC ............ *A61K 31/05* (2013.01); *A61K 31/202* (2013.01); *A61K 31/352* (2013.01); *A61K 31/357* (2013.01); *A61K 38/18* (2013.01); *A61P 29/00* (2018.01); *C07K 14/475* (2013.01); *C07K 14/723* (2013.01); *Y02A 50/30* (2018.01)

(58) Field of Classification Search
CPC .... A61K 31/357; A61K 31/202; A61K 31/05; A61K 31/352; A61K 38/18; Y02A 50/30; C07K 14/475; C07K 14/723
See application file for complete search history.

(56) References Cited

U.S. PATENT DOCUMENTS

| | | | |
|---|---|---|---|
| 4,554,101 A | 11/1985 | Hopp | |
| 5,580,859 A | 12/1996 | Felgner et al. | |
| 5,679,647 A | 10/1997 | Carson et al. | |
| 5,703,055 A | 12/1997 | Felgner et al. | |
| 8,440,627 B2 | 5/2013 | Kuliopulos et al. | |
| 2013/0150446 A1* | 6/2013 | Serhan | A61K 31/202 554/219 |
| 2017/0354674 A1 | 12/2017 | Eliaz | |

FOREIGN PATENT DOCUMENTS

| | | |
|---|---|---|
| WO | WO2004013637 A1 | 2/2004 |
| WO | 2006/128169 A2 | 11/2006 |
| WO | WO2017041094 A1 | 3/2017 |
| WO | WO2017153982 A1 | 9/2017 |

OTHER PUBLICATIONS

Galego-Delgado et al. "A Surprising role for uric acid: The inflammatory malaria response," Curr Rheumatol Rep. 2014, vol. 16, No. 2, 401, doi: 10.1007/s11926-013-0401-8. (Year: 2014).*
Jiang et al. "Artesunate attenuated progression of atherosclerosis lesion formation alone or combined with rosuvastatin through inhibition of pro-inflammatory cytokines and pro-inflammatory chemokines." Phytomedicine, 2016, vol. 23, pp. 1259-1266 (Year: 2016).*
World Health Organization "Artesunate 50mg tablet package leaflet," 2013, http://apps.who.int/prequal/WHOPAR/WHOPARPRODUCTS/MA044part3v1.pdf (Year: 2013).*
Zhang et. al., 2022, Inflammation and Infection in Pain and the Role of GPR37, Int. J. Mol. Sci., 23, 1-13 (Year: 2022).*
Smith, 2015, Drug Discovery Opportunities at the Endothelin B Receptor-Related Orphan G Protein-Coupled Receptors, GPR37 and GPR37L1, Frontiers in Pharmacology, 6, 1-13 (Year: 2015).*
Park et. al., 2011, Resolving TRPV1- and TNF-α-Mediated Spinal Cord Synaptic Plasticity and Inflammatory Pain with Neuroprotectin D1, J. Neurosci., 31, 15072-15085 (Year: 2011).*
Jain, (2008). Drug Delivery Systems—An Overview. In K.J. Jain & J. M. Walker (Eds.), Drug Delivery Systems, 1-50 (Year: 2008).*
Aderem et al., "Mechanisms of phagocytosis in macrophages", Annual Review of Immunology, 1999, vol. 17, pp. 593-623.
Arita et al., "Resolvin E1 selectively interacts with leukotriene B4 receptor BLT1 and ChemR23 to regulate inflammation", JImmunol., 2007, vol. 178, No. 6, pp. 3912-3917.
Bang et al., "GPR37 regulates macrophage phagocytosis and resolution of inflammatory pain", The Journal of Clinical Investigation, vol. 128, No. 8, 2018, pp. 3568-3582.
Bang et al., "Activation of GPR37 in macrophages confers protection against infection-induced sepsis and pain-like behaviour in mice", Nature Communications, 2021, vol. 12, No. 1704, pp. 1-17.
Beceiro et al., "TRPM2 ion channels regulate macrophage polarization and gastric inflammation during Helicobacter pylori infection", Mucosal Immunol., 2017, vol. 10, No. 2, pp. 493-507.

(Continued)

*Primary Examiner* — Juliet C Switzer
*Assistant Examiner* — Dawanna Shar-Day White
(74) *Attorney, Agent, or Firm* — Michael Best & Friedrich LLP

(57) ABSTRACT

Disclosed herein are methods and compositions for treating a disease or disorder in a subject in need thereof. The methods may include administering to the subject a therapeutically effective amount of a GPR37 agonist. The disease or disorder may be selected from inflammation, inflammatory pain, chronic pain, viral infection, bacterial infection, malaria, sepsis, or a combination thereof.

11 Claims, 51 Drawing Sheets
Specification includes a Sequence Listing.

(56) References Cited

OTHER PUBLICATIONS

Berta et al. "Extracellular caspase-6 drives murine inflammatory pain via microglial TNF-alpha secretion", J. Clin. Invest., 2014, vol. 124, No. 3, pp. 1173-1186.
Binshtok et al., "Nociceptors are interleukin-1beta sensors", JNeurosci., 2008, vol. 28, No. 52, pp. 14062-14073.
Chen et al., "Beta-arrestin-2 regulates NMDA receptor function in spinal lamina II neurons and duration of persistent pain", Nat Commun., 2016, vol. 7, pp. 1-12.
Chen et al., "PD-L1 inhibits acute and chronic pain by suppressing nociceptive neuron activity via PD-1", Nat Neurosci, 2017, vol. 20, No. 7, pp. 917-926.
Chiang et al., "Infection regulates pro-resolving mediators that lower antibiotic requirements", Nature, 2012, vol. 484, No. 7395, pp. 524-528.
Chiu et al., "Bacteria activate sensory neurons that modulate pain and inflammation", Nature., 2013, vol. 501, No. 7465, pp. 52-57.
Chiu et al., "Neurogenic inflammation and the peripheral nervous system in host defense and immunopathology", NatNeurosci., 2012, vol. 15, No. 8, pp. 1063-1067.
Donnelly et al., "DNA Vaccines", Annu. Rev. Immunol., vol. 15, 1997, pp. 617-648.
Dowler et al., "Protein Lipid overlay assay", Sci STKE, 2002, vol. 2002, No. 129, p. 1-11.
El Kebir et al., "Resolvin E1 promotes phagocytosis-induced neutrophil apoptosis and accelerates resolution of pulmonary inflammation", PNAS, 2012, vol. 109, No. 37, pp. 14983-8.
Fiala et al., "Ineffective phagocytosis of amyloid-beta by macrophages of Alzheimer's disease patients", Journal of Alzheimer's disease, 2005, vol. 7, No. 3, pp. 221-232; discussion 55-62.
Fujita-Jimbo et al., "Mutation in Parkinson disease-associated, G-protein-coupled receptor 37 (GPR37/PaeIR) is related to autism spectrum disorder", PloS one, 2012, vol. 7, No. 12, e51155.
Fullerton et al., "Resolution of inflammation: a new therapeutic frontier", Nature Reviews Drug Discovery, 2016, vol. 15, No. 8, pp. 551-567.
Gantner et al., "Collaborative induction of inflammatory responses by dectin-1 and Toll-like receptor 2", The Journal of Experimental Medicine, 2003, vol. 197, No. 9, pp. 1107-1117.
Ghasemlou et al., "CD11b+Ly6G-myeloid cells mediate mechanical inflammatory pain hypersensitivity", PNAS, 2015, vol. 112, No. 49, pp. E6808-17.
Gilroy et al., "Inducible cyclooxygenase may have anti-inflammatory properties", NatMed., 1999, vol. 5, No. 6, pp. 698-701.
Hargreaves et al., "A new and sensitive method for measuring thermal nociception in cutaneous hyperalgesia", Pain, 1988, vol. 32, No. 1, pp. 77-88.
Heagerty et al., "Time-Dependent ROC Curves for Censored Survival Data and a Diagnostic Marker", Biometrics, vol. 56, 2000, pp. 337-344.
Hong et al., "Neuroprotectin/protectin D1: endogenous biosynthesis and actions on diabetic macrophages in promoting wound healing and innervation impaired by diabetes", Am. J. Physiol. Cell Physiol., vol. 307, 2014, pp. 1058-1067.
Huang et al., "Canonical and noncanonical g-protein signaling helps coordinate actin dynamics to promote macrophage phagocytosis of zymosan", Mol Cell Biol., 2014, vol. 34, No. 22, pp. 4186-4199.
International Preliminary Report on Patentability for Application No. PCT/US2019/035432 dated Dec. 8, 2020 (6 pages).
International Search Report and Written Opinion for Application No. PCT/US2019/035432 dated Nov. 5, 2019 (10 pages).
Ji et al., "Emerging targets in neuroinflammation-driven chronic pain", NatRevDrug Discov., 2014, vol. 13, No. 7, pp. 533-548.
Ji et al., "Pain regulation by non-neuronal cells and inflammation", Science. 2016, vol. 354, No. 6312, pp. 572-577.
Jolivalt et al., "Therapeutic efficacy of prosaposin-derived peptide on different models of allodynia", Pain, 2006, vol. 121, No. 1-2, pp. 14-21.

Krishnamoorthy et al., "Resolvin D1 binds human phagocytes with evidence for proresolving receptors", PNAS, 2010, vol. 107, No. 4, pp. 1660-1665.
Krukowski et al., "CD8+ T Cells and Endogenous IL-10 Are Required for Resolution of Chemotherapy-Induced Neuropathic Pain", J Neurosci., 2016, vol. 36, No. 43, pp. 11074-83.
Kyte et al., "A Simple Method for Displaying the Hydropathic Character of a Protein", J. Mol. Biol., vol. 157, 1982, pp. 105-132.
Leng et al., "Molecular cloning and characterization of two putative G protein-coupled receptors which are highly expressed in the central nervous system", Brain Res Mol Brain Res., 1999, vol. 69, No. 1, pp. 73-83.
Link et al., "TRPV2 has a pivotal role in macrophage particle binding and phagocytosis", Nature Immunology, 2010, vol. 11, No. 3, pp. 232-239.
Liu et al., "Nociceptive neurons regulate nnate and adaptive immunity and neuropathic pain through MyD88 adapter", Cell Res., 2014, vol. 24, No. 11, pp. 1374-1377.
Liu et al., "TLR3 deficiency impairs spinal cord synaptic transmission, central sensitization, and pruritus in mice", J. Clin. Invest., 2012, vol. 122, No. 6, pp. 2195-2207.
Malmberg et al., "Hyperalgesia mediated by spinal glutamate or substance P receptor blocked by spinal cyclooxygenase inhibition", Science, 1992, vol. 257, No. 5074, pp. 1276-1279.
Marazziti et al., "Cloning of GPR37, a gene located on chromosome 7 encoding a putative G-protein-coupled peptide receptor, from a human frontal brain EST library", Genomics, 1997, vol. 45, No. 1, pp. 68-77.
Marazziti et al., "GPR37 associates with the dopamine transporter to modulate dopamine uptake and behavioral responses to dopaminergic drugs", PNAS, 2007, vol. 104, No. 23, pp. 9846-9851.
McKelvey et al., "Neuropathic pain is constitutively suppressed in early life by anti-inflammatory neuroimmune regulation", J Neurosci., 2015, vol. 35, No. 2, pp. 457-466.
Meller et al., "Intraplantar zymosan as a reliable, quantifiable model of thermal and mechanical hyperalgesia in the rat", European Journal of Pain, 1997, vol. 1, No. 1, pp. 43-52.
Meyer et al., "GPR37 and GPR37L1 are receptors for the neuroprotective and glioprotective factors prosaptide and prosaposin", PNAS, 2013, vol. 110, No. 23, pp. 9529-9534.
Meyer et al., "The protective role of prosaposin and its receptors in the nervous system", Brain Research, 2014, vol. 1585, pp. 1-12.
Mosser et al., "Exploring the full spectrum of macrophage activation", NatRevImmunol. 2008, vol. 8, No. 12, pp. 958-969.
Murakami et al., "Pael-R is accumulated in Lewy bodies of Parkinson's disease", Annals of Neurology, 2004, vol. 55, No. 3, pp. 439-442.
Murray et al., "Protective and pathogenic functions of macrophage subsets", Nature Reviews Immunology, 2011, vol. 11, No. 11, pp. 723-737.
Ohira et al., "Resolvin E1 receptor activation signals phosphorylation and phagocytosis", The Journal of Biological Chemistry, 2010, vol. 285, No. 5, pp. 3451-3461.
Park et al., "Resolving TRPV1- and TNF-a-mediated spinal cord synaptic plasticity and inflammatory pain with neuroprotectin D1", J Neurosci., 2011, vol. 31, No. 42, pp. 15072-15085.
Perretti et al., "Immune resolution mechanisms in inflammatory arthritis", Nat Rev Rheumatol., 2017, vol. 13, No. 2, pp. 87-99.
Perretti et al., "Resolution Pharmacology: Opportunities for Therapeutic Innovation in Inflammation", Trends Pharmacol Sci., 2015, vol. 36, No. 11, pp. 737-755.
SafeGeneric Pharmacy, Artesunate, <https://www.safegenericpharmacy.com/artesunate-tablets>, accessed 2018, 4 pages.
Samad et al., "Interleukin-1beta-mediated induction of Cox-2 in the CNS contributes to inflammatory pain hypersensitivity", Nature, 2001, vol. 410, No. 6827, pp. 471-475.
Schwab et al., "Resolvin E1 and protectin D1 activate inflammation-resolution programmes", Nature, 2007, vol. 447, No. 7146, pp. 869-874.
Serhan et al., "Resolving inflammation: dual anti-inflammatory and pro-resolution lipid mediators", NatRevImmunol., 2008, vol. 8, No. 5, pp. 349-361.

(56) References Cited

OTHER PUBLICATIONS

Serhan, "Resolution phase of inflammation: novel endogenous anti-inflammatory and proresolving lipid mediators and pathways", AnnuRevImmunol., 2007, vol. 25, pp. 101-137.

Sommer et al., "Fighting off pain with resolvins", NatMed., 2010, vol. 16, No. 5, pp. 518-520.

Sommer et al., "Recent findings on how proinflammatory cytokines cause pain: peripheral mechanisms in inflammatory and neuropathic hyperalgesia", NeurosciLett., 2004, vol. 361, No. 1-3, pp. 184-187.

Van Rooijen et al., "Liposome mediated depletion of macrophages: mechanism of action, preparation of liposomes and applications", Journal of Immunological Methods, 1994, vol. 174, No. 1-2, pp. 83-93.

Xu et al., "Neuroprotectin/Protectin D1 protects neuropathic pain in mice after nerve trauma", AnnNeurol., 2013, vol. 74, No. 3, pp. 490-495.

Xu et al., "Resolvins RvE1 and RvD1 attenuate inflammatory pain via central and peripheral actions", NatMed., 2010, vol. 16, No. 5, pp. 592-597.

Yang et al., "G protein-coupled receptor 37 is a negative regulator of oligodendrocyte differentiation and myelination", Nat Commun., 2016, vol. 7, No. 10884, pp. 1-11.

Zou et al., "A differential role of macrophage TRPM2 channels in Ca(2)(+) signaling and cell death in early responses to H(2)O(2)", Am J Physiol Cell Physiol., 2013, vol. 305, No. 1, pp. C61-9.

Thomas et al., "Therapeutic biology of Jatropha curcas: a mini review," Curr Pharm Biotechnol, 2008, 9(4): 315-324.

Lakhotia et al., "Retinal Hemorrhages in Severe Non-cerebral Plasmodium vivax Malaria in an Adult," Journal of Clinical and Diagnostic Research, 2015, 9(6): OD1-OD3.

Li et al., "Apigenin Alleviates Endotoxin-Induced Myocardial Toxicity by Modulating Inflammation, Oxidative Stress, and Autophagy," Oxid Med Cell Longev, 2017, Article ID 2302896, 10 pages.

Rajasagi et al., "Neuroprotectin D1 reduces the severity of herpes simplex virus-induced corneal immunopathology," Invest Ophthalmol Vis Sci, 2013, 54(9): 6269-6279.

Zhang et al., "Apigenin attenuates heart injury in lipopolysaccharide-induced endotoxemic model by suppressing sphingosine kinase 1/sphingosine 1-phosphate signaling pathway," Chemico-Biological Interactions, 2015, 233: 46-55.

Cardenas et al., "Dietary Apigenin Exerts Immune-Regulatory Activity in Vivo by Reducing NF-κB Activity, Halting Leukocyte Infiltration and Restoring Normal Metabolic Function," Int Mol Sci, 2016, 17(3): 323.

"Starks et al., ""Antibacterial activity of Taxodium ascendens Diterpenes against Methicillin-resistant *Staphyloccocus aureus*,"" Natural Product Communications, 2014, 9(8): 1129-1130."

European Patent Office Extended Search Report for Application No. 19814277.0 dated Feb. 17, 2022 (10 pages).

\* cited by examiner

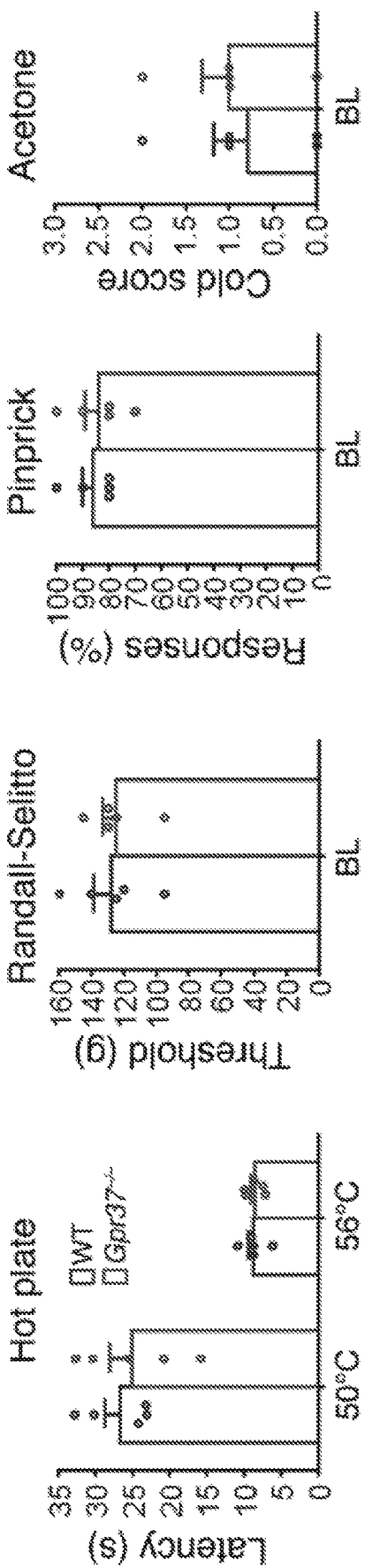
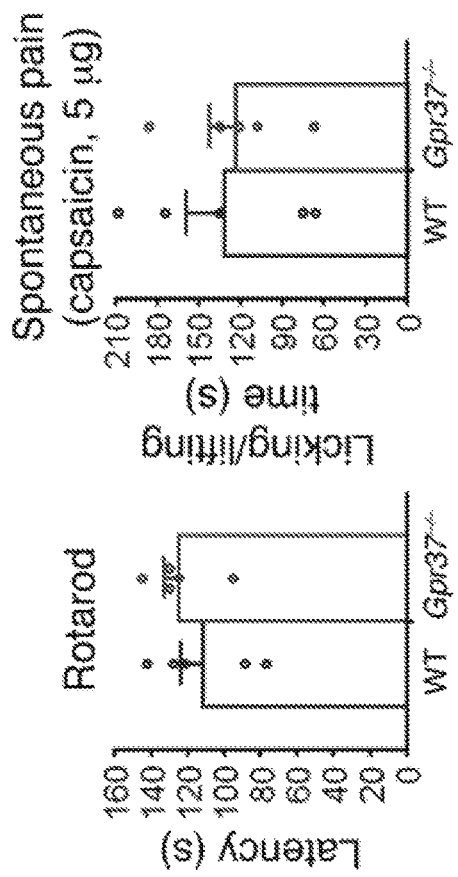
FIG. 6D
FIG. 6E
FIG. 6F

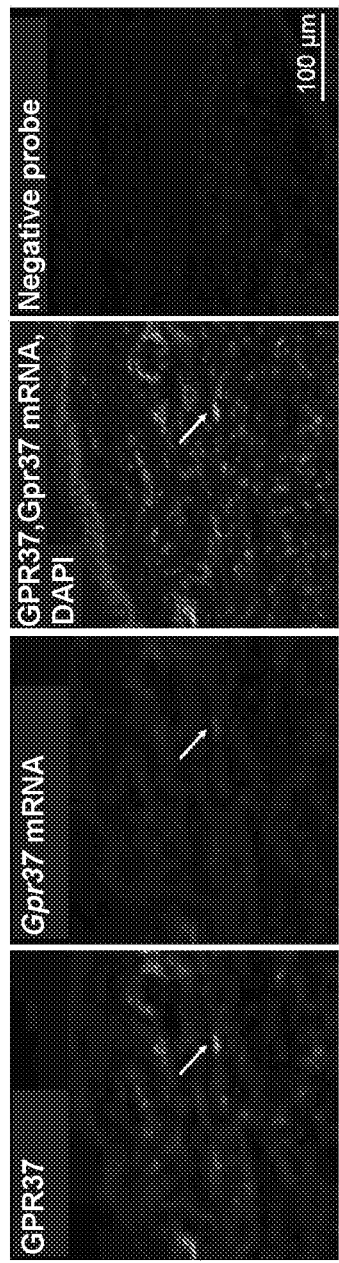
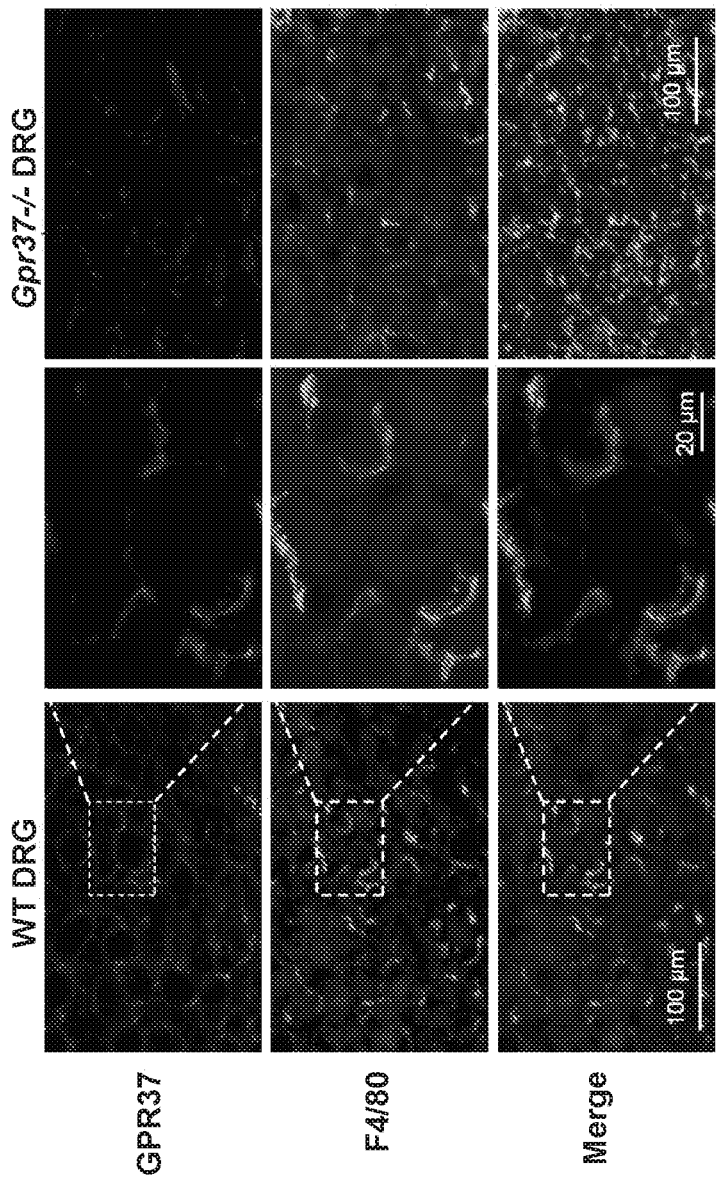
FIG. 9A
FIG. 9B

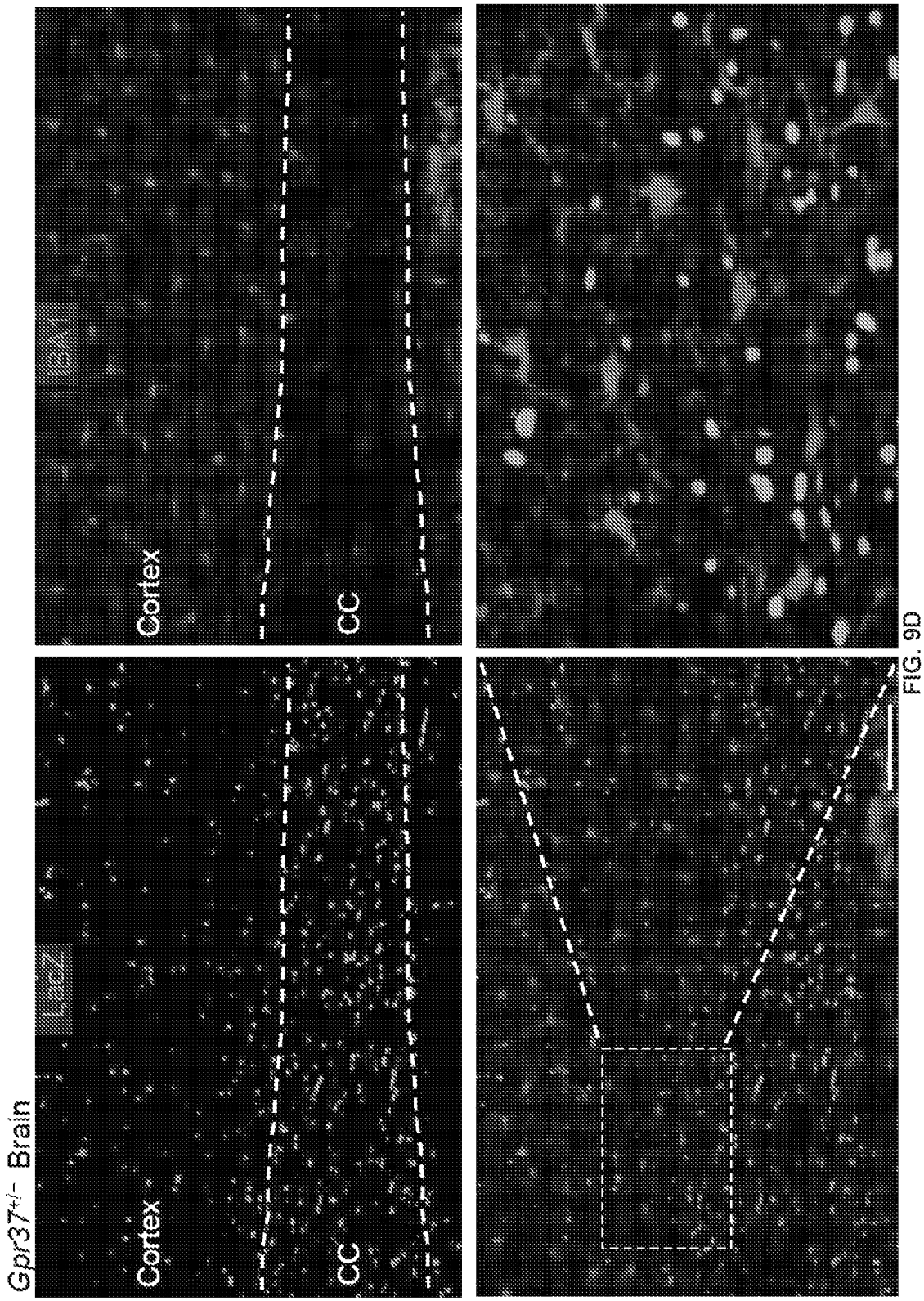

SEQUENCE LISTING

<160> NUMBER OF SEQ ID NOS: 13

<210> SEQ ID NO 1
<211> LENGTH: 613

-continued

```
<212> TYPE: PRT
<213> ORGANISM: Homo sapiens

<400> SEQUENCE: 1

Met Arg Ala Pro Gly Ala Leu Ala Arg Met Ser Arg Leu Leu Leu
1               5                   10                  15

Leu Leu Leu Leu Lys Val Ser Ala Ser Ala Leu Gly Val Ala Pro
                20                  25                  30

Ala Ser Arg Asn Glu Thr Cys Leu Gly Glu Ser Cys Ala Pro Thr Val
            35                  40                  45

Ile Gln Arg Arg Gly Arg Asp Ala Trp Gly Pro Gly Asn Ser Ala Arg
    50                  55                  60

Asp Val Leu Arg Ala Arg Ala Pro Arg Glu Glu Gln Gly Ala Ala Phe
65                  70                  75                  80

Leu Ala Gly Pro Ser Trp Asp Leu Pro Ala Ala Pro Gly Arg Asp Pro
                85                  90                  95

Ala Ala Gly Arg Gly Ala Glu Ala Ser Ala Ala Gly Pro Pro Gly Pro
            100                 105                 110

Pro Thr Arg Pro Pro Gly Pro Trp Arg Trp Lys Gly Ala Arg Gly Gln
        115                 120                 125

Glu Pro Ser Glu Thr Leu Gly Arg Gly Asn Pro Thr Ala Leu Gln Leu
    130                 135                 140

Phe Leu Gln Ile Ser Glu Glu Glu Lys Gly Pro Arg Gly Ala Gly
145                 150                 155                 160

Ile Ser Gly Arg Ser Gln Glu Gln Ser Val Lys Thr Val Pro Gly Ala
                165                 170                 175

Ser Asp Leu Phe Tyr Trp Pro Arg Arg Ala Gly Lys Leu Gln Gly Ser
            180                 185                 190

His His Lys Pro Leu Ser Lys Thr Ala Asn Gly Leu Ala Gly His Glu
        195                 200                 205

Gly Trp Thr Ile Ala Leu Pro Gly Arg Ala Leu Ala Gln Asn Gly Ser
    210                 215                 220

Leu Gly Glu Gly Ile His Glu Pro Gly Gly Pro Arg Arg Gly Asn Ser
225                 230                 235                 240

Thr Asn Arg Arg Val Arg Leu Lys Asn Pro Phe Tyr Pro Leu Thr Gln
                245                 250                 255

Glu Ser Tyr Gly Ala Tyr Ala Val Met Cys Leu Ser Val Ile Phe
            260                 265                 270

Gly Thr Gly Ile Ile Gly Asn Leu Ala Val Met Cys Ile Val Cys His
        275                 280                 285

Asn Tyr Tyr Met Arg Ser Ile Ser Asn Ser Leu Leu Ala Asn Leu Ala
    290                 295                 300

Phe Trp Asp Phe Leu Ile Ile Phe Phe Cys Leu Pro Leu Val Ile Phe
305                 310                 315                 320

His Glu Leu Thr Lys Lys Trp Leu Leu Glu Asp Phe Ser Cys Lys Ile
                325                 330                 335

Val Pro Tyr Ile Glu Val Ala Ser Leu Gly Val Thr Phe Thr Leu
            340                 345                 350

Cys Ala Leu Cys Ile Asp Arg Phe Arg Ala Ala Thr Asn Val Gln Met
        355                 360                 365

Tyr Tyr Glu Met Ile Glu Asn Cys Ser Ser Thr Thr Ala Lys Leu Ala
    370                 375                 380

Val Ile Trp Val Gly Ala Leu Leu Leu Ala Leu Pro Glu Val Val Leu
385                 390                 395                 400
```

```
Arg Gln Leu Ser Lys Glu Asp Leu Gly Phe Ser Gly Arg Ala Pro Ala
            405                 410                 415
Glu Arg Cys Ile Ile Lys Ile Ser Pro Asp Leu Pro Asp Thr Ile Tyr
            420                 425                 430
Val Leu Ala Leu Thr Tyr Asp Ser Ala Arg Leu Trp Trp Tyr Phe Gly
            435                 440                 445
Cys Tyr Phe Cys Leu Pro Thr Leu Phe Thr Ile Thr Cys Ser Leu Val
            450                 455                 460
Thr Ala Arg Lys Ile Arg Lys Ala Glu Lys Ala Cys Thr Arg Gly Asn
465                 470                 475                 480
Lys Arg Gln Ile Gln Leu Glu Ser Gln Met Asn Cys Thr Val Val Ala
            485                 490                 495
Leu Thr Ile Leu Tyr Gly Phe Cys Ile Ile Pro Glu Asn Ile Cys Asn
            500                 505                 510
Ile Val Thr Ala Tyr Met Ala Thr Gly Val Ser Gln Gln Thr Met Asp
            515                 520                 525
Leu Leu Asn Ile Ile Ser Gln Phe Leu Leu Phe Phe Lys Ser Cys Val
            530                 535                 540
Thr Pro Val Leu Leu Phe Cys Leu Cys Lys Pro Phe Ser Arg Ala Phe
545                 550                 555                 560
Met Glu Cys Cys Cys Cys Cys Cys Glu Glu Cys Ile Gln Lys Ser Ser
            565                 570                 575
Thr Val Thr Ser Asp Asp Asn Asp Asn Glu Tyr Thr Thr Glu Leu Glu
            580                 585                 590
Leu Ser Pro Phe Ser Thr Ile Arg Arg Glu Met Ser Thr Phe Ala Ser
            595                 600                 605
Val Gly Thr His Cys
    610

<210> SEQ ID NO 2
<211> LENGTH: 5614
<212> TYPE: DNA
<213> ORGANISM: Homo sapiens

<400> SEQUENCE: 2
ggctccgcgc ctccgccctt gttccctccc agctcctccg agtggaagcc gctacaaatg     60
gcttgaatga aacgtgtgtg ggtttagtga gtggtgaacc accaggggat cccgtctccc    120
cacaaaccag tatctctccg aggaggaggc gaaggagtgg gaggaggcaa cgagccgaga    180
gtcgagcttc gcgggcgcgc gcagcggctg gagcgcgggg gcgaggccgg gccacctccc    240
cttcccggcc gcgcactgcc tggcccgcgg cggttccagg caccacccct cccgtccggg    300
ctgagcccgc tgtggcagtg actagctccc gcggctagcg gcactgtcca cgacgagcg    360 gcgccctctt ctcccccttc tccccacgat ttccttctct gcggcggcac gccgtccagc    420
agcctgcttc gccccgtcgt caactttgag ctggaggaga agcaactttg gcagtggccg    480
cggggttgga atcccgcttc tcctcggcag cagtaggctc gcaagtcgct ggggttaggt    540
ggggcaagag tttcgccggc gcatcagcgc tgcttcggac tgtttgcaac gtgtttccag    600
cgagctggga gcggggttgt gactgcgagt cgtctggggg aggggacttt gttttctttt    660
tcctctagag acctcggctt gcaactggat caaacgctgt cgaaaggatg taaataggca    720
gagcaactgt taccaagaag gccaccaccc ccacccaaag gcagtgagga gtgtggggct    780
tcgtctgggc tccccgagt ctcaacagta atcaacagtc aggtgttgat tgcaactttt    840
```

```
caaggtcagc caccgggagt agcctattcc ctctaggaac cttggagggc ataccttgct    900
gggactcaac ttggctgaga aatgcacaag atgccaaagg aggaaggatt ataggggggcg   960
tgtgtgtgac ccccaagacc gatcttccgc tatcaccta atctccggtt ccccgctacc   1020
cgggcggggg tgagtatgtg acatgtgcct aactctcagc agcaacttcg gcagcaggtg  1080
tcgatcctaa ctaagcagga gctgcggctg ccgggtgtgc cctcaccaag ccatgcgagc  1140
cccgggcgcg cttctcgccc gcatgtcgcg gctactgctt ctgctactgc tcaaggtgtc  1200
tgcctcttct gccctcgggg tcgcccctgc gtccagaaac gaaacttgtc tgggggagag  1260
ctgtgcacct acagtgatcc agcgccgcgg cagggacgcc tggggaccgg gaaattctgc  1320
aagagacgtt ctgcgagccc gagcacccag ggaggagcag gggcagcgt ttcttgcggg   1380
accctcctgg gacctgccgg cggccccggg ccgtgacccg gctgcaggca gaggggcgga  1440
ggcgtcggca gccggacccc cgggacctcc aaccaggcca cctggcccct ggaggtggaa  1500
aggtgctcgg ggtcaggagc cttctgaaac tttggggaga gggaacccca cggccctcca  1560
gctcttcctt cagatctcag aggaggaaga gaagggtccc agaggcgctg gcatttccgg  1620
gcgtagccag gagcagagtg tgaagacagt ccccggagcc agcgatcttt tttactggcc  1680
aaggagagcc gggaaactcc agggttccca ccacaagccc ctgtccaaga cggccaatgg  1740
actggcgggg cacgaagggt ggacaattgc actcccgggc cgggcgctgg cccagaatgg  1800
atccttgggt gaaggaatcc atgagcctgg gggtccccgc cggggaaaca gcacgaaccg  1860
gcgtgtgaga ctgaagaacc ccttctaccc gctgacccag gagtcctatg agcctacgc   1920
ggtcatgtgt ctgtccgtgg tgatcttcgg gaccggcatc attggcaacc tggcggtgat  1980
gtgcatcgtg tgccacaact actacatgcg gagcatctcc aactccctct ggccaacct   2040
ggccttctgg gactttctca tcatcttctt ctgccttccg ctggtcatct ccacgagct   2100
gaccaagaag tggctgctgg aggacttctc ctgcaagatc gtgccctata tagaggtcgc  2160
ttctctgggga gtcaccactt tcaccttatg tgctctgtgc atagaccgct ccgtgctgc   2220
caccaacgta cagatgtact acgaaatgat cgaaaactgt cctcaacaa ctgccaaact   2280
tgctgttata tgggtgggag ctctattgtt agcacttcca gaagttgttc tccgccagct  2340
gagcaaggag gatttggggt ttagtggccg agctccggca gaaaggtgca ttattaagat  2400
ctctcctgat ttaccagaca ccatctatgt tctagccctc acctacgaca gtgcgagact  2460
gtggtggtat tttggctgtt acttttgttt gcccacgctt ttcaccatca cctgctctct  2520
agtgactgcg aggaaaatcc gcaaagcaga gaaagcctgt acccgaggga ataaacggca  2580
gattcaacta gagagtcaga tgaactgtac agtagtggca ctgaccattt tatatggatt  2640
ttgcattatt cctgaaaata tctgcaacat tgttactgcc tacatggcta caggggttc   2700
acagcagaca atggacctcc ttaatatcat cagccagttc ctttttgttct ttaagtcctg  2760
tgtcacccca gtcctccttt tctgtctctg caaaccttc agtcgggcct tcatggagtg   2820
ctgctgctgt tgctgtgagg aatgcattca gaagtcttca acggtgacca gtgatgacaa  2880
tgacaacgag tacaccacgg aactcgaact ctcgcctttc agtaccatac gccgtgaaat   2940
gtccactttt gcttctgtcg gaactcattg ctgaaggaca gtacttggtt gggtcagatt  3000
tatttgtttg atttttcatat cccgtgaaag ttttttaattc atattttttcc ttatagggaa  3060
aaatgcaaaa aagaaacaat aaagaaagaa atattaacta ctgtagaact gatttttacaa  3120
attaatattt gtgctttgaa aaaaagtttc tattagtta tttaagaaga atgagaaggc   3180
caatagtttt agattattttt atctggtatg gtgctaatat tttatttgaa aaaagttact  3240
```

```
gcaacttaac ttaaaattgc taacgttttt tcttcttta aaaatacaat tattgtatat    3300
tgattatagc aatgtgattt tgtaggttat tttatatttg agttgtgatt gaaagtatgt    3360
tgtatatggt attgtgagat gatttgtact tggaagcatt cacaaagtag caccaaataa    3420
attacacttt attctttaat gtcattgtca atctactttt aaccaatatt caataaatct    3480
tctaattgcc ttaaagatac aattactggt tctatgcaca atttaaaacc ggccttactg    3540
ttttataacg tattttcttt taaggcaggt aatcattatg ttataaagaa gttttctaa     3600 tagcagtatt ttatatgcat gattcataaa actatgttgt atgttaaaac aaagctgtat    3660
ttttaatatt caggtataga tgtcaaatta cttctgaata cttataaaat atgaataaat    3720
agcagagtag gaagaaagtt tcttttttaa aaaattcacc tctgaactag cacatagagc    3780
tacagatttt cccttgggga attatgggca gaatcaagaa ttttaaaatg cagttgtcat    3840
ctgatttcct ctgaacactg acctttgaag ctttgtgaat cctacgtaaa gcactctgag    3900
ttctaatttt tctccttttg aaaataaac ttgatgaaat ctatacaact taatttcttt     3960
aagtgcaatg aaagtatagg agtggaataa taaaatattt atatatttt attagaacat    4020 tctacccttta acttgatact tcataaactc tgaataaaaa aacctaacct cctccattgg    4080
gaatatttga atcccctctt ttgcctcttc tggagtttaa aatgcagcag ttgtgtagga    4140
tgcttgctgt gtgggacaca tgtctaactc aggtggcaga gaccatgacc tagtgacaca    4200
gtgatattta aaagctacca aagaagatgt gtagttggat gtctttgtct tcagaaaaat    4260
cttgttatag agaacccagt tttcttgctg ggaaaacgta gtttctgctt gttgatttct    4320
gttctactcg gcataagtaa gtcagtattc cttttttccaa attataacat gatgttattt    4380
aaaaatcatt aaagagattg gtgcaggtga aacttaaatg gcagtgccca ggctatctcc    4440
tttttcccag tccaatactt tcaaagggg ttttttccctc cattgtgtgt attctgtggg    4500
atctgcagga gaattcaaac aaggtgccct tgtcttcttg tagatccctg taataggtct    4560
ttggaaaatt tctcaagagg acacctgagc taggttttgg ctgctgagca aacagcaac    4620 tgtgattcca tagtgtctct cctgatattt agtcacttta taaatcaagg aacaattgag    4680
catgtcatgt ggaaaagatt ctatcctatt acctgagtaa ctaaaggtaa ataggtcaca    4740
gcctcagacc ttacagaatc aggcagggat gacatggatg ggaaggaata aaataaatac    4800
atagacaact atgatataag ctggggcttg ttaggtgcct caggaagatg tgaagttctg    4860
cgatactttg gaatagaggg aatgcttata gggttagaag agagcatgaa aggctttatg    4920
agataactgg atgagtgggc ttttagaagg agctgatgaa agatggtgtg aggagtggac    4980
acttcaggag gagagagcta atttataaag gaatagaaga agaaatcagt gggtgtgatt    5040
gaagaataaa cagcccagtt tgacttctgt gctacgtgtg catagcagcc ttgtgggaaa    5100
tattaaagaa aatatgcacc aaggccatct aataatagga ccatgttttg aaagatgttt    5160
acatggtggt gcttcaggaa atggggcttt gcttttaagg ttttttgagta tggagaaata    5220 gtatcccagc tctgcaatag gaagatcaac ttgcaaacag tttaaatagg ctggtagggg    5280
acagtctgat catgaaaaag caactaggaa gctattataa gagattgaac cacaatggag    5340
gcagcaggaa cttaaatttc ttttttcatt tatacttgcc tttcaacttt ttgtagttgc    5400
aacatgtact ttcttattga atcctacctc tgtcaaagtg gaaactttga taactcaaat    5460
tgtcccaagt ataagtgat ttcaaagttt tctcatagtc gtcttgtgtt tttcacaaaa     5520
accaatttct ataatatact tttaaaaaat tgttaatcat ttctgttcaa catttcttca    5580
```

```
gtctggatct tatccaatgt cttacgctcc tcgt                              5614
```

<210> SEQ ID NO 3
<211> LENGTH: 14
<212> TYPE: PRT
<213> ORGANISM: Homo sapiens

<400> SEQUENCE: 3

Thr Ala Leu Ile Asp Asn Asn Ala Thr Glu Glu Ile Leu Tyr
1               5                   10

<210> SEQ ID NO 4
<211> LENGTH: 21
<212> TYPE: DNA
<213> ORGANISM: Artificial Sequence
<220> FEATURE:
<223> OTHER INFORMATION: Artificial Sequence description: Forward PCR
      Primer

<400> SEQUENCE: 4

```
aggtcggtgt gaacggattt g                                              21
```

<210> SEQ ID NO 5
<211> LENGTH: 19
<212> TYPE: DNA
<213> ORGANISM: Artificial Sequence
<220> FEATURE:
<223> OTHER INFORMATION: Artificial Sequence description: Reverse PCR
      Primer

<400> SEQUENCE: 5

```
ggggtcgttg atggcaaca                                                 19
```

<210> SEQ ID NO 6
<211> LENGTH: 21
<212> TYPE: DNA
<213> ORGANISM: Artificial Sequence
<220> FEATURE:
<223> OTHER INFORMATION: Artificial Sequence description: Forward PCR
      Primer

<400> SEQUENCE: 6

```
ttgtggctgt ggagaagctg t                                              21
```

<210> SEQ ID NO 7
<211> LENGTH: 21
<212> TYPE: DNA
<213> ORGANISM: Artificial Sequence
<220> FEATURE:
<223> OTHER INFORMATION: Artificial Sequence description: Reverse PCR
      Primer

<400> SEQUENCE: 7

```
aacgtcacac accagcaggt t                                              21
```

<210> SEQ ID NO 8
<211> LENGTH: 20
<212> TYPE: DNA
<213> ORGANISM: Artificial Sequence
<220> FEATURE:
<223> OTHER INFORMATION: Artificial Sequence description: Forward PCR
      Primer

<400> SEQUENCE: 8

```
tggagcaaca tgtggaactc                                                20
```

```
<210> SEQ ID NO 9
<211> LENGTH: 18
<212> TYPE: DNA
<213> ORGANISM: Artificial Sequence
<220> FEATURE:
<223> OTHER INFORMATION: Artificial Sequence description:  Reverse PCR
      Primer

<400> SEQUENCE: 9
cagcagccgg ttaccaag                                                 18

<210> SEQ ID NO 10
<211> LENGTH: 21
<212> TYPE: DNA
<213> ORGANISM: Artificial Sequence
<220> FEATURE:
<223> OTHER INFORMATION: Artificial Sequence description:  Forward PCR
      Primer

<400> SEQUENCE: 10
tgtcaaattc attcatggcc t                                             21

<210> SEQ ID NO 11
<211> LENGTH: 20
<212> TYPE: DNA
<213> ORGANISM: Artificial Sequence
<220> FEATURE:
<223> OTHER INFORMATION: Artificial Sequence description:  Reverse PCR
      Primer

<400> SEQUENCE: 11
atcgatttct cccctgtgaa                                               20

<210> SEQ ID NO 12
<211> LENGTH: 20
<212> TYPE: DNA
<213> ORGANISM: Artificial Sequence
<220> FEATURE:
<223> OTHER INFORMATION: Artificial Sequence description:  Forward PCR
      Primer

<400> SEQUENCE: 12
gatctttggg accggcatta                                               20

<210> SEQ ID NO 13
<211> LENGTH: 22
<212> TYPE: DNA
<213> ORGANISM: Artificial Sequence
<220> FEATURE:
<223> OTHER INFORMATION: Artificial Sequence description:  Reverse PCR
      Primer

<400> SEQUENCE: 13
ggaggcagaa gaagatgatg ag                                            22
```

COMPOSITIONS AND METHODS FOR TREATING PAIN, INFLAMMATION, INFECTION, MALARIA, AND SEPSIS

CROSS-REFERENCE TO RELATED APPLICATIONS

This patent application is the U.S. national stage entry, under 35 U.S.C. § 371, of International Application Number PCT/US2019/035432, filed Jun. 4, 2019, which claims priority to U.S. Provisional Application No. 62/680,133, filed Jun. 4, 2018, and U.S. Provisional Application No. 62/698,229, filed Jul. 15, 2018, the entire contents of each of which are hereby incorporated by reference.

SEQUENCE LISTING

This instant application includes a Sequence Listing which has been submitted electronically in ASCII format and is hereby incorporated by reference in its entirety. Said ASCII copy created on Jul. 19, 2019, and is named "028193-9305-WO01_As_Filed_Sequence_Listing.txt" and is 15,495 bytes in size.

STATEMENT REGARDING FEDERALLY SPONSORED RESEARCH

This invention was made with government support under grants R01-DE17794 and R01-NS87988 awarded by the National Institutes of Health. The government has certain rights in the invention.

FIELD

This disclosure relates to agonists of GPR37 and methods of using the same for treating diseases and disorders such as inflammation, pain, infection, malaria, and/or sepsis.

INTRODUCTION

The function of inflammation is to eliminate the initial cause of cell injury, leading to tissue repair and a return to homeostasis. Resolution of acute inflammation is an active process, involving the production of specialized pro-resolving mediators (SPMs), such as resolvins and maresins, biosynthesized from omega-3 unsaturated fatty acids. SPMs potently suppress inflammatory pain at doses that are much lower than morphine. For example, protectin-D1 or neuroprotectin D1 (NPD1) is synthesized from docosahexaenoic acid (DHA) and induces potent inhibition of inflammation and inflammatory pain via its multiple actions on neurons, immune cells, and glial cells. SPMs activate G-protein coupled receptors (GPCR) to meditate their anti-inflammation and pro-resolution actions, but the receptors for NPD1 are still unknown.

SUMMARY

In an aspect, the disclosure relates to methods of treating a disease or disorder in a subject in need thereof. The method may include administering to the subject a therapeutically effective amount of a GPR37 agonist, wherein the disease or disorder is selected from inflammation, inflammatory pain, chronic pain, viral infection, bacterial infection, malaria, sepsis, or a combination thereof. In some embodiments, the phagocytosis of macrophages is increased.

In a further aspect, the disclosure relates to methods of reducing the duration of inflammation in a subject in need thereof. The method may include administering to the subject a therapeutically effective amount of a GPR37 agonist. In some embodiments, the duration of inflammation in the subject is decreased by at least 25%. In some embodiments, the phagocytosis of macrophages is increased.

Another aspect of the disclosure provides methods of increasing phagocytosis of macrophages in a subject in need thereof. The method may include administering to the subject a therapeutically effective amount of a GPR37 agonist.

In some embodiments, the phagocytosis of macrophages in the peripheral nervous system is increased. In some embodiments, the phagocytosis of macrophages is increased in at least one of dorsal root ganglia, skin, blood, or peritoneal space, or a combination thereof. In some embodiments, the phagocytosis of macrophages in the central nervous system is increased. In some embodiments, the GPR37 agonist comprises a polynucleotide, polypeptide, small molecule, carbohydrate, lipid, or a combination thereof. In some embodiments, the GPR37 agonist is selected from NPD1, TX-14, artisunate, apigenin, honokiol, any derivatives, esters, or salts thereof, or a combination thereof. In some embodiments, intracellular calcium influx is increased. In some embodiments, expression of pro-inflammatory cytokines in macrophages is decreased. In some embodiments, the pro-inflammatory cytokines include at least one of IL-1β, IL-6, TNF, or CXCL1, or a combination thereof. In some embodiments, expression of anti-inflammatory cytokines in macrophages is increased. In some embodiments, the anti-inflammatory cytokines comprise at least one of IL-10, TGF-β, or a combination thereof.

Another aspect of the disclosure provides a pharmaceutical composition comprising a GPR37 agonist. In some embodiments, the composition further includes a carrier for oral, intranasal, intravaginal, transdermal, intravenous, intraarterial, intratumoral, intraperitoneal, or topical administration. In some embodiments, the GPR37 agonist comprises a polynucleotide, polypeptide, small molecule, carbohydrate, lipid, or a combination thereof. In some embodiments, the GPR37 agonist is selected from NPD1, TX-14, artisunate, apigenin, honokiol, any derivatives, esters, or salts thereof, or a combination thereof.

The disclosure provides for other aspects and embodiments that will be apparent in light of the following detailed description and accompanying figures.

BRIEF DESCRIPTION OF THE DRAWINGS

(FIG. 1A, FIG. 1B) Immunohistochemistry showing the co-localization of GPR37 and CD68 in the hindpaw dermis of WT mice (FIG. 1A) but not Gpr37$^{-/-}$ mice (FIG. 1B). Boxes in (FIG. 1A) indicate an enlarged cell. Blue DAPI staining labels all cell nuclei in the skin. Scale, 100 µm. (FIG. 1C, FIG. 1D) Flow cytometry showing GPR37 expression in F4/80$^+$ macrophages (MΦ) of hindpaw skin and peritoneal MΦ (pMΦ) in WT and KO (Gpr37$^{-/-}$) mice. n=3-5 mice/group. (FIG. 1E) Double staining showing GPR37-IR in F4/80$^+$ pMΦ. Scale, 100 µm. (FIG. 1F) Confocal images showing cytoplasm (arrows) and surface (arrow heads) localization of GPR37-IR in pMΦ. Scale, 20 µm. (FIG. 1G) Western blot showing a single band of GPR37 in lysates of brain, spinal cord, hindpaw skin, and pMΦ. Note the band is absent in KO mice. (FIG. 1H) Double staining showing no co-localization of GPR37 with CX3CR1 in the spinal cord of Cx3cr1-GFP mice. Scale, 250

μm. (FIG. 1I) β-gal staining showing no colocalization of LacZ (Gpr37) expression with IBA1 in brain sections of Gpr37$^{+/-}$ mice. CC, corpus callosum. Scale, 100 μm. Scales inside boxes in FIG. 1H and FIG. 1I, 20 μm.

FIG. 2A-2E) Ca$^{2+}$ imaging with the Fura-2AM indicator in HEK293 cells transfected with GPR37 cDNA or empty vector (mock transfection). (FIG. 2A) Representative images showing calcium responses (color changes) after TX14 (1 μM, 3 min) and NPD1 (30 nM, 3 min) treatment. Scale bar: 50 μm. The pseudo-color scale (0-2) shows the possible range of calcium signaling. (FIG. 2B) Combined traces from 100 cells showing time-dependent iCa$^{2+}$ increases induced by NPD1 and TX14 after GPR37 but not mock transfection. Arrows show the time points at which the images in A were collected. (FIG. 2C) Comparison of iCa$^{2+}$ levels after 3 minutes of treatment with NPD1 (30 nM), TX14 (1 μM), RvD1 (100 nM), RvD2 (100 nM), RvE1 (100 nM), lipoxin (100 nM), DHA (1 mM), EPA (1 μM), and ionomycin (2 μM). *$P<0.05$ versus baseline (vehicle); n=3-4 cultures, with 73 to 340 cells analyzed for each condition. (FIG. 2D) Dose-response curves of NPD1- and TX14-induced iCa$^{2+}$ increases. n=3-4 cultures, with 72 to 250 cells analyzed for each condition. Note the different EC50 values for these 2 compounds. (FIG. 2E) Inhibition of NPD1-induced (30 nM) iCa$^{2+}$ increases by PTX (1 μg/mL, 16 h before treatment), thapsigargin (1 μM, 3 min), and EGTA (10 mM, 3 min). *$P<0.05$; 1-way ANOVA. n=3-4 cultures, with 131 to 186 cells analyzed per treatment. (FIG. 2F) Dot blots showing a dose-dependent binding of NPD1 and TX14, but not RvE1, to GPR37. The blots were coated with NPD1, TX14, and RvE1 and then incubated with cell lysates from HEK293 cells with Gpr37 cDNA or mock transfection. (FIG. G-J) Ca$^{2+}$ imaging with the Fluo-4AM Ca$^{2+}$ indicator in WT and Gpr37$^{-/-}$ pMΦ cultures. (FIG. 2G) Representative images showing Ca$^{2+}$ responses (color changes) after NPD1 treatment (30 nM) in WT but not Gpr37$^{-/-}$ mice. Pseudo-color scale (0-5) shows the possible range of calcium signaling. Scale bar: 50 μm. (FIG. 2H) Combined traces from 100 cells showing time-dependent iCa$^{2+}$ responses after NPD1 treatment (100 nM, 3 min) in WT and Gpr37$^{-/-}$ mice. (FIG. 2I) Comparison of iCa$^{2+}$ levels after treatment with NPD1 (30 nM, 3 min), TX14 (1 UM, 3 min), PTX (1 μg/mL, 16 h), RvD1 (100 nM, 3 min), RvE1 (100 nM, 3 min), and ATP (100 UM, 3 min) in WT and Gpr37/pMΦ cultures. *$P<0.05$ versus Gpr37$^{-/-}$; $^{\#}P<0.05$ (with PTX vs. without PTX); n=3-4 cultures, with more than 300 cells analyzed for each condition. (FIG. 2J) Dose-response curves of NPD1- and TX14-induced iCa$^{2+}$ increases in pMΦ cultures. n=3 cultures, with 80-500 cells analyzed for each condition. Note the different EC50 values for NPD1 and TX14. Data represent the mean±SEM. F0: Relative basal intensity; F max: Relative peak intensity.

(FIG. 3A) NPD1 enhances phagocytosis in WT pMΦ as revealed by fluorescence-labeled zymosan particles. Note a reduction in NPD1-induced phagocytosis in Gpr37-+ mice. Scale, 10 μm. (FIG. 3B) Quantification of pMΦ phagocytic activity by number of zymosan particles (top) and percentage of cells (bottom) with phagocytic activity (>1 particle/cell). Note a dose-dependent phagocytic activity by NPD1 $^{\#}P<0.05$, vs. control (vehicle, PBS), *$P<0.05$, vs KO (Gpr37$^{-/-}$), n=4~5 cultures/group. (FIG. 3C) Phagocytic activity in pMΦ of WT and KO mice following the treatment of RvD1, RvE1, TX14, and ionomycin (2 μM), as revealed by number of Zymosan particles (top) and percentage of cells with phagocytosis (bottom). $^{\#}P<0.05$, vs. vehicle, *$P<0.05$, vs KO, n=3~5 cultures/group. (FIG. 3D) Effects of LY294002 (50 μM), U0126 (10 μM), PTX (1 μg/mL), BAPTA-AM (10 μM), and ionomycin (2 μM) on basal and NPD1-induced phagocytosis. *$P<0.05$, vs. vehicle (with NPD1), $^{\#}P<0.05$, NPD1 vs. control, n=3~5 cultures/group. 113-503 cells were analyzed per culture. All the data are mean±SEM.

(FIG. 4A) Schematic illustration of MΦ phagocytosis of pH sensitive and dye-conjugated zymosan (pH-R-zymosan) particles. Note that only phagocytized zymosan particles display red fluorescence. (FIG. 4B) An experimental diagram showing the timeline of intraplantar injection of pH-R-zymosan, FACS analysis, immunostaining, and edema tests. (FIG. 4C) Edema in a hindapw following zymosan (20 μg/20 μL) injection, as measured by paw volume. *$P<0.05$, vs. baseline (BL), One-Way ANOVA, n=5 mice/group. (FIG. 4D) Immunohistochemistry showing time courses of zymosan-induced changes in neutrophils (Gr-1$^+$), MΦ (CD68$^+$), GPR37, and phagocytized-zymosan in inflamed hindpaw skins. *$P<0.05$, vs. baseline in naïve animals, One-Way ANOVA, n=4 mice/group. (FIG. 4E) Images of phagocytized zymosan particles in skins of naïve mice and inflamed mice at 4 h, 1 d, and 5 d after zymosan injection. Scale, 50 μm. (FIG. 4F) Quadruple staining of CD68 (green), DAPI (blue), GPR37 (purple), and zymosan-particle (red) in inflamed skin 5 days after zymosan injection. The boxes are enlarged in the right panel. Note that phagocytized zymosan particles are present inside GPR37$^+$MΦ. Scales, 20 μm (left) and 5 μm (right). (FIG. 4G) Phagocytized zymosan levels (revealed by staining intensity) in naïve and inflamed paws in WT and Gpr37$^{-/-}$ mice. *$P<0.05$, Two-Way ANOVA, n=4 mice/group. (FIG. 4H) Quantification of CD68-IR in hindpaw skin. ns, not significant, n=4 mice/group. (FIG. 4I) Flow cytometry showing the percentage of GPR37-expressing MΦ in WT and Gpr37$^{-/-}$ mice at different times of zymosan injection. *$P<0.05$, Student's t-test, n=4~5 mice/group. All the data are mean±SEM.

FIG. 6A-FIG. 6G. GPR37 is necessary for the resolution of inflammatory pain. (FIG. 6A) An experimental diagram showing the timeline of intraplantar injection of zymosan and behavioral tests. (FIG. 6B) Zymosan-induced inflammatory pain symptoms heat hyperalgesia and mechanical allodynia in WT and Gpr37$^{-/-}$ mice. Note that baseline pain and the onset of inflammatory pain are normal but resolution of inflammatory pain is impaired in KO mice. *$P<0.05$, vs. KO, Two-Way ANOVA; n=10 mice/group. (FIG. 6C) Heat hyperalgesia and mechanical allodynia induced by intraplantar IL-1β (1 ng) in WT and Gpr37$^{-/-}$ mice. *$P<0.05$, vs. KO, Two-Way ANOVA; n=5 mice/group. (FIG. 6D) Baseline pain for heat sensitivity (hot plate), mechanical sensitivity (Randall-Selitto and pinprick tests), and cold sensitivity (acetone test) in WT and Gpr37$^{-/-}$ mice. n=5 mice/group. (FIG. 6E) Rotarod test in WT and Gpr37$^{-/-}$ mice. The speed of rotation was accelerated from 4 to 40 rpm in 5 min. n=5 mice/group. (FIG. 6F) Acute inflammatory pain induced by capsaicin (i.pl., 5 µg) in WT and Gpr37$^{-/-}$ mice. n=5 mice/group. (FIG. 6G) Zymosan-induced edema (paw swelling, revealed by paw volume) before and after zymosan injection in WT and Gpr37$^{-/-}$ mice. Two-Way ANOVA; n=5-10 mice/group.

(FIG. 7A) An experimental diagram showing the timeline of drug treatments, FACS analysis, and behavioral tests. (FIG. 7B) MΦ depletion with clodronate (IP, 15 µL/g, 2 and 48 hours prior to the zymosan injection), delays the resolution of heat hyperalgesia and mechanical allodynia. *$P<0.05$, vs. control, Two-Way ANOVA; n=5-8 mice/group. (FIG. 7C) An experimental diagram showing the timeline of zymosan injection, adoptive transfer of MΦ, and behavioral tests for FIG. 7D-FIG. 7E. PID, days post zymosan injection. (FIG. 7D, FIG. 7E) Adoptive transfer of WT MΦ (i.pl, 50,000 cells, FIG. 7D) but not Gpr37-deficient MΦ (FIG. 7E) promotes the resolution of heat hyperalgesia and mechanical allodynia in Gpr37-KO mice. Note the differences between KO and WT mice (revealed in FIG. 6B) are abolished after the treatment (FIG. 7D). *$P<0.05$, vs. KO, Two-Way ANOVA; n=5 mice/group. All the data are mean±SEM.

(FIG. 8A) An experimental diagram showing the timeline of drug treatments and behavioral tests. (FIG. 8B) IL-10 neutralizing antibody (i.pl., 10 µg, twice, 0.5 hour before and 1 day after the zymosan injection), delays the resolution of heat hyperalgesia and mechanical allodynia. *$P<0.05$, vs. control IgG, Two-Way ANOVA; n=6 mice/group. (FIG. 8C) An experimental diagram showing the timeline of zymosan injection, adoptive transfer of MΦ with IL-10 neutralizing antibody injection, and behavioral tests for FIG. 8D. PID, days post zymosan injection. (FIG. 8D) IL-10 neutralizing antibody (i.pl., 10 µg, 1 day after zymosan injection), impairs the pro-resolution effects on heat hyperalgesia and mechanical allodynia, induced by adoptive transfer of WT MΦ (i.pl, 50,000 cells), in Gpr37-KO mice. *$P<0.05$, WT vs. KO, Two-Way ANOVA; n=6 mice/group. All the data are mean±SEM.

FIG. 9A-FIG. 9E. Characterization of GPR37 expression in mouse tissue sections of skin, DRG, spinal cord, and brain. (FIG. 9A) In situ hybridization showing Gpr37 mRNA expression in GPR37-expressing cells in the dermis of hind paw skin. Scale, 100 µm. (FIG. 9B) Immunohistochemistry showing GPR37 expression in F4/80$^+$ MΦ in DRG sections of WT mice but not KO mice. Blue DAPI staining showing all the cell nuclei in DRG section. Scale, 100 µm. (FIG. 9C) β-gal staining showing no colocalization of LacZ (Gpr37) expression with IBA1 in spinal cord sections of Gpr37$^{+/-}$ mice. Scale, 100 µm. (FIG. 9D) β-gal staining showing no colocalization of LacZ (Gpr37) expression with IBA1 in brain sections of Gpr37$^{+/-}$ mice. CC, corpus callosum. Scale, 100 µm. (FIG. 9E). Full size gels of GPR37 western blot (related to FIG. 1G).

(FIG. 11A) Photographs of phagocytized zymosan particles (a1), CD68-IR (MΦ, a2), Gr-1-IR (neutrophils, a3, a4) in non-inflamed skin of naïve animal and inflamed skins at 4 h, 1d, and 5 d after zymosan injection. Scales, 50 and 500 µm. (FIG. 11B) Double staining showing co-localization of CD68 and GPR37 in hind paw skin 1 d and 5 d after inflammation. Scale, 100 µm.

(FIG. 12A, FIG. 12B) Photographs of phagocytized particles and CD68$^+$ MΦ in non-inflamed (naive) and inflamed (day 1 and day 5) skins of WT and KO mice. Scale, 100 µm. (FIG. 12C, FIG. 12D) Flow cytometry showing F4/80$^+$ MΦ in non-inflamed and inflamed skins of WT and KO mice. (FIG. 12C) Images of flow cytometry. (FIG. 12D) Quantification of F4/80$^+$ MΦ in non-inflamed and inflamed skin, *$P<0.05$, compared with KO. n=3 mice/group. All the data are mean±SEM.

(FIG. 13A) FACS analysis showing the percentage of Gr-1$^+$ neutrophils in non-inflamed (naive) and inflamed (4 h, 1 d, and 5 d) skins of WT and KO mice. Right panel shows quantification of the FACS data in hindpaw skin. n=3 mice/group. (FIG. 13B) FACS analysis showing the percentage of phagocytized neutrophils by MΦ in non-inflamed and inflamed skins of WT and KO mice. Right panel shows quantification of the FACS data in hindpaw skin. *$P<0.05$, compared with KO, n=5 mice/group. (FIG. 13C) Triple staining showing Gr-1-IR inside IBA1-expressing MΦ in inflamed skin of WT mice. Blue DAPI staining labels nuclei. Scales, 5 and 25 µm. All the data are mean±SEM.

(FIG. 15A) Immunostaining of IB4, CGRP, and NF200 on DRG sections from WT and Gpr37$^{-/-}$ mice. Scale bars, 100 µm. Bottom, quantification of the percentages of IB4, CGRP, and NF200-IR neurons in DRG sections from WT and Gpr37$^{-/-}$ mice. n=4 mice/group. (FIG. 15B) PGP9.5 immunostaining showing normal nerve innervation of the glabrous skin from hind paw of WT and Gpr37$^{-/-}$ mice. Bottom, quantification of the numbers of vertical branches of PGP9.5+ nerve fibers/mm in the epidermis. ns, not significant. n=4 mice/group. The skin morphology was revealed by DAPI staining. Scale bar, 100 µm. (FIG. 15C) Immunostaining of IB4, CGRP, and NF200 on spinal cord sections from WT and Gpr37$^{-/-}$ mice. Scale bars, 100 µm. Note the central innervations of DRG neurons in the spinal cord are normal in Gpr37$^{-/-}$ mice. (FIG. 15D) DAPI and Nissl staining on spinal cord sections from WT and Gpr37$^{-/-}$ mice. Scale bars, 100 µm. Note that Gpr37 KO does not cause cell loss in the spinal cord. All the data are mean±SEM.

DETAILED DESCRIPTION

Figure 1A:
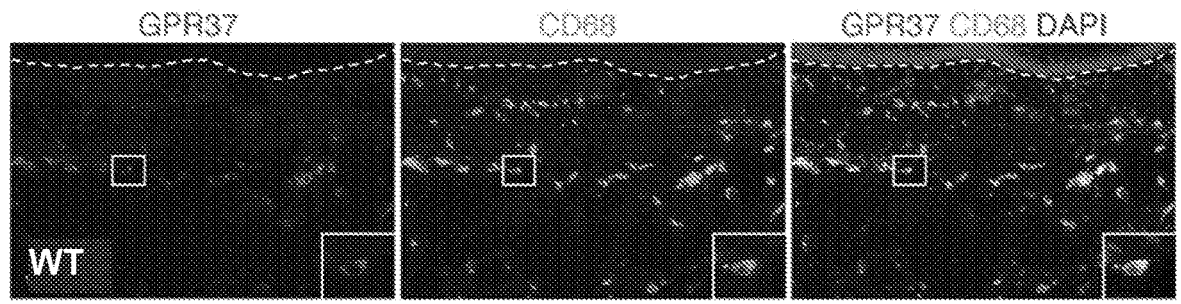
FIG. 1A-FIG. 1I. GPR37 is expressed by macrophages not microglia.

Described herein are compositions and methods for treating a disease or disorder such as inflammation, inflammatory pain, chronic pain, viral infection, bacterial infection, malaria, sepsis, or a combination thereof, with a GPR37 agonist. As detailed herein, it was discovered that GPR37 may be a receptor for NPD1, which is involved in NPD1-induced intracellular Ca$^{2+}$ signaling and phagocytosis in macrophages. These actions of NPD1 were abolished in Gpr37-deficient macrophages. It was also discovered that GPR37 is expressed by macrophages (MΦ) but not microglia and contributes to the resolution of inflammatory pain.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The term "about" as used herein as applied to one or more values of interest, refers to a value that is similar to a stated reference value. In certain aspects, the term "about" refers to a range of values that fall within 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

The term "administration" or "administering," as used herein, refers to providing, contacting, and/or delivery of a compound or composition by any appropriate route to achieve the desired effect. These compounds or compositions may be administered to a subject in numerous ways including, but not limited to, orally, ocularly, nasally, intravenously, topically, as aerosols, suppository, etc. and may be used in combination.

The term "agonist" refers to a biologically active ligand that binds to its complementary biologically active receptor and activates the receptor either to cause a biological response in the receptor or to enhance a biological activity of the receptor. An agonist may trigger (e.g., initiate or promote), partially or fully enhance, stimulate, or activate one or more biological activities. An agonist may mimic the action of a naturally occurring substance. An agonist may be a compound that increases an activity of a polypeptide. An agonist may indirectly or directly bind a polypeptide and increase or enhance the activity of the polypeptide, including binding activity or catalytic activity. For example, an agonist may increase expression of a polypeptide, or increase or enhance the ability of a polypeptide to mediate the binding of the polypeptide to a ligand.

"Antagonist" or "inhibitor" refers to an agent that inhibits the effect of an agonist. An antagonist may be a compound that inhibits or reduces an activity of a polypeptide. An antagonist may indirectly or directly bind a polypeptide and inhibit the activity of the polypeptide, including binding activity or catalytic activity. For example, an antagonist may prevent expression of a polypeptide, or inhibit the ability of a polypeptide to mediate the binding of the polypeptide to a ligand. An "allosteric antagonist" refers to a compound that binds to a polypeptide at a secondary site, distinct from the primary ligand binding site, and inhibits or reduces an activity of the polypeptide.

The terms "inhibit" or "inhibiting" mean that an activity is decreased or prevented in the presence of an inhibitor as opposed to in the absence of the inhibitor. The term "inhibition" refers to the reduction or down regulation of a process or the elimination of a stimulus for a process, which results in the absence or minimization of the expression or activity of a biomolecule or polypeptide. Inhibition may be direct or indirect. Inhibition may be specific, that is, the inhibitor inhibits a biomolecule or polypeptide and not others.

"Amino acid" as used herein refers to naturally occurring and non-natural synthetic amino acids, as well as amino acid analogs and amino acid mimetics that function in a manner similar to the naturally occurring amino acids. Naturally occurring amino acids are those encoded by the genetic code. Amino acids can be referred to herein by either their commonly known three-letter symbols or by the one-letter symbols recommended by the IUPAC-IUB Biochemical Nomenclature Commission. Amino acids include the side chain and polypeptide backbone portions.

The terms "control," "reference level," and "reference" are used herein interchangeably. The reference level may be a predetermined value or range, which is employed as a benchmark against which to assess the measured result. "Control group" as used herein refers to a group of control subjects. The predetermined level may be a cutoff value from a control group. The predetermined level may be an average from a control group. Cutoff values (or predetermined cutoff values) may be determined by Adaptive Index Model (AIM) methodology. Cutoff values (or predetermined cutoff values) may be determined by a receiver operating curve (ROC) analysis from biological samples of the patient group. ROC analysis, as generally known in the biological arts, is a determination of the ability of a test to discriminate one condition from another, e.g., to determine the performance of each marker in identifying a patient having CRC. A description of ROC analysis is provided in P. J. Heagerty et al. (*Biometrics* 2000, 56, 337-44), the disclosure of which is hereby incorporated by reference in its entirety. Alternatively, cutoff values may be determined by a quartile analysis of biological samples of a patient group. For example, a cutoff value may be determined by selecting a value that corresponds to any value in the 25th-75th percentile range, preferably a value that corresponds to the 25th percentile, the 50th percentile or the 75th percentile, and more preferably the 75th percentile. Such statistical analyses may be performed using any method known in the art and can be implemented through any number of commercially available software packages (e.g., from Analyse-it Software Ltd., Leeds, UK; StataCorp LP, College Station, TX; SAS Institute Inc., Cary, NC.). The healthy or normal levels or ranges for a target or for a protein activity may be defined in accordance with standard practice. A control may be a subject or cell without a compound as detailed herein. A control may be a subject, or a sample therefrom, whose disease state is known. The subject, or sample therefrom, may be healthy, diseased, diseased prior to treatment, diseased during treatment, or diseased after treatment, or a combination thereof. The term "normal subject" as used herein means a healthy subject, i.e. a subject having no clinical signs or symptoms of disease. The normal subject is clinically evaluated for otherwise undetected signs or symptoms of disease, which evaluation may include routine physical examination and/or laboratory testing. In some embodiments, the control is a healthy control.

"Polynucleotide" as used herein can be single stranded or double stranded, or can contain portions of both double stranded and single stranded sequence. The polynucleotide can be nucleic acid, natural or synthetic, DNA, genomic DNA, cDNA, RNA, or a hybrid, where the polynucleotide can contain combinations of deoxyribo- and ribo-nucleotides, and combinations of bases including, for example, uracil, adenine, thymine, cytosine, guanine, inosine, xanthine hypoxanthine, isocytosine, and isoguanine. Polynucleotides can be obtained by chemical synthesis methods or by recombinant methods.

A "peptide" or "polypeptide" is a linked sequence of two or more amino acids linked by peptide bonds. The polypeptide can be natural, synthetic, or a modification or combination of natural and synthetic. Peptides and polypeptides include proteins such as binding proteins, receptors, and antibodies. The terms "polypeptide", "protein," and "peptide" are used interchangeably herein. "Primary structure" refers to the amino acid sequence of a particular peptide. "Secondary structure" refers to locally ordered, three dimensional structures within a polypeptide. These structures are commonly known as domains, e.g., enzymatic domains, extracellular domains, transmembrane domains, pore domains, and cytoplasmic tail domains. "Domains" are portions of a polypeptide that form a compact unit of the polypeptide and are typically 15 to 350 amino acids long. Exemplary domains include domains with enzymatic activity or ligand binding activity. Typical domains are made up of sections of lesser organization such as stretches of beta-sheet and alpha-helices. "Tertiary structure" refers to the complete three dimensional structure of a polypeptide monomer. "Quaternary structure" refers to the three dimensional structure formed by the noncovalent association of independent tertiary units. A "motif" is a portion of a polypeptide sequence and includes at least two amino acids. A motif may be 2 to 20, 2 to 15, or 2 to 10 amino acids in length. In some embodiments, a motif includes 3, 4, 5, 6, or 7 sequential amino acids. A domain may be comprised of a series of the same type of motif.

"Sample" or "test sample" as used herein can mean any sample in which the presence and/or level of a target or activity is to be detected or determined or any sample comprising a compound or agonist or composition as detailed herein. Samples may include liquids, solutions, emulsions, or suspensions. Samples may include a medical sample. Samples may include any biological fluid or tissue, such as blood, whole blood, fractions of blood such as plasma and serum, muscle, interstitial fluid, sweat, saliva, urine, tears, synovial fluid, bone marrow, cerebrospinal fluid, nasal secretions, sputum, amniotic fluid, bronchoalveolar lavage fluid, gastric lavage, emesis, fecal matter, lung tissue, peripheral blood mononuclear cells, total white blood cells, lymph node cells, spleen cells, tonsil cells, cancer cells, tumor cells, bile, digestive fluid, adipose tissue, skin, or combinations thereof. In some embodiments, the sample comprises an aliquot. In other embodiments, the sample comprises a biological fluid. Samples can be obtained by any means known in the art. The sample can be used directly as obtained from a patient or can be pre-treated, such as by filtration, distillation, extraction, concentration, centrifugation, inactivation of interfering components, addition of reagents, and the like, to modify the character of the sample in some manner as discussed herein or otherwise as is known in the art.

"Subject" as used herein can mean a mammal that wants or is in need of the herein described compounds. The subject may be a patient. The subject may be a human or a non-human animal. The subject may be a vertebrate. The subject may be a mammal. The mammal may be a primate or a non-primate. The mammal can be a primate such as a human; a non-primate such as, for example, dog, cat, horse, cow, pig, mouse, rat, camel, llama, goat, rabbit, sheep, hamster, and guinea pig; or non-human primate such as, for example, monkey, chimpanzee, gorilla, orangutan, and gibbon. The subject may be male. The subject may be female. The subject may be of any age or stage of development, such as, for example, an adult, an adolescent, a child, or an infant. In some embodiments, the subject is human. In some embodiments, the subject has a specific genetic marker.

"Substantially identical" can mean that a first and second amino acid or polynucleotide sequence are at least 60%, 65%, 70%, 75%, 80%, 85%, 90%, 95%, 96%, 97%, 98%, or 99% over a region of 1, 2, 3, 4, 5, 6, 7, 8, 9, 10, 11, 12, 13, 14, 15, 16, 17, 18, 19, 20, 21, 22, 23, 24, 25, 30, 35, 40, 45, 50, 55, 60, 65, 70, 75, 80, 85, 90, 95, 100, 200, 300, 400, 500, 600, 700, 800, 900, 1000, 1100 amino acids or nucleotides.

A "therapeutically effective amount," or "effective dosage," or "effective amount" as used interchangeably herein unless otherwise defined, means a dosage of an agent, compound, or drug effective for periods of time necessary, to achieve the desired therapeutic result. An effective dosage may be determined by a person skilled in the art and may vary according to factors such as the disease state, age, sex, and weight of the individual, and the ability of the drug to elicit a desired response in the individual. This term as used herein may also refer to an amount effective at bringing about a desired in vivo effect in a subject. A therapeutically effective amount may be administered in one or more administrations (e.g., the composition may be given as a preventative treatment or therapeutically at any stage of disease progression, before or after symptoms, and the like), applications, or dosages, and is not intended to be limited to a particular formulation, combination, or administration route. It is within the scope of the present disclosure that the agent, compound, or drug may be administered at various times during the course of treatment of the subject. The times of administration and dosages used will depend on several factors, such as the goal of treatment (e.g., treating v. preventing), condition of the subject, etc. and can be readily determined by one skilled in the art. A therapeutically effective amount is also one in which any toxic or detrimental effects of substance are outweighed by the therapeutically beneficial effects. A "prophylactically effective amount" refers to an amount effective, at dosages and for periods of time necessary, to achieve the desired prophylactic result. Typically, since a prophylactic dose is used in subjects prior to or at an earlier stage of disease, the prophylactically effective amount will be less than the therapeutically effective amount.

The terms "treat," "treated," or "treating" as used herein refers to a therapeutic wherein the object is to slow down (lessen) an undesired physiological condition, disorder or disease, or to obtain beneficial or desired clinical results. For the purposes of this invention, beneficial or desired clinical results include, but are not limited to, alleviation of symptoms; diminishment of the extent of the condition, disorder or disease; stabilization (i.e., not worsening) of the state of the condition, disorder or disease; delay in onset or slowing of the progression of the condition, disorder or disease; amelioration of the condition, disorder or disease state; and remission (whether partial or total), whether detectable or undetectable, or enhancement or improvement of the condition, disorder, or disease. Treatment also includes prolonging survival as compared to expected survival if not receiving treatment. The terms "treat," "treated," or "treating" may include suppressing, repressing, ameliorating, or completely eliminating the disease. Preventing the disease may involve administering a composition of the present invention to a subject prior to onset of the disease. Suppressing the disease may involve administering a composition of the present invention to a subject after induction of the disease but before its clinical appearance. Repressing or ameliorating the disease may involve administering a composition of the present invention to a subject after clinical appearance of the disease.

"Variant" as used herein with respect to a polynucleotide means (i) a portion or fragment of a referenced nucleotide sequence; (ii) the complement of a referenced nucleotide sequence or portion thereof; (iii) a polynucleotide that is substantially identical to a referenced polynucleotide or the complement thereof; or (iv) a polynucleotide that hybridizes under stringent conditions to the referenced polynucleotide, complement thereof, or a sequence substantially identical thereto.

A "variant" can further be defined as a peptide or polypeptide that differs in amino acid sequence by the insertion, deletion, or conservative substitution of amino acids, but retain at least one biological activity. Representative examples of "biological activity" include the ability to be bound by a specific antibody or polypeptide or to promote an immune response. Variant can mean a substantially identical sequence. Variant can mean a functional fragment thereof. Variant can also mean multiple copies of a polypeptide. The multiple copies can be in tandem or separated by a linker. Variant can also mean a polypeptide with an amino acid sequence that is substantially identical to a referenced polypeptide with an amino acid sequence that retains at least one biological activity. A conservative substitution of an amino acid, i.e., replacing an amino acid with a different amino acid of similar properties (e.g., hydrophilicity, degree and distribution of charged regions) is recognized in the art as typically involving a minor change. These minor changes can be identified, in part, by considering the hydropathic index of amino acids. See Kyte et al., *J. Mol. Biol.* 1982, 157, 105-132. The hydropathic index of an amino acid is based on a consideration of its hydrophobicity and charge. It is known in the art that amino acids of similar hydropathic indexes can be substituted and still retain protein function. In one aspect, amino acids having hydropathic indices of ±2 are substituted. The hydrophobicity of amino acids can also be used to reveal substitutions that would result in polypeptides retaining biological function. A consideration of the hydrophilicity of amino acids in the context of a polypeptide permits calculation of the greatest local average hydrophilicity of that polypeptide, a useful measure that has been reported to correlate well with antigenicity and immunogenicity, as discussed in U.S. Pat. No. 4,554,101, which is fully incorporated herein by reference. Substitution of amino acids having similar hydrophilicity values can result in polypeptides retaining biological activity, for example immunogenicity, as is understood in the art. Substitutions can be performed with amino acids having hydrophilicity values within ±2 of each other. Both the hydrophobicity index and the hydrophilicity value of amino acids are influenced by the particular side chain of that amino acid. Consistent with that observation, amino acid substitutions that are compatible with biological function are understood to depend on the relative similarity of the amino acids, and particularly the side chains of those amino acids, as revealed by the hydrophobicity, hydrophilicity, charge, size, and other properties.

A variant can be a polynucleotide sequence that is substantially identical over the full length of the full gene sequence or a fragment thereof. The polynucleotide sequence can be 80%, 81%, 82%, 83%, 84%, 85%, 86%, 87%, 88%, 89%, 90%, 91%, 92%, 93%, 94%, 95%, 96%, 97%, 98%, 99%, or 100% identical over the full length of the gene sequence or a fragment thereof. A variant can be an amino acid sequence that is substantially identical over the full length of the amino acid sequence or fragment thereof. The amino acid sequence can be 80%, 81%, 82%, 83%, 84%, 85%, 86%, 87%, 88%, 89%, 90%, 91%, 92%, 93%, 94%, 95%, 96%, 97%, 98%, 99%, or 100% identical over the full length of the amino acid sequence or a fragment thereof.

2. Inflammation

Inflammation is part of the complex biological response of body tissues to harmful stimuli, such as pathogens, damaged cells, or irritants, and is a protective response involving, for example, immune cells, blood vessels, and molecular mediators. Inflammation may be characterized by signs including rubor (redness), calor (increased heat), tumor (swelling), dolor (pain), and functio laesa (loss of function). As a feature of inflammation, pain may protect the inflamed tissue by sending a warning (nociceptive) signal to the brain and triggering withdrawal response. Activation of nociceptive neurons (nociceptors) in the peripheral nervous system may cause neurogenic inflammation and neuroinflammation by producing neuropeptides and chemokines. Ablation of nociceptive neurons may potentiate bacteria-induced inflammation. Inflammation after tissue injury may cause sequential infiltration of immune cells into the damaged tissue, including neutrophils (hours) and macrophages (days). These immune cells may produce inflammatory mediators such as proinflammatory cytokines (for example, TNF and IL-1β) to elicit inflammatory pain, by binding to cytokine receptors on nociceptors that innervate skin, muscle, and joint tissues.

A function of inflammation is to eliminate the initial cause of cell injury, leading to tissue repair and return to homeostasis. Resolution of acute inflammation is an active process involving the production of specialized pro-resolving mediators (SPMs), such as resolvins and maresins, biosynthesized from omega-3 unsaturated fatty acids, which can potently suppress inflammatory pain at doses that are much lower than morphine. The SPM protectin-D1 or neuroprotectin D1 (NPD1) is synthesized from docosahexaenoic acid (DHA) and can induce inhibition of inflammation and/or inflammatory pain via its multiple actions on neurons, immune cells, and glial cells. SPMs can activate G-protein coupled receptors (GPCR) to meditate their anti-inflammation and pro-resolution actions.

SPMs can resolve inflammation by promoting phagocytosis. As a mechanism that may be used to remove pathogens and cell debris after inflammation, phagocytosis in mammalian immune cells may be activated by attachment of these cells to pathogen-associated molecular patterns such as zymosan. Macrophages may play a role in phagocytosis and exhibit different phenotypes, such as pro-inflammatory M1-like phenotypes and anti-inflammatory M2 phenotypes, mediating detrimental and protective actions of macrophages, respectively.

Macrophages (MΦ) are a type of white blood cell of the immune system. Macrophages engulf and digest matter such as cellular debris, foreign substances, microbes, cancer cells, pathogens, or other foreign or harmful matter, in a process called phagocytosis. Phagocytosis is the term used to describe the engulfing and destroying of the defective or harmful cells. Once engulfed, cellular enzymes inside the macrophage can destroy the ingested particle. Macrophages may increase inflammation and stimulate the immune system. Macrophages may have an anti-inflammatory role and decrease immune reactions through the release of cytokines. Macrophages may have a role in innate immunity. Macrophages may have a role in adaptive immunity.

3. GPR37

Probable G-protein coupled receptor 37 (GPR37) is a receptor that functions in biological systems such as neurological systems and inflammation. GPR37 may comprise a polypeptide having an amino acid sequence of SEQ ID NO: 1. The GPR37 polypeptide may be encoded by a polynucleotide having a sequence of SEQ ID NO: 2.

GPR37 is a substrate of parkin, which is a 465-amino acid E3 ubiquitin ligase that has role in ubiquitination. Parkin also recognizes proteins on the outer membrane of mitochondria upon cellular insult and mediates the clearance of damaged mitochondria via autophagy and proteasomal mechanisms. GPR37 is also a receptor for prosaposin. Prosaposin is a glycoprotein and a precursor for four cleavage products, including saposin A, saposin B, saposin C, and saposin D. Saposins A-D localize primarily to the lysosomal compartment where they facilitate the catabolism of glycosphingolipids with short oligosaccharide groups. GPR37 is expressed by macrophages but not microglia. In some embodiments, GPR37 contributes to the resolution of inflammatory pain. GPR37 may associate with the dopamine transporter to modulate dopamine uptake. Mutations in GPR37 gene may be associated with autism spectrum disorders. GPR37 may also be expressed by oligodendrocytes in the brain and spinal cord to regulate differentiation of these glial cells.

Detailed herein is a previously unrecognized role of GPR37 in regulating macrophage phagocytosis and resolution of inflammatory pain. Inflammation can upregulate expression of GPR37 in macrophages. Increased expression or increased activity of GPR37 may result in phagocytosis of zymosan particles and neutrophils by macrophages, and/or reduce or resolve inflammatory pain. In some embodiments, GPR37 regulates proinflammatory cytokines. In some embodiments, GPR37 regulates anti-inflammatory cytokines. In some embodiments, activation of GPR37 in macrophages by, for example, neuroprotectin D1 (NPD1) and prosaptide-TX14, increases intracellular $Ca^{2+}$. In some embodiments, activation of GPR37 in macrophages increases phagocytosis.

4. GPR37 Agonists

Provided herein are agonists of GPR37. The GPR37 agonist, upon administration to a subject, may elicit a variety of effects as an agonist of GPR37. The GPR37 agonist may affect, for example, the phagocytosis of macrophages, inflammation, calcium influx, pro-inflammatory cytokines, anti-inflammatory cytokines, neuropathic pain, neurodegeneration such as after nerve trauma or chemotherapy, or a combination thereof.

The GPR37 agonist may increase the phagocytosis of macrophages relative to a control. The phagocytosis of macrophages may be increased by at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 2-fold, at least about 3-fold, at least about 4-fold, at least about 5-fold, or at least about 10-fold relative to a control. The nervous system includes the peripheral nervous system, and the central nervous system. The central nervous system includes the brain and spinal cord. The brain includes the brainstem, cerebellum, diencephalon, and cerebrum. The peripheral nervous system include the nerves and ganglia outside the brain and spinal cord. The main function of the peripheral nervous system is to connect the central nervous system to the limbs and organs, essentially serving as a relay between the brain and spinal cord and the rest of the body. Unlike the central nervous system, the peripheral nervous system is not protected by the vertebral column and skull, or by the blood-brain barrier, which leaves it exposed to toxins and mechanical injuries. The peripheral nervous system is divided into the somatic nervous system and the autonomic nervous system. In some embodiments, the phagocytosis of macrophages is increased in the peripheral nervous system. The phagocytosis of macrophages may be increased in at least one of dorsal root ganglia, skin, blood, or peritoneal space, or a combination thereof. In some embodiments, the phagocytosis of macrophages is increased in the central nervous system following disruption of the blood-brain barrier.

The GPR37 agonist may reduce the duration of inflammation relative to a control. Inflammation may be reduced or decreased by at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 2-fold, at least about 3-fold, at least about 4-fold, at least about 5-fold, or at least about 10-fold relative to a control.

The GPR37 agonist may increase intracellular calcium influx in macrophages relative to a control. Intracellular calcium influx may be increased by at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 2-fold, at least about 3-fold, at least about 4-fold, at least about 5-fold, or at least about 10-fold relative to a control.

The GPR37 agonist may decrease the expression of pro-inflammatory cytokines in macrophages relative to a control. The expression of pro-inflammatory cytokines in macrophages may be decreased by at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 2-fold, at least about 3-fold, at least about 4-fold, at least about 5-fold, or at least about 10-fold relative to a control. Pro-inflammatory cytokines may include, for example, at least one of IL-1β, IL-6, TNF, or CXCL1, or a combination thereof.

The GPR37 agonist may increase the expression of anti-inflammatory cytokines in macrophages relative to a control. The expression of anti-inflammatory cytokines in macrophages may be increased by at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 2-fold, at least about 3-fold, at least about 4-fold, at least about 5-fold, or at least about 10-fold relative to a control. Anti-inflammatory cytokines may include, for example, at least one of IL-10, TGF-β, or a combination thereof.

The GPR37 agonist may reduce, decrease, or protect against neuropathic pain, such as, for example, neuropathic pain after nerve trauma and/or chemotherapy, relative to a control. Neuropathic pain may be reduced or decreased by at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 2-fold, at least about 3-fold, at least about 4-fold, at least about 5-fold, or at least about 10-fold relative to a control.

The GPR37 agonist may reduce, decrease, or protect against neurodegeneration (also referred to as loss of peripheral nerve fibers), such as, for example, neurodegeneration after nerve trauma and/or chemotherapy, relative to a control. Neurodegeneration may be reduced or decreased by at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 2-fold, at least about 3-fold, at least about 4-fold, at least about 5-fold, or at least about 10-fold relative to a control.

The GPR37 agonist may be or include a small molecule, polynucleotide, polypeptide, carbohydrate, lipid, or a combination thereof. In some embodiments, the GPR37 agonist comprises a polypeptide. In some embodiments, the GPR37 agonist comprises an antibody. In some embodiments, the GPR37 agonist comprises a small molecule. GPR37 agonists may include, for example, NPD1, TX14, natural compounds such as artesunate, apigenin, and honokiol, and any derivatives, esters, and salts thereof, or any combination thereof.

In some embodiments, the GPR37 agonist comprises NPD1. NPD1 is commercially available from, for example, Resolvyx Pharmaceuticals (Cambridge, MA). NPD1 is a polyunsaturated fatty acid metabolite. NPD1 is an aliphatic acyclic alkene 22 carbons in length with two hydroxyl groups at the 10 and 17 carbon positions and one carboxylic acid group at the one carbon position. NPD1 may have the following structure, or a pharmaceutically acceptable salt thereof:

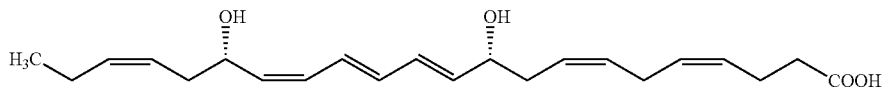

In some embodiments, NPD1 activates GPR37 to reduce, treat, or protect against sepsis and other bacterial infections.

In some embodiments, the GPR37 agonist comprises prosaposin-derived 14-mer peptide (TX14). TX14 is a prosaptide of 14 amino acids in length (TALIDNNATEEILY, SEQ ID NO: 3). TX14 is derived from the active neurotrophic region in the amino-terminal portion of the saposin C domain. TX14 is commercially available from, for example, AnaSpec (Fremont, CA).

In some embodiments, the GPR37 agonist comprises artesunate. Artesunate is commercially available from, for example, SafeGenericPharmacy (USA, www.safegenericpharmacy.com). Artesunate may have the following structure, or a pharmaceutically acceptable salt thereof:

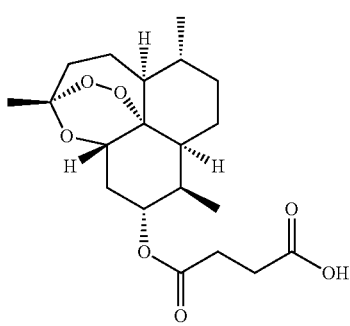 [SMILES: C[C@H]1[C@H](OC(=O)CCC(=O)O)C[C@@H]2O[C@]3(C)CC[C@H]4[C@H](C)CC[C@@H]1[C@@]24OO3]

In some embodiments, artesunate binds GPR37 and protects against sepsis and other bacterial infections.

In some embodiments, the GPR37 agonist comprises apigenin. Apigenin is a flavonoid and may be found in fruits and vegetables. Apigenin is commercially available. Apigenin may have the following structure, or a pharmaceutically acceptable salt thereof:

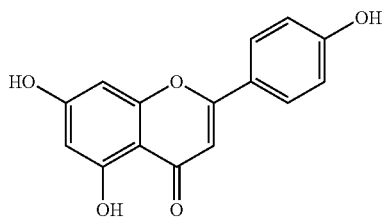 [SMILES: O=c1cc(-c2ccc(O)cc2)oc2cc(O)cc(O)c12]

In some embodiments, the GPR37 agonist comprises honokiol. Honokiol is a neolignan biphenol. Honokiol may be isolated from the bark, seed cones, or leaves, or a combination thereof, of trees belonging to the genus *Magnolia*. Honokiol is commercially available. Honokiol may have the following structure, or a pharmaceutically acceptable salt thereof:

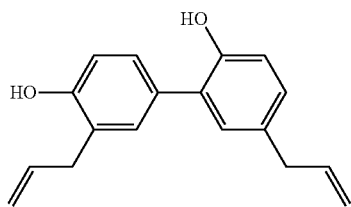 [SMILES: C=CCc1ccc(O)c(-c2ccc(O)c(CC=C)c2)c1]

The present disclosure also may include an isotopically-labeled GPR37 agonist, which is identical to a GPR37 agonist detailed above, but for the fact that one or more atoms are replaced by an atom having an atomic mass or mass number different from the atomic mass or mass number usually found in nature. Examples of isotopes suitable for inclusion in the GPR37 agonists of the invention are hydrogen, carbon, nitrogen, oxygen, phosphorus, sulfur, fluorine, and chlorine, such as, but not limited to $^{2}H$, $^{3}H$, $^{13}C$, $^{14}C$, $^{15}N$, $^{18}O$, $^{17}O$, $^{31}P$, $^{32}P$, $^{35}S$, $^{18}F$, and $^{36}Cl$, respectively. Substitution with heavier isotopes such as deuterium, i.e. $^{2}H$, can afford certain therapeutic advantages resulting from greater metabolic stability, for example increased in vivo half-life or reduced dosage requirements and, hence, may be preferred in some circumstances. The GPR37 agonist may incorporate positron-emitting isotopes for medical imaging and positron-emitting tomography (PET) studies for determining the distribution of receptors. Suitable positron-emitting isotopes that can be incorporated in the compound are $^{11}C$, $^{13}N$, $^{15}O$, and $^{18}F$. Isotopically-labeled compounds can generally be prepared by conventional techniques known to those skilled in the art or by processes analogous to those described in the accompanying Examples using appropriate isotopically-labeled reagent in place of non-isotopically-labeled reagent.

a. Pharmaceutically Acceptable Salts

GPR37 agonists may exist as pharmaceutically acceptable salts. The term "pharmaceutically acceptable salt" refers to salts or zwitterions of the compounds which are water or oil-soluble or dispersible, suitable for treatment of disorders without undue toxicity, irritation, and allergic response, commensurate with a reasonable benefit/risk ratio and effective for their intended use. The salts may be prepared during the final isolation and purification of the compounds or separately by reacting an amino group of the compounds with a suitable acid. For example, a compound may be dissolved in a suitable solvent, such as but not limited to methanol and water and treated with at least one equivalent of an acid, like hydrochloric acid. The resulting salt may precipitate out and be isolated by filtration and dried under reduced pressure. Alternatively, the solvent and excess acid may be removed under reduced pressure to provide a salt. Representative salts include acetate, adipate, alginate, citrate, aspartate, benzoate, benzenesulfonate, bisulfate, butyrate, camphorate, camphorsulfonate, digluconate, glycerophosphate, hemisulfate, heptanoate, hexanoate, formate, isethionate, fumarate, lactate, maleate, methanesulfonate, naphthylenesulfonate, nicotinate, oxalate, pamoate, pectinate, persulfate, 3-phenylpropionate, picrate, oxalate, maleate, pivalate, propionate, succinate, tartrate, trichloroacetate, trifluoroacetate, glutamate, para-toluenesulfonate, undecanoate, hydrochloric, hydrobromic, sulfuric, phosphoric, and the like. The amino groups of the compounds may also be quaternized with alkyl chlorides, bromides and iodides such as methyl, ethyl, propyl, isopropyl, butyl, lauryl, myristyl, stearyl, and the like.

Basic addition salts may be prepared during the final isolation and purification of the disclosed compounds by reaction of a carboxyl group with a suitable base such as the hydroxide, carbonate, or bicarbonate of a metal cation such as lithium, sodium, potassium, calcium, magnesium, or aluminum, or an organic primary, secondary, or tertiary amine. Quaternary amine salts can be prepared, such as those derived from methylamine, dimethylamine, trimethylamine, triethylamine, diethylamine, ethylamine, tributylamine, pyridine, N,N-dimethylaniline, N-methylpiperidine, N-methylmorpholine, dicyclohexylamine, procaine, dibenzylamine, N,N-dibenzylphenethylamine, 1-ephenamine and N,N'-dibenzylethylenediamine, ethylenediamine, ethanolamine, diethanolamine, piperidine, piperazine, and the like.

b. Pharmaceutical Compositions

The GPR37 agonists as detailed herein may be formulated into pharmaceutical compositions accordance with standard techniques well known to those skilled in the pharmaceutical art. The composition may comprise the GPR37 agonist and a pharmaceutically acceptable carrier. The term "pharmaceutically acceptable carrier," as used herein, means a non-toxic, inert solid, semi-solid or liquid filler, diluent, encapsulating material or formulation auxiliary of any type.

The route by which the disclosed GPR37 agonists are administered and the form of the composition will dictate the type of carrier to be used. The pharmaceutical composition may be in a variety of forms, suitable, for example, for systemic administration (e.g., oral, rectal, sublingual, buccal, implants, intranasal, intravaginal, transdermal, intravenous, intraarterial, intratumoral, intraperitoneal, or parenteral) or topical administration (e.g., dermal, pulmonary, nasal, aural, ocular, liposome delivery systems, or iontophoresis). Techniques and formulations may generally be found in "Remington's Pharmaceutical Sciences," (Meade Publishing Co., Easton, Pa.). Pharmaceutical compositions must typically be sterile and stable under the conditions of manufacture and storage. All carriers are optional in the compositions.

Pharmaceutically acceptable carriers include, for example, diluents, lubricants, binders, disintegrants, colorants, flavors, sweeteners, antioxidants, preservatives, glidants, solvents, suspending agents, wetting agents, surfactants, emollients, propellants, humectants, powders, pH adjusting agents, and combinations thereof.

Suitable diluents include, for example, sugars such as glucose, lactose, dextrose, and sucrose; diols such as propylene glycol; calcium carbonate; sodium carbonate; sugar alcohols, such as glycerin; mannitol; sorbitol; cellulose; starch; and gelatin. The amount of diluent(s) in a systemic or topical composition may typically be about 50 to about 90%.

Suitable lubricants include, for example, silica, talc, stearic acid and its magnesium salts and calcium salts, calcium sulfate; and liquid lubricants such as polyethylene glycol and vegetable oils such as peanut oil, cottonseed oil, sesame oil, olive oil, corn oil, and oil of theobroma. The amount of lubricant(s) in a systemic or topical composition may typically be about 5 to about 10%.

Suitable binders include, for example, polyvinyl pyrrolidone; magnesium aluminum silicate; starches such as corn starch and potato starch; gelatin; tragacanth; sucrose; and cellulose and its derivatives, such as sodium carboxymethylcellulose, ethyl cellulose, methylcellulose, microcrystalline cellulose, and hydroxypropyl methylcellulose. The amount of binder(s) in a systemic composition may typically be about 5 to about 50%.

Suitable disintegrants include, for example, agar, alginic acid and the sodium salt thereof, effervescent mixtures, croscarmelose, crospovidone, sodium carboxymethyl starch, sodium starch glycolate, clays, and ion exchange resins. The amount of disintegrant(s) in a systemic or topical composition may typically be about 0.1 to about 10%.

Suitable colorants include, for example, a colorant such as an FD&C dye. When used, the amount of colorant in a systemic or topical composition may typically be about 0.005 to about 0.1%.

Suitable flavors include, for example, menthol, peppermint, and fruit flavors. The amount of flavor(s), when used, in a systemic or topical composition may typically be about 0.1 to about 1.0%.

Suitable sweeteners include, for example, aspartame and saccharin, or a combination thereof. The amount of sweetener(s) in a systemic or topical composition may typically be about 0.001 to about 1%.

Suitable antioxidants include, for example, butylated hydroxyanisole ("BHA"), butylated hydroxytoluene ("BHT"), and vitamin E. The amount of antioxidant(s) in a systemic or topical composition may typically be about 0.1 to about 5%.

Suitable preservatives include, for example, benzalkonium chloride, methyl paraben, and sodium benzoate. The amount of preservative(s) in a systemic or topical composition may typically be about 0.01 to about 5%.

Suitable glidants include, for example, silicon dioxide. The amount of glidant(s) in a systemic or topical composition may typically be about 1 to about 5%.

Suitable solvents include, for example, water, isotonic saline, ethyl oleate, glycerine, castor oils, hydroxylated castor oils, alcohols such as ethanol or isopropanol, methylene chloride, ethylene glycol monoethyl ether, diethylene glycol monobutyl ether, diethylene glycol monoethyl ether, dimethylsulfoxide, dimethyl formamide, tetrahydrofuran, and phosphate buffer solutions, and combinations thereof. The amount of solvent(s) in a systemic or topical composition is typically from about 0 to about 100%, or 0% to about 95%.

Suitable suspending agents include, for example, AVICEL RC-591 (from FMC Corporation of Philadelphia, PA) and sodium alginate. The amount of suspending agent(s) in a systemic or topical composition may typically be about 1 to about 8%.

Suitable surfactants include, for example, lecithin, Polysorbate 80, and sodium lauryl sulfate, and the TWEENS from Atlas Powder Company of Wilmington, Delaware. Suitable surfactants include those disclosed in the C.T.F.A. Cosmetic Ingredient Handbook, 1992, pp. 587-592; Remington's Pharmaceutical Sciences, 15th Ed. 1975, pp. 335-337; and Mccutcheon's Volume 1, Emulsifiers & Detergents, 1994, North American Edition, pp. 236-239. The amount of surfactant(s) in the systemic or topical composition may typically be about 0.1% to about 5%.

Suitable emollients include, for example, stearyl alcohol, glyceryl monoricinoleate, glyceryl monostearate, propane-1,2-diol, butane-1,3-diol, mink oil, cetyl alcohol, isopropyl isostearate, stearic acid, isobutyl palmitate, isocetyl stearate, oleyl alcohol, isopropyl laurate, hexyl laurate, decyl oleate, octadecan-2-ol, isocetyl alcohol, cetyl palmitate, di-n-butyl sebacate, isopropyl myristate, isopropyl palmitate, isopropyl stearate, butyl stearate, polyethylene glycol, triethylene glycol, lanolin, sesame oil, coconut oil, arachis oil, castor oil, acetylated lanolin alcohols, petroleum, mineral oil, butyl myristate, isostearic acid, palmitic acid, isopropyl linoleate, lauryl lactate, myristyl lactate, decyl oleate, myristyl myristate, and combinations thereof. Specific emollients for skin include stearyl alcohol and polydimethylsiloxane. The amount of emollient(s) in a skin-based topical composition may typically be about 5% to about 95%.

Suitable propellants include, for example, propane, butane, isobutane, dimethyl ether, carbon dioxide, nitrous oxide, and combinations thereof. The amount of propellant in a topical composition may be about 0% to about 95%.

Suitable humectants include, for example, glycerin, sorbitol, sodium 2-pyrrolidone-5-carboxylate, soluble collagen, dibutyl phthalate, gelatin, and combinations thereof. The amount of humectant in a topical composition may be about 0% to about 95%.

Suitable powders include, for example, beta-cyclodextrins, hydroxypropyl cyclodextrins, chalk, talc, fullers earth, kaolin, starch, gums, colloidal silicon dioxide, sodium polyacrylate, tetra alkyl ammonium smectites, trialkyl aryl ammonium smectites, chemically-modified magnesium aluminum silicate, organically-modified Montmorillonite clay, hydrated aluminum silicate, fumed silica, carboxyvinyl polymer, sodium carboxymethyl cellulose, ethylene glycol monostearate, and combinations thereof. The amount of powder(s) in a topical composition may typically be 0% to 95%.

Suitable pH adjusting additives include, for example, HCl or NaOH in amounts sufficient to adjust the pH of a topical pharmaceutical composition.

In some embodiments, the pharmaceutically acceptable carrier is a sugar such as lactose, glucose, and sucrose. In some embodiments, the pharmaceutically acceptable carrier is a starch such as, for example, corn starch and potato starch. In some embodiments, the pharmaceutically acceptable carrier is cellulose and its derivatives such as, but not limited to, sodium carboxymethyl cellulose, ethyl cellulose and cellulose acetate. In some embodiments, the pharmaceutically acceptable carrier is powdered tragacanth, malt, gelatin, or talc. In some embodiments, the pharmaceutically acceptable carrier is an excipient such as, but not limited to, cocoa butter and suppository waxes. In some embodiments, the pharmaceutically acceptable carrier is oil such as, but not limited to, peanut oil, cottonseed oil, safflower oil, sesame oil, olive oil, corn oil and soybean oil. In some embodiments, the pharmaceutically acceptable carrier is a glycol, such as propylene glycol. In some embodiments, the pharmaceutically acceptable carrier is an ester such as, but not limited to, ethyl oleate and ethyl laurate. In some embodiments, the pharmaceutically acceptable carrier is an agar. In some embodiments, the pharmaceutically acceptable carrier is a buffering agent such as, but not limited to, magnesium hydroxide and aluminum hydroxide. In some embodiments, the pharmaceutically acceptable carrier is alginic acid, pyrogen-free water, isotonic saline, Ringer's solution, ethyl alcohol, or a phosphate buffer solution. In some embodiments, the pharmaceutically acceptable carrier is a non-toxic compatible lubricant such as, but not limited to, sodium lauryl sulfate and magnesium stearate.

Compositions for oral administration can have various dosage forms. For example, solid forms include tablets, capsules, granules, and bulk powders. Tablets can be compressed, tablet triturates, enteric-coated, sugar-coated, film-coated, or multiple-compressed. Tablets typically include an active component, and a carrier comprising ingredients selected from diluents, lubricants, binders, disintegrants, colorants, flavors, sweeteners, glidants, and combinations thereof. Capsules (including implants, time release, and sustained release formulations) typically include a compound, and a carrier including one or more diluents disclosed above in a capsule comprising gelatin. Granules typically comprise a compound, and preferably glidants such as silicon dioxide to improve flow characteristics. Implants can be of the biodegradable or the non-biodegradable type.

Compositions for oral administration can have solid forms. Solid oral compositions may be coated by conventional methods, typically with pH or time-dependent coatings, such that a compound is released in the gastrointestinal tract in the vicinity of the desired application, or at various points and times to extend the desired action. The coatings typically include one or more components selected from the group consisting of cellulose acetate phthalate, polyvinyl acetate phthalate, hydroxypropyl methyl cellulose phthalate, ethyl cellulose, EUDRAGIT® coatings (available from Evonik Industries of Essen, Germany), waxes, and shellac.

Compositions for oral administration can have liquid forms. For example, suitable liquid forms include aqueous solutions, emulsions, suspensions, solutions reconstituted from non-effervescent granules, suspensions reconstituted from non-effervescent granules, effervescent preparations reconstituted from effervescent granules, elixirs, tinctures, syrups, and the like. Liquid orally administered compositions typically include a compound and a carrier, namely, a carrier selected from diluents, colorants, flavors, sweeteners, preservatives, solvents, suspending agents, and surfactants. Peroral liquid compositions preferably include one or more ingredients selected from colorants, flavors, and sweeteners.

Compositions for topical administration can be applied locally to the skin and may be in any form including solids, solutions, oils, creams, ointments, gels, lotions, shampoos, leave-on and rinse-out hair conditioners, milks, cleansers, moisturizers, sprays, skin patches, and the like. The carrier of the topical composition preferably aids penetration of the compound into the skin. In the topical compositions, the carrier includes a topical carrier. Suitable topical carriers can include one or more ingredients selected from phosphate buffered saline, isotonic water, deionized water, monofunctional alcohols, symmetrical alcohols, aloe vera gel, allantoin, glycerin, vitamin A and E oils, mineral oil, propylene glycol, PPG-2 myristyl propionate, dimethyl isosorbide, castor oil, combinations thereof, and the like. More particularly, carriers for skin applications may include propylene glycol, dimethyl isosorbide, and water, and even more particularly, phosphate buffered saline, isotonic water, deionized water, monofunctional alcohols, and symmetrical alcohols. The carrier of a topical composition may further include one or more ingredients selected from emollients, propellants, solvents, humectants, thickeners, powders, fragrances, pigments, and preservatives, all of which are optional.

Although the amounts of components in the compositions may vary depending on the type of composition prepared, in general, systemic compositions may include 0.01% to 50% of a GPR37 agonist and 50% to 99.99% of one or more carriers. Compositions for parenteral administration may typically include 0.1% to 10% of a GPR37 agonist and 90% to 99.9% of one or more carriers. Oral dosage forms may include, for example, at least about 5%, or about 25% to about 50% of a GPR37 agonist. The oral dosage compositions may include about 50% to about 95% of carriers, or from about 50% to about 75% of carriers. The amount of the carrier employed in conjunction with a disclosed GPR37 agonist is sufficient to provide a practical quantity of composition for administration per unit dose of the compound. Techniques and compositions for making dosage forms useful in the methods of this invention are described in the following references: Modern Pharmaceutics, Chapters 9 and 10, Banker & Rhodes, eds. (1979); Lieberman et al., Pharmaceutical Dosage Forms: Tablets (1981); and Ansel, Introduction to Pharmaceutical Dosage Forms, 2nd Ed., (1976).

c. Administration

The GPR37 agonists as detailed herein, or the pharmaceutical compositions comprising the same, may be administered to a subject. A composition may comprise the GPR37 agonist. The GPR37 agonist can be formulated into a composition and administered in dosages and by techniques well known to those skilled in the medical arts taking into consideration such factors as the age, sex, weight, and condition of the particular subject, and the route of administration.

The GPR37 agonist can be administered prophylactically or therapeutically. In prophylactic administration, the GPR37 agonist can be administered in an amount sufficient to induce a response. In therapeutic applications, the GPR37 agonists are administered to a subject in need thereof in an amount sufficient to elicit a therapeutic effect. The GPR37 agonist may be administered in a therapeutically effective amount.

For example, a therapeutically effective amount of a GPR37 agonist or a pharmaceutically acceptable salt thereof, may be about 1 mg/kg to about 1000 mg/kg, about 5 mg/kg to about 950 mg/kg, about 10 mg/kg to about 900 mg/kg, about 15 mg/kg to about 850 mg/kg, about 20 mg/kg to about 800 mg/kg, about 25 mg/kg to about 750 mg/kg, about 30 mg/kg to about 700 mg/kg, about 35 mg/kg to about 650 mg/kg, about 40 mg/kg to about 600 mg/kg, about 45 mg/kg to about 550 mg/kg, about 50 mg/kg to about 500 mg/kg, about 55 mg/kg to about 450 mg/kg, about 60 mg/kg to about 400 mg/kg, about 65 mg/kg to about 350 mg/kg, about 70 mg/kg to about 300 mg/kg, about 75 mg/kg to about 250 mg/kg, about 80 mg/kg to about 200 mg/kg, about 85 mg/kg to about 150 mg/kg, and about 90 mg/kg to about 100 mg/kg.

The GPR37 agonist can be administered by methods well known in the art as described in Donnelly et al. (*Ann. Rev. Immunol.* 1997, 15, 617-648); Felgner et al. (U.S. Pat. No. 5,580,859, issued Dec. 3, 1996); Felgner (U.S. Pat. No. 5,703,055, issued Dec. 30, 1997); and Carson et al. (U.S. Pat. No. 5,679,647, issued Oct. 21, 1997), the contents of all of which are incorporated herein by reference in their entirety. The GPR37 agonist can be complexed to particles or beads that can be administered to an individual, for example, using a vaccine gun. One skilled in the art would know that the choice of a pharmaceutically acceptable carrier, including a physiologically acceptable compound, depends, for example, on the route of administration.

The GPR37 agonist can be delivered via a variety of routes. Typical delivery routes include parenteral administration, e.g., intradermal, intramuscular or subcutaneous delivery. Other routes include oral administration, intranasal, intravaginal, transdermal, intravenous, intraarterial, intratumoral, intraperitoneal, and epidermal routes. In some embodiments, the GPR37 agonist is administered intravenously, intraarterially, or intraperitoneally to the subject.

The GPR37 agonist can be a liquid preparation such as a suspension, syrup, or elixir. The GPR37 agonist can be incorporated into liposomes, microspheres, or other polymer matrices (such as by a method described in Felgner et al., U.S. Pat. No. 5,703,055; Gregoriadis, Liposome Technology, Vols. I to III (2nd ed. 1993), the contents of which are incorporated herein by reference in their entirety). Liposomes can consist of phospholipids or other lipids, and can be nontoxic, physiologically acceptable and metabolizable carriers that are relatively simple to make and administer.

In some embodiments, the GPR37 agonist is administered in a controlled release formulation. The GPR37 agonist may be released into the circulation, for example. In some embodiments, the GPR37 agonist may be released over a period of at least about 1 day, at least about 2 days, at least about 3 days, at least about 4 days, at least about 5 days, at least about 6 days, at least about 7 days, at least about 1 week, at least about 1.5 weeks, at least about 2 weeks, at least about 2.5 weeks, at least about 3.5 weeks, at least about 4 weeks, or at least about 1 month.

5. Methods a. Methods of Treating a Disease or Disorder

Provided herein are methods of treating a disease or disorder in a subject in need thereof. The method may include administering to the subject a therapeutically effective amount of a GPR37 agonist. In some embodiments, the disease or disorder is selected from inflammation, inflammatory pain, chronic pain, viral infection, bacterial infection, malaria, sepsis, or a combination thereof. In some embodiments, the phagocytosis of macrophages is increased. The phagocytosis of macrophages in the peripheral nervous system may be increased. The phagocytosis of macrophages may be increased in at least one of dorsal root ganglia, skin, blood, or peritoneal space, or a combination thereof. In some embodiments, phagocytosis of macrophages in the central nervous system is increased. In some embodiments, intracellular calcium influx is increased. In some embodiments, expression of pro-inflammatory cytokines in macrophages is decreased. In some embodiments, expression of anti-inflammatory cytokines in macrophages is increased.

b. Methods of Reducing the Duration of Inflammation

Provided herein are methods of reducing the duration of inflammation in a subject in need thereof. The method may include administering to the subject a therapeutically effective amount of a GPR37 agonist. In some embodiments, the duration of inflammation in the subject is decreased by at least about 25%. In some embodiments, the phagocytosis of macrophages is increased. The phagocytosis of macrophages in the peripheral nervous system may be increased. The phagocytosis of macrophages may be increased in at least one of dorsal root ganglia, skin, blood, or peritoneal space, or a combination thereof. In some embodiments, phagocytosis of macrophages in the central nervous system is increased. In some embodiments, intracellular calcium influx is increased. In some embodiments, expression of pro-inflammatory cytokines in macrophages is decreased. In some embodiments, expression of anti-inflammatory cytokines in macrophages is increased.

c. Methods of Increasing Phagocytosis of Macrophages

Provided herein are methods of increasing phagocytosis of macrophages in a subject in need thereof. The method may include administering to the subject a therapeutically effective amount of a GPR37 agonist. The phagocytosis of macrophages in the peripheral nervous system may be increased. The phagocytosis of macrophages may be increased in at least one of dorsal root ganglia, skin, blood, or peritoneal space, or a combination thereof. In some embodiments, phagocytosis of macrophages in the central nervous system is increased. In some embodiments, intracellular calcium influx is increased. In some embodiments, expression of pro-inflammatory cytokines in macrophages is decreased. In some embodiments, expression of anti-inflammatory cytokines in macrophages is increased.

6. Examples

Example 1

Materials and Methods

Reagents. NPD1/PD1 and RvE1 were gifts from Resolvyx Pharmaceutical Inc (Cambridge, MA). We purchased pHrodo® Red Zymosan Bioparticles® Conjugate from Thermo Scientific (Catalog: P35364), TX14 and anexin 1 from Anaspec. RvD1, DHA, EPA, RvD2, and lipoxin A were from Cayman. We also purchased LY294002 from Selleckchem, U0126 and IL-10 neutralizing antibody from Sigma, and BAPTA-AM, Fura2-AM, and Flou4-AM from Thermo Scientific. Clodronate-liposomes were purchased from ClodronateLiposomes.com.

Animals. C57BL/6 mice and Gpr37 knockout (B6.129P2-Gpr37tm1Dgen/J, Stock No: 005806) mice were purchased from the Jackson laboratory and maintained at Duke animal facility. Adult CD1 mice (males, 8-10 weeks) mice were purchased from Charles River. Adult male mice were used for behavioral and biochemical studies. All the animal procedures were conducted in accordance with the National Institutes of Health Guide for the Care and Use of Laboratory Animals. Animals were housed under a 12-hour light/dark cycle with food and water available ad libitum. No statistical method was used to predetermine sample size. No randomization was applied to the animal experiments. Sample sizes were estimated based on our previous studies for similar types of behavioral and biochemical analyses. The numbers of mice used in different experiments were summarized in TABLE 1.

TABLE 1

Number of animals used in each experiment and figure.

Figure 1B:
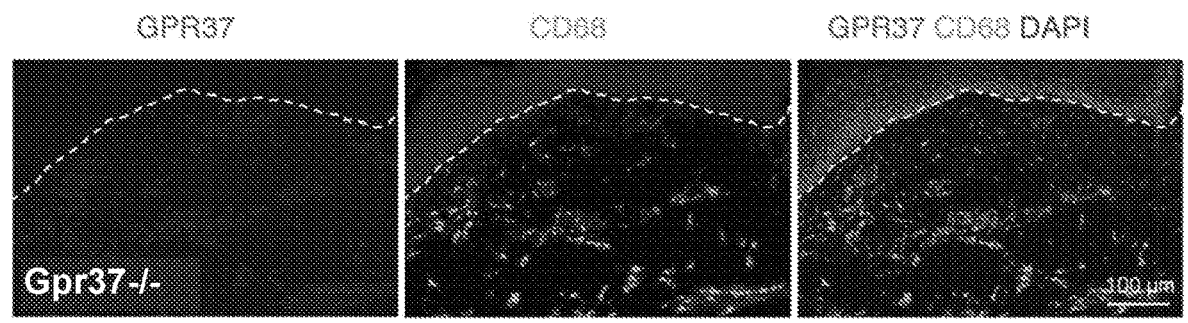
Figure 1C:
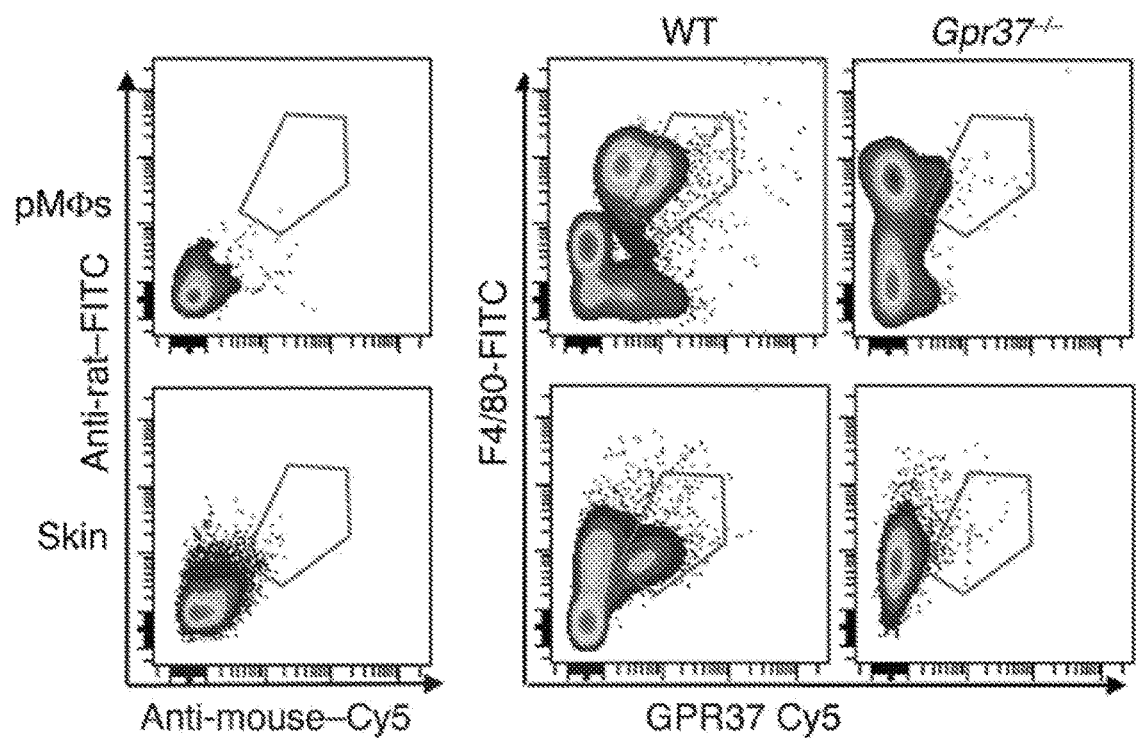
Figure 1D:
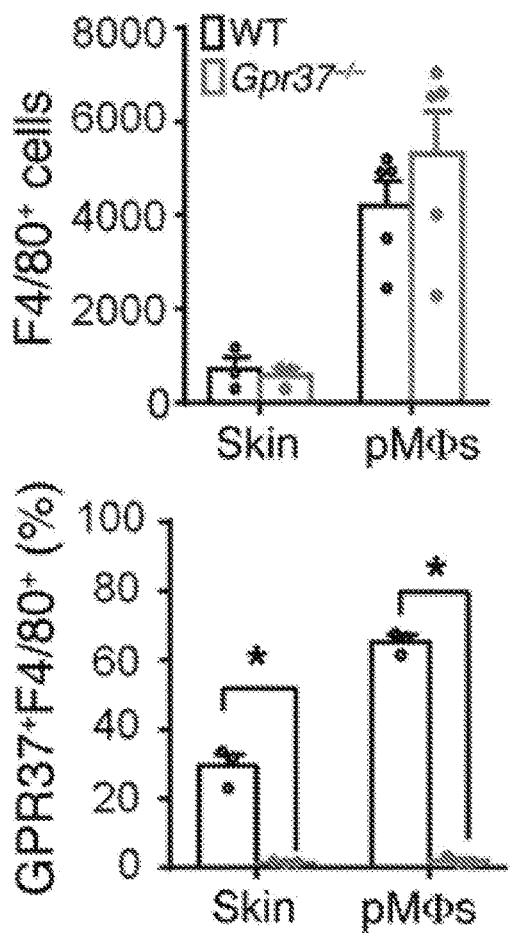
Figures 1E, 1F:
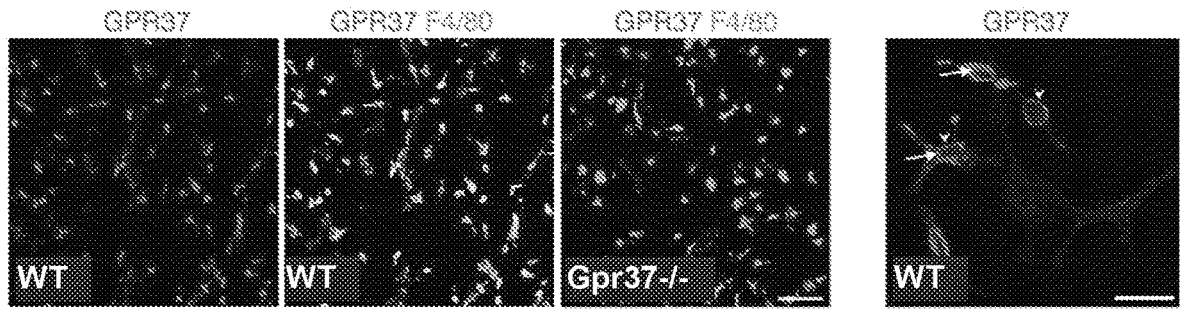
Figure 1G:
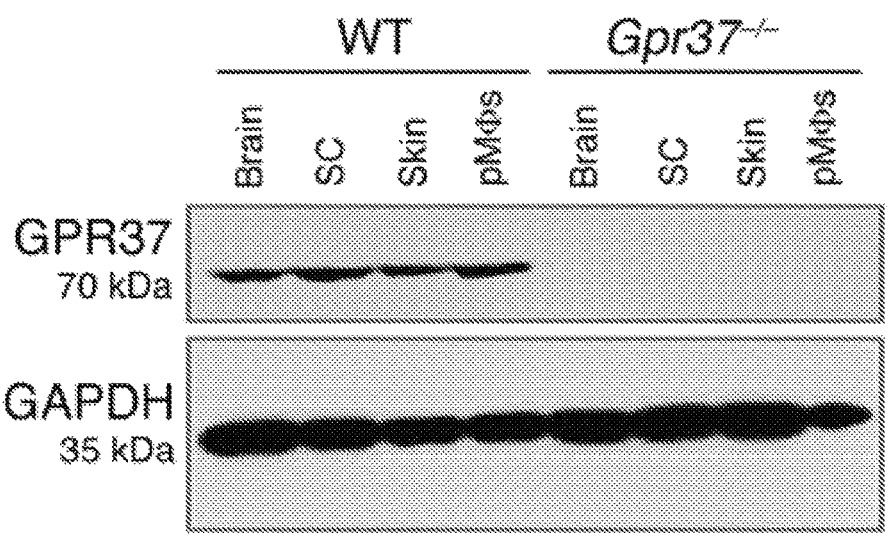
Figure 1H:
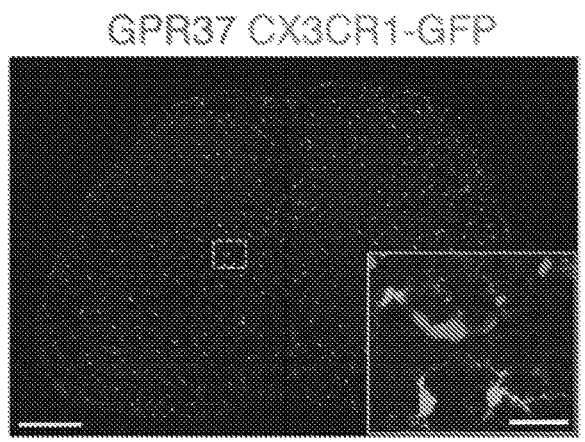
Figure 1I:
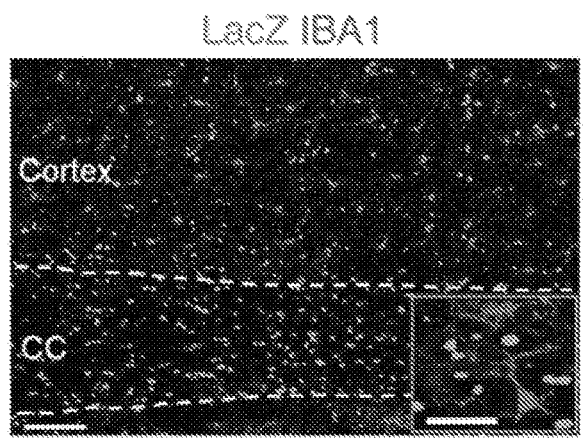
Figure 2F:
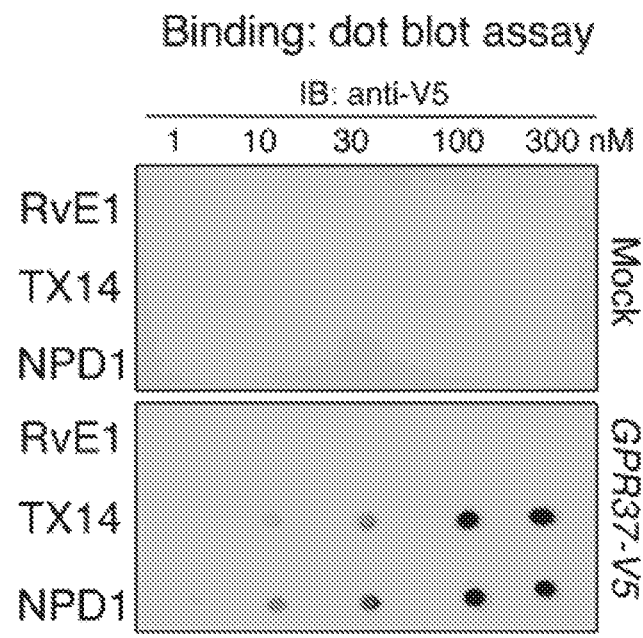
Figure 2G:
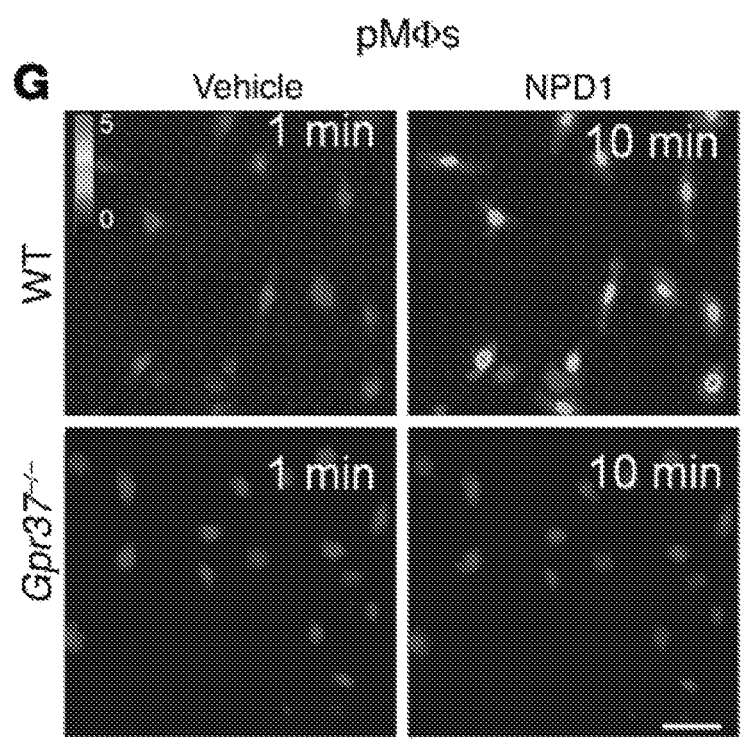
Figure 2H:
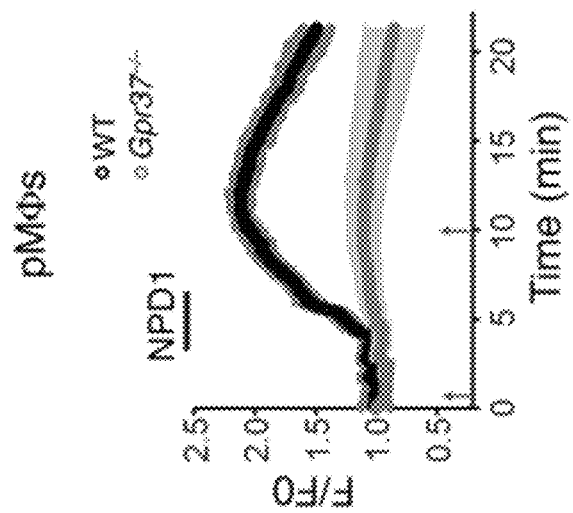
Figure 3A:
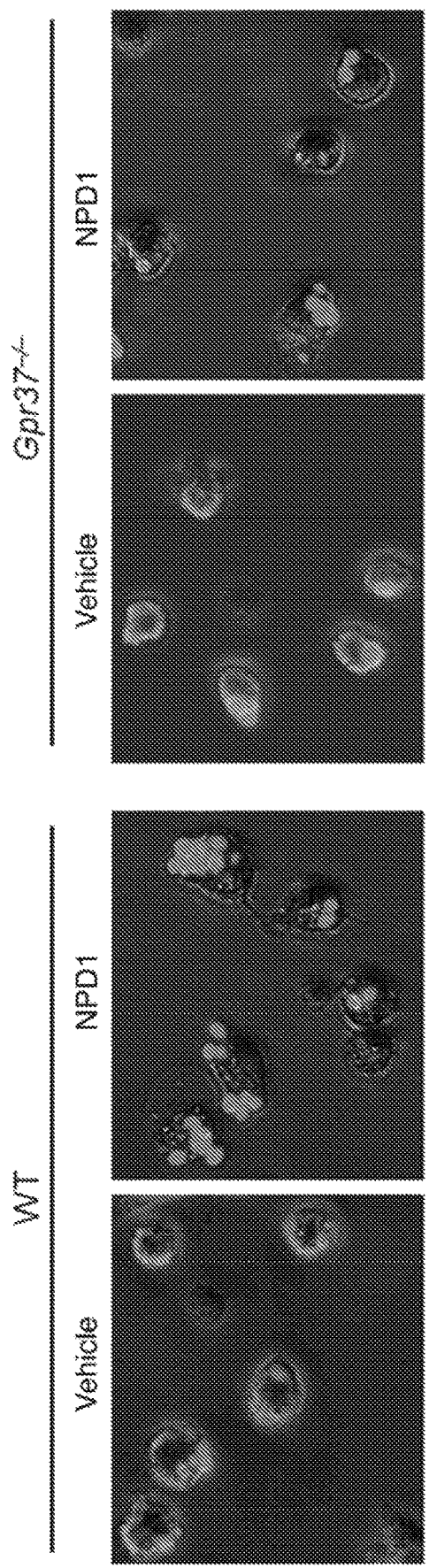
FIG. 3A-FIG. 3D. NPD1 enhances macrophage phagocytic activity in vitro via GPR37.
Figure 3B:
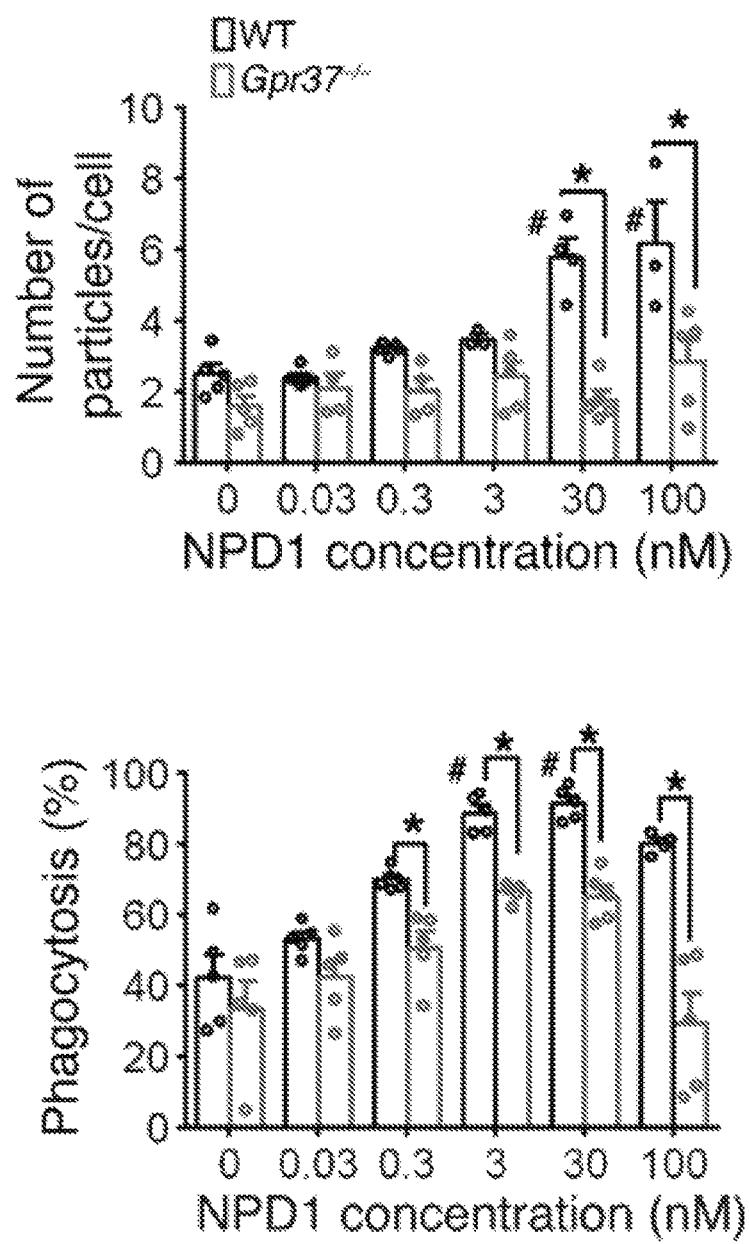
Figure 3C:
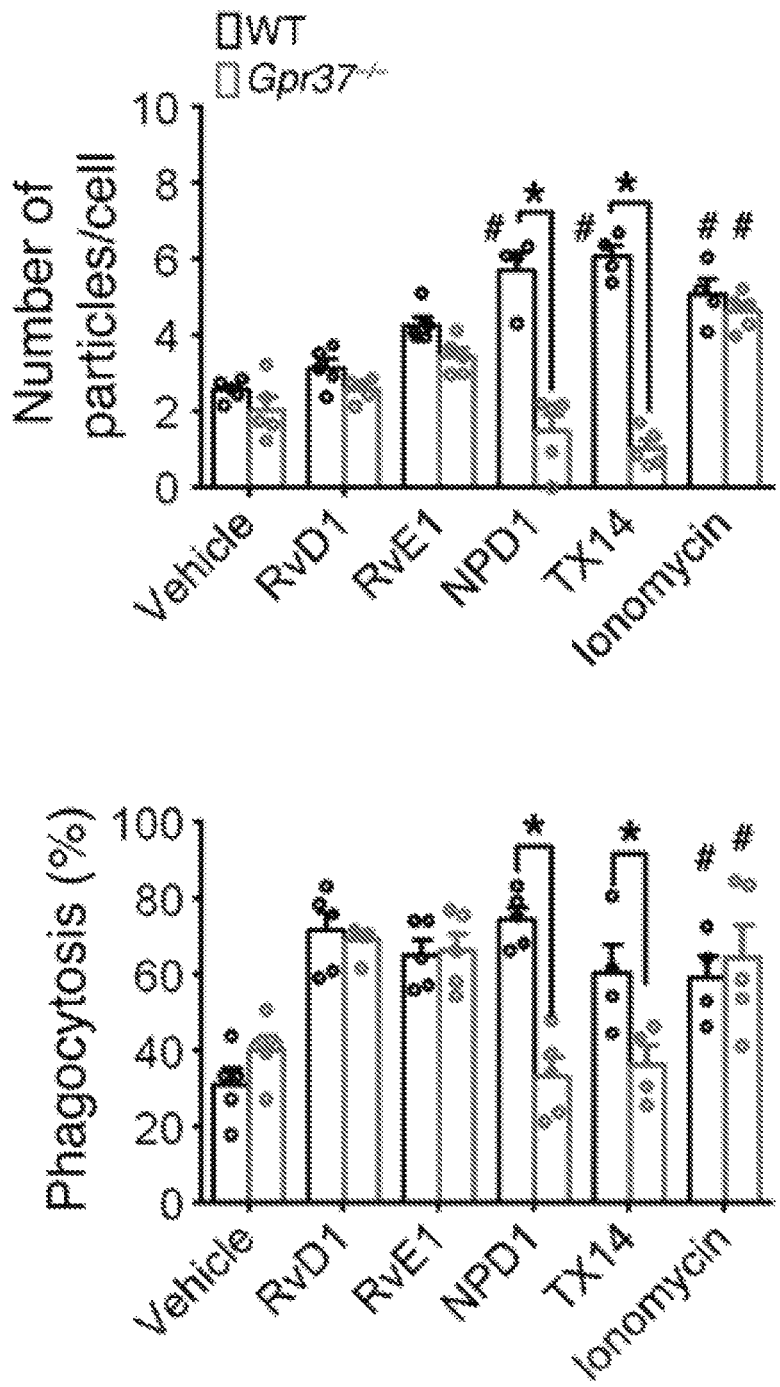
Figure 3D:
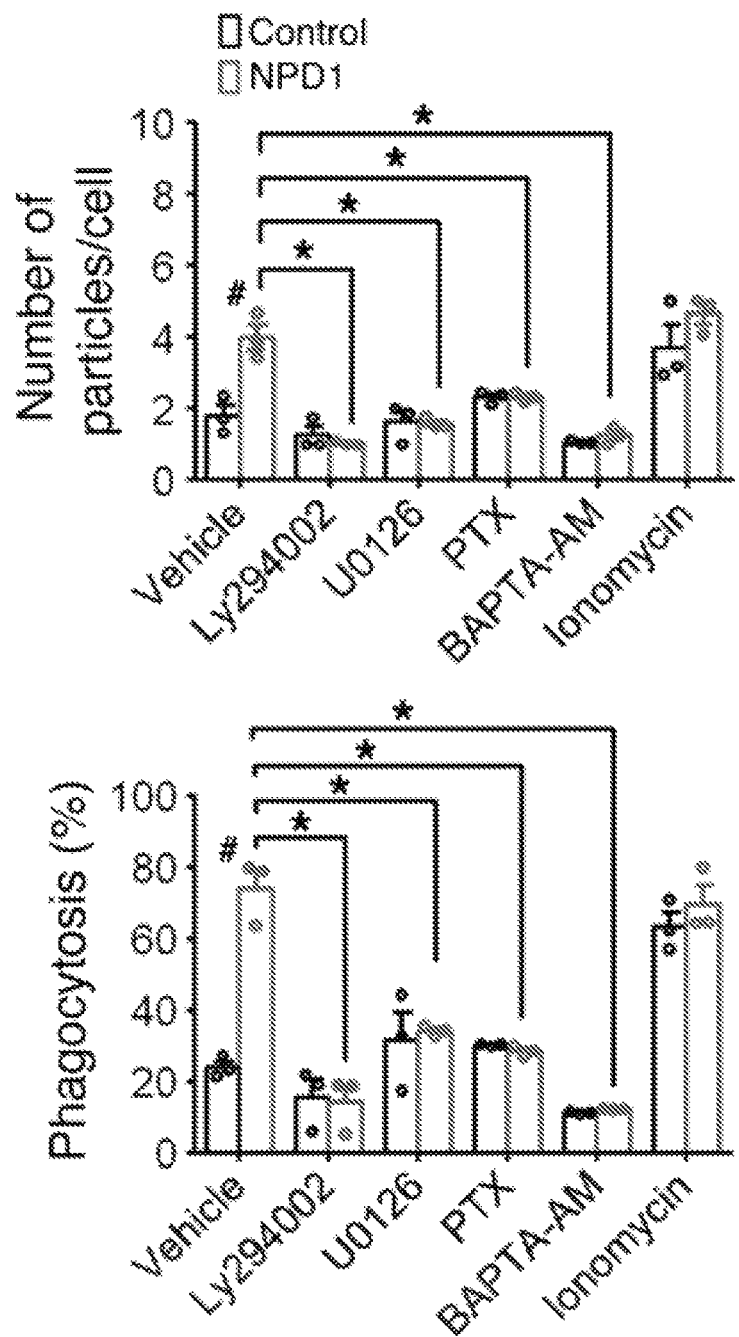
Figure 4A:
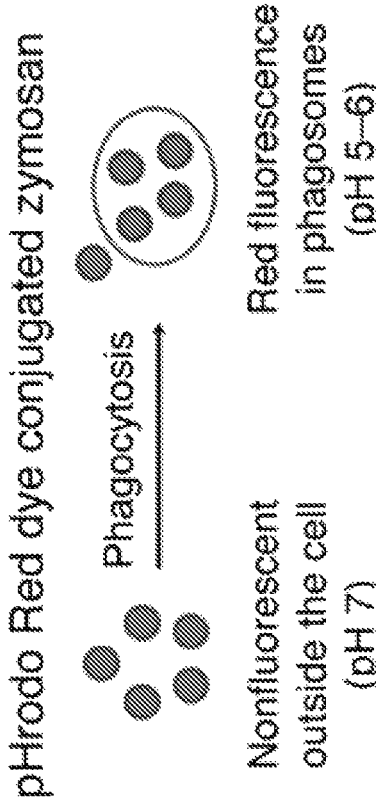
FIG. 4A-FIG. 4I. GPR37 is necessary for macrophage phagocytosis in inflamed hindpaw skin.
Figure 4B:
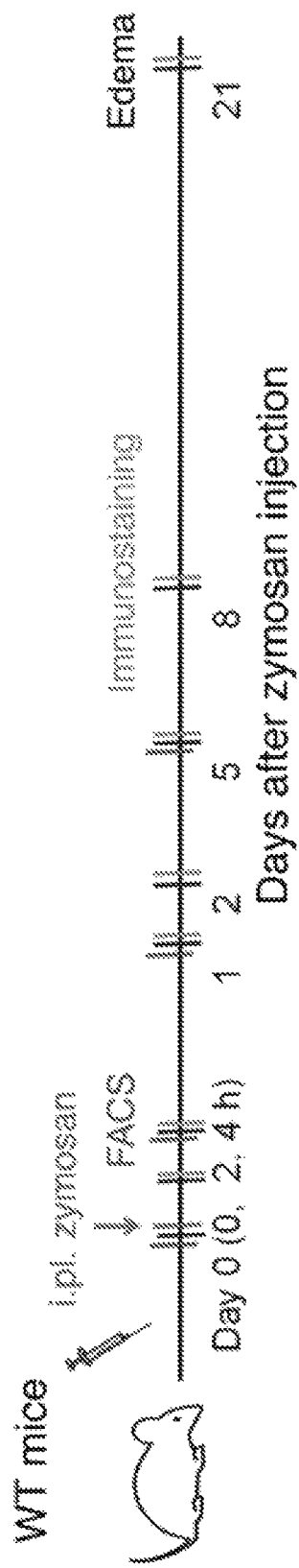
Figure 4C:
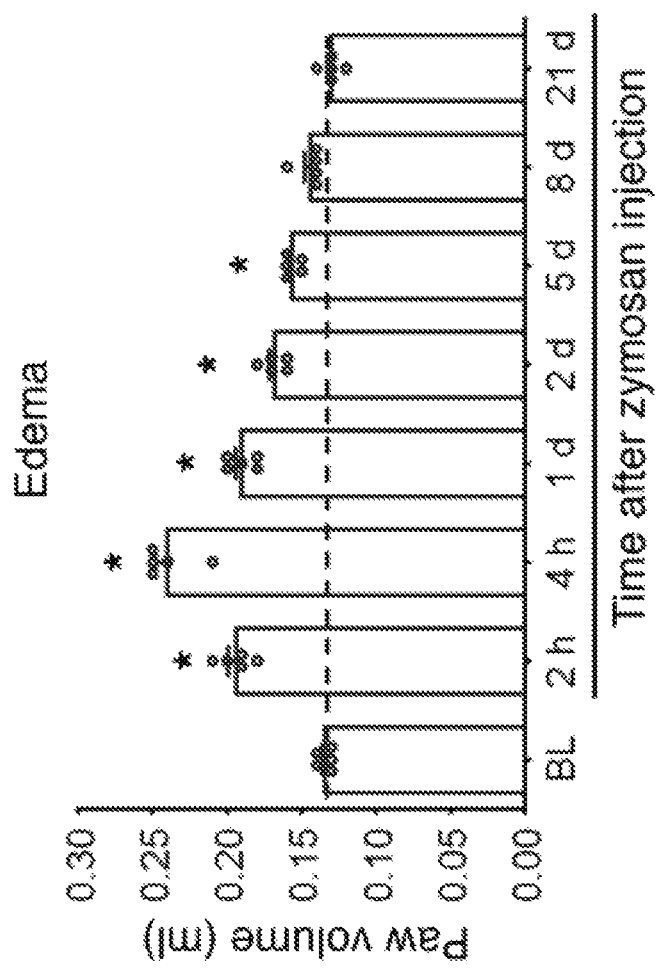
Figure 4D:
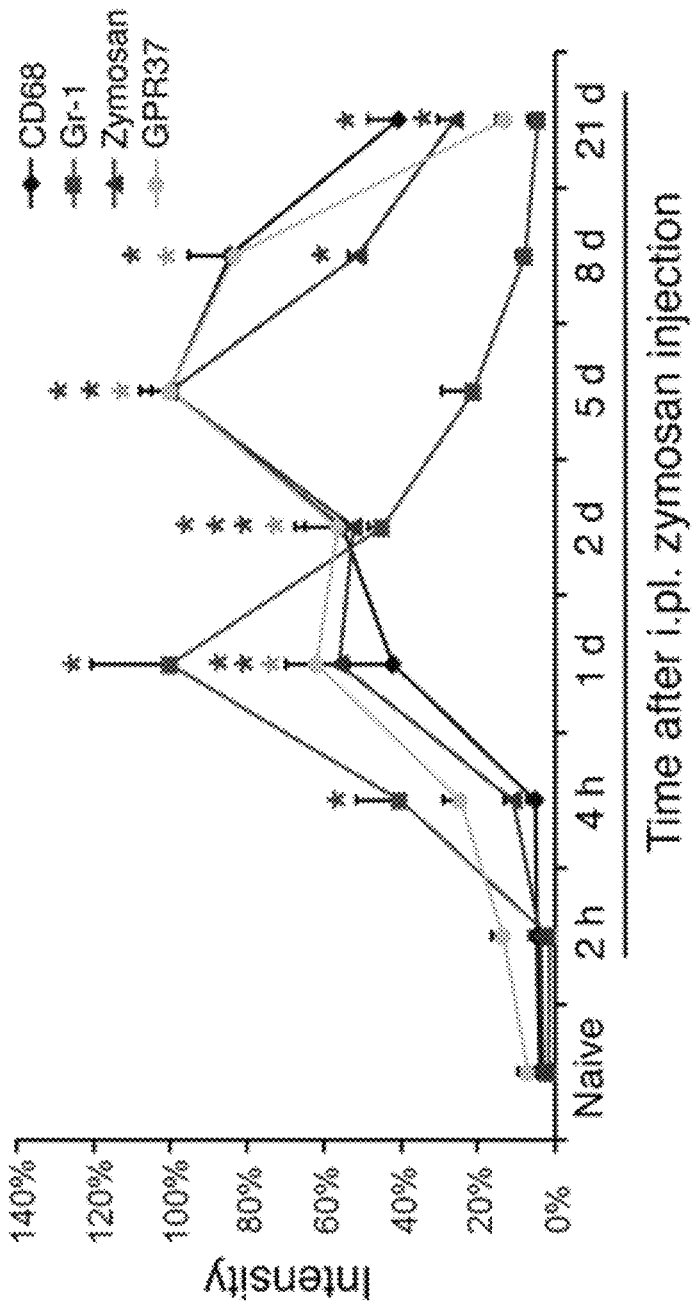
Figure 4E:
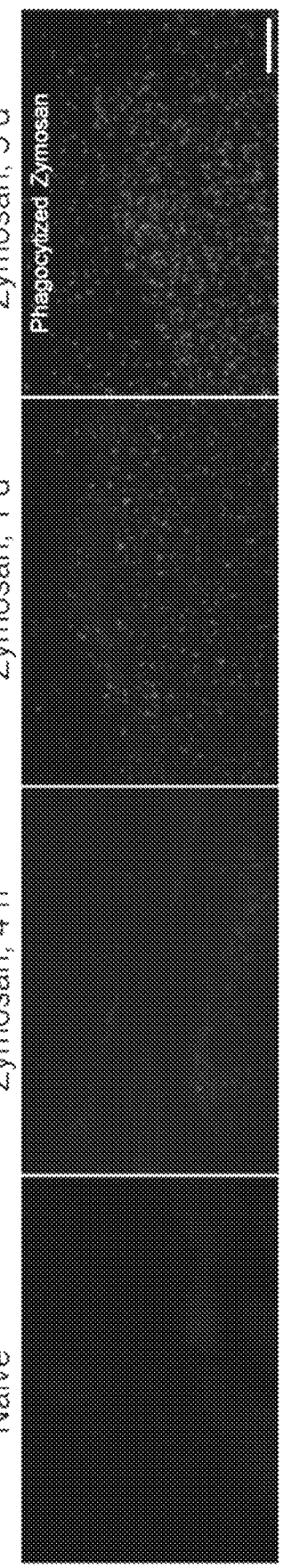
Figure 4F:
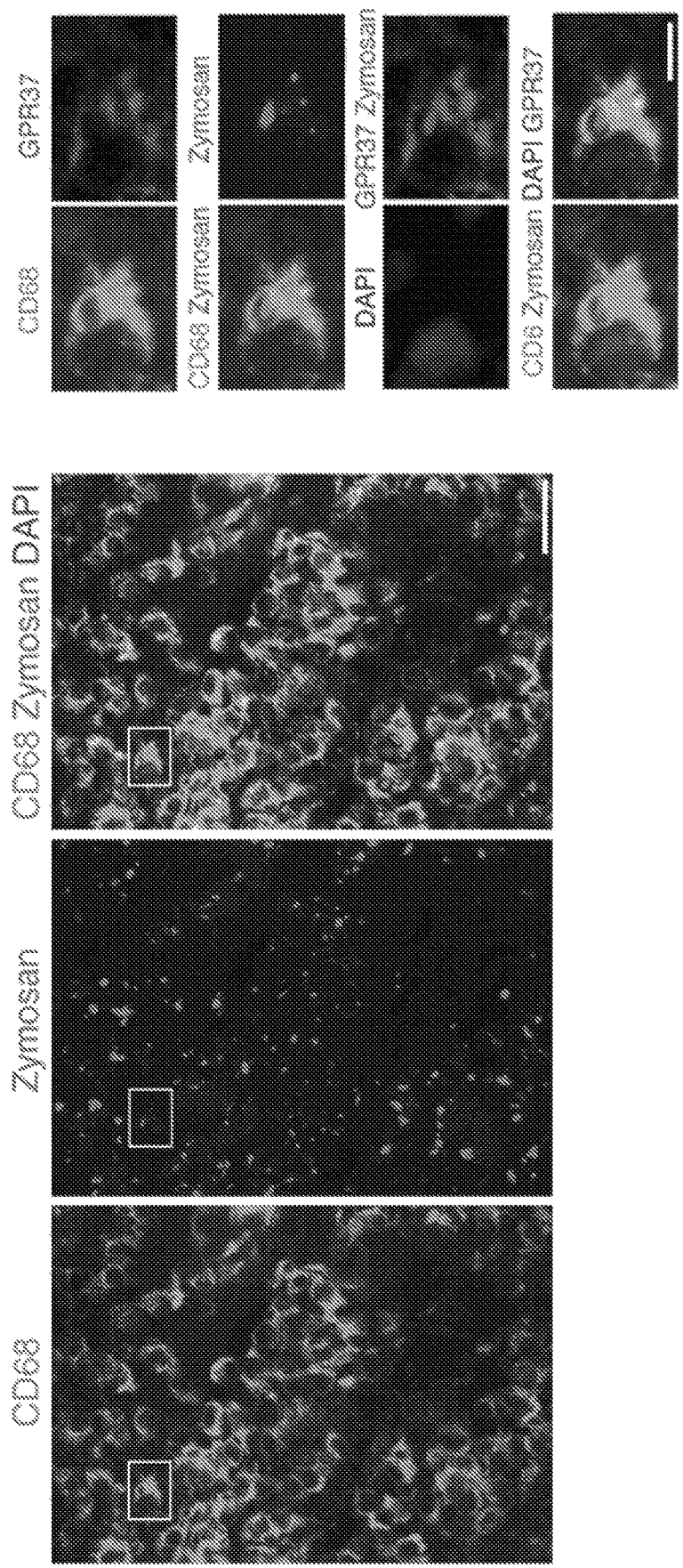
Figure 4G:
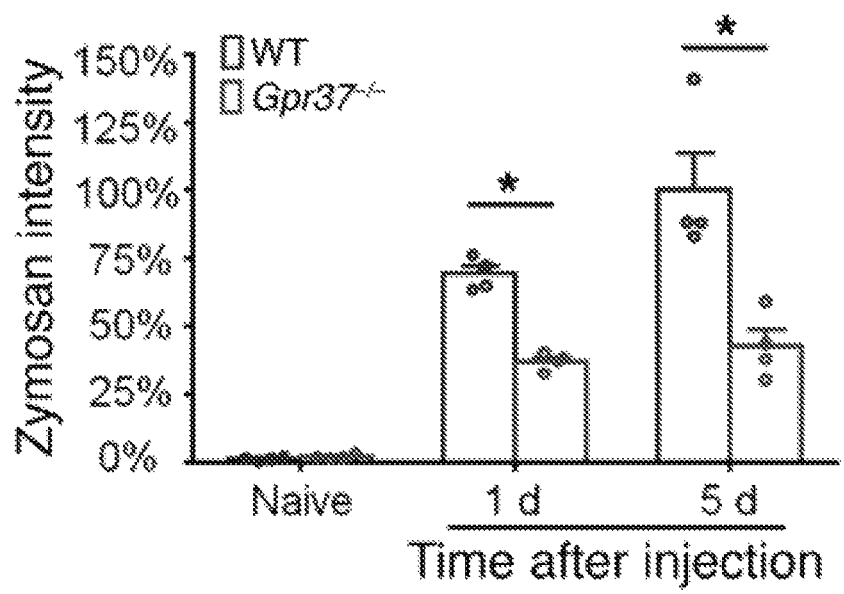
Figure 5B:
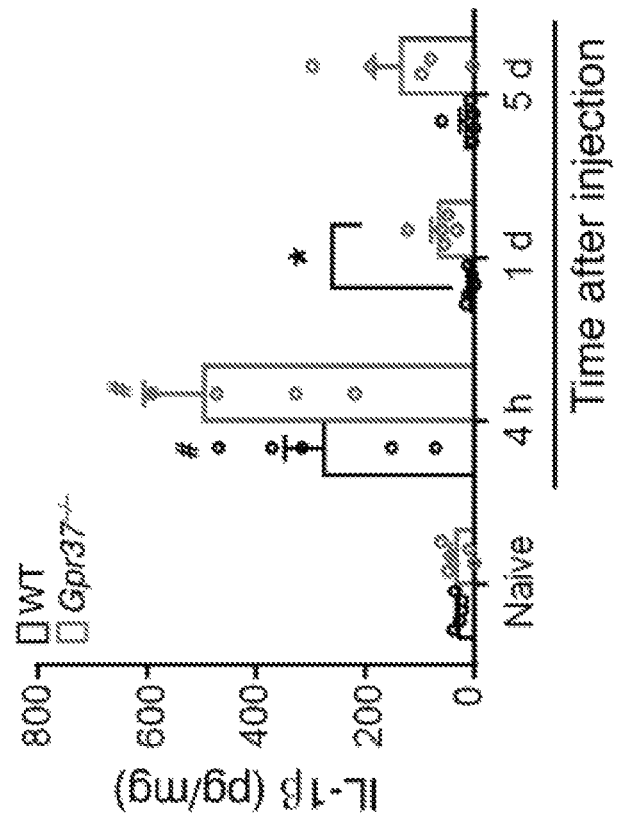
FIG. 5A-FIG. 5F. GPR37 is required for regulating cytokine expression in inflamed skin. mRNA expression (revealed by qRT-PCR, FIG. 5A, FIG. 5C, FIG. 5E) and protein expression (revealed by ELISA, FIG. 5B, FIG. 5D, FIG. 5F) of pro-inflammatory cytokine IL-1β and anti-inflammatory cytokines IL-10 and TGF-β in non-inflamed and inflamed skins of WT and Gpr37$^{-/-}$ mice. mRNA expression level is normalized with Gapdh mRNA. *$P<0.05$, vs KO; $^{\#}P<0.05$, vs. naive, Two-Way ANOVA; n=3~5 mice/group. All the data are mean±SEM.
Figure 5A:
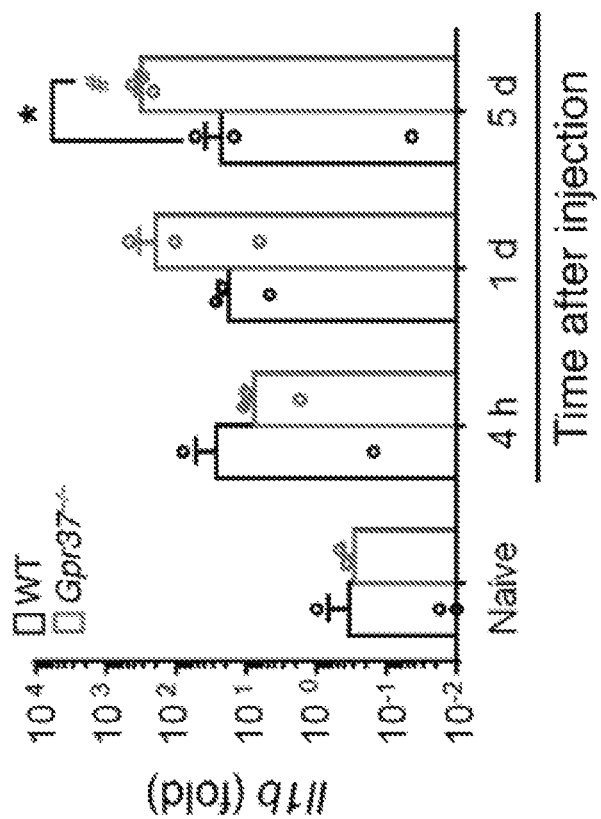
Figure 5D:
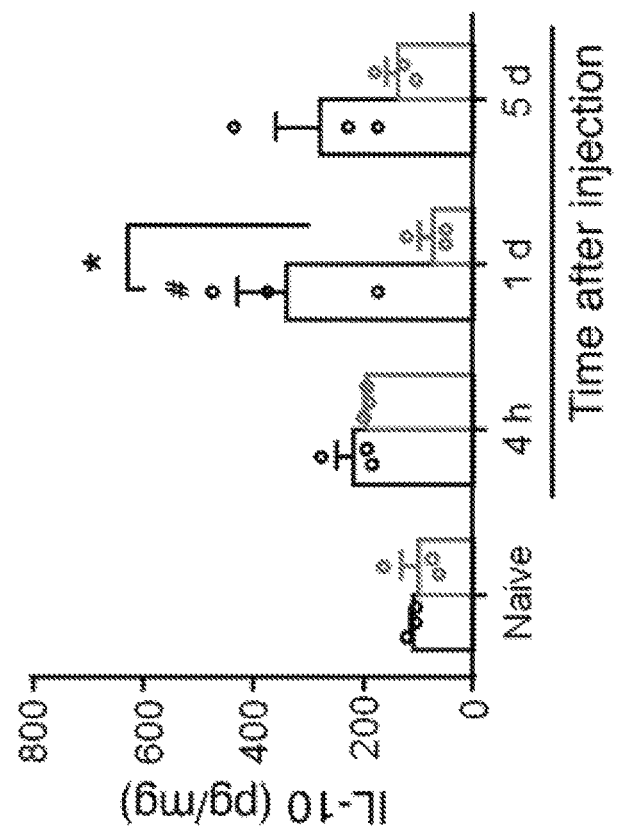
Figure 5C:
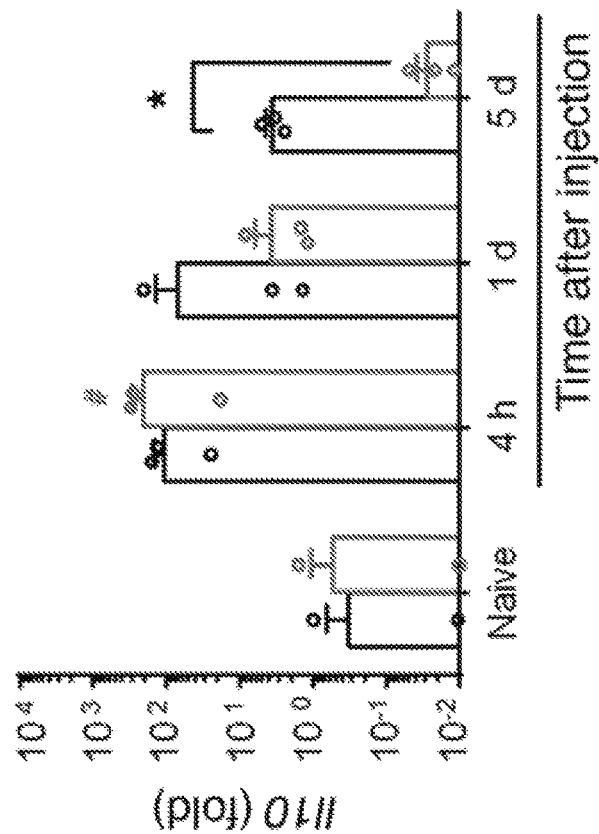
Figure 5E:
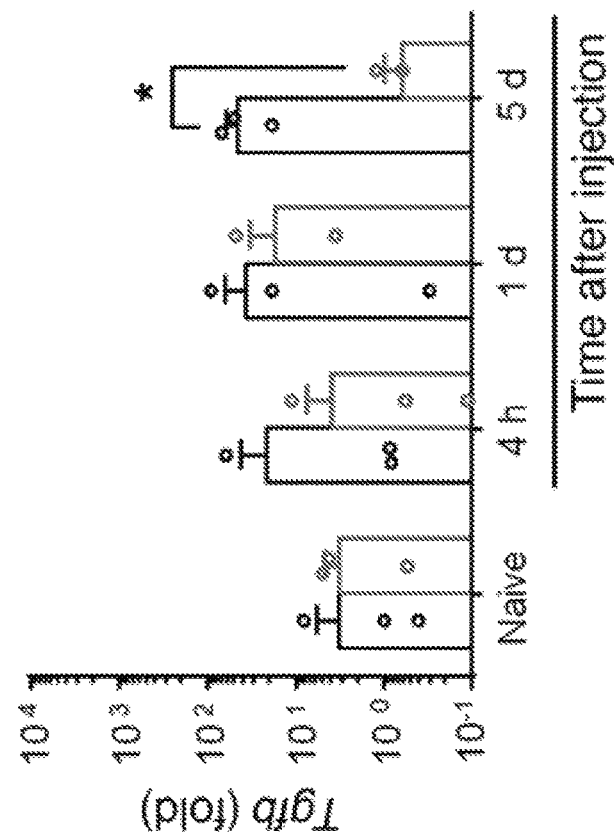
Figure 5F:
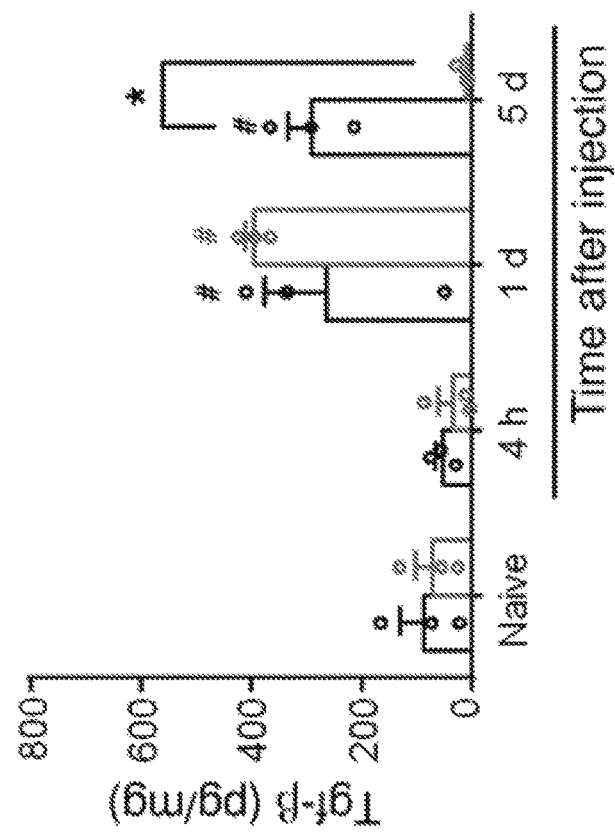
Figure 6A:
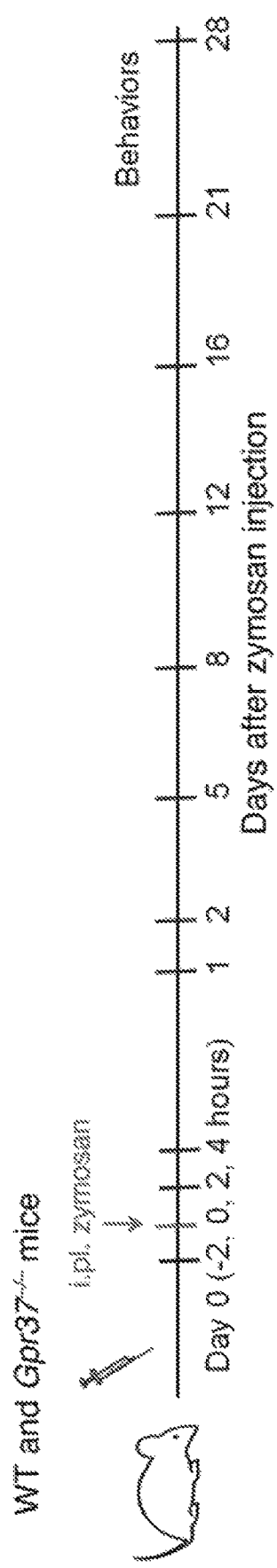
Figure 6B:
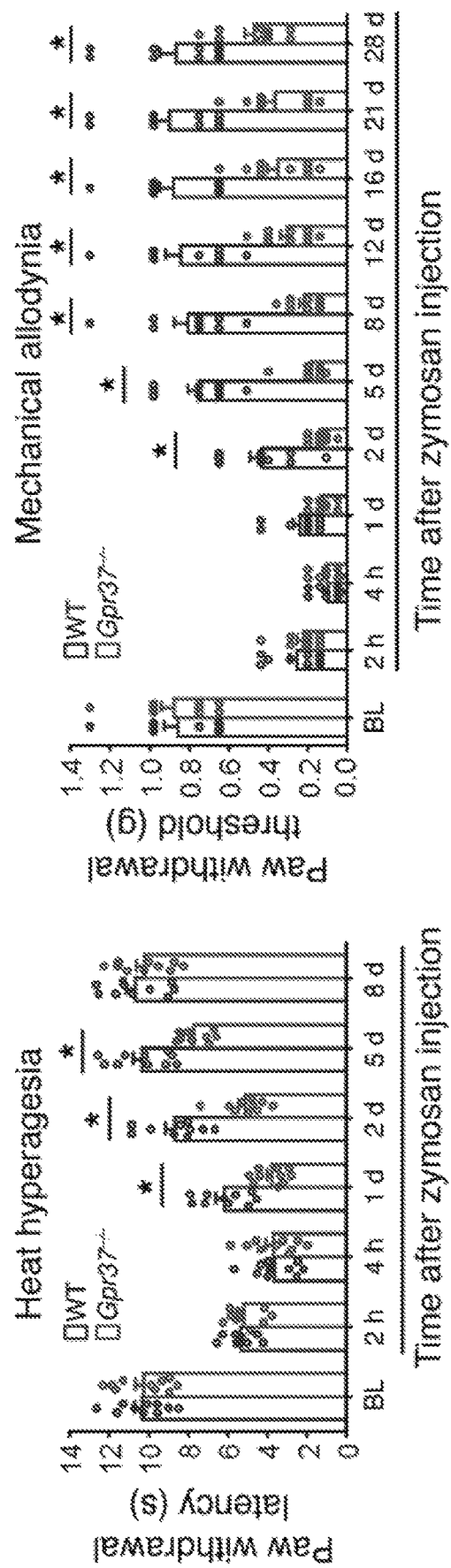
Figure 6C:
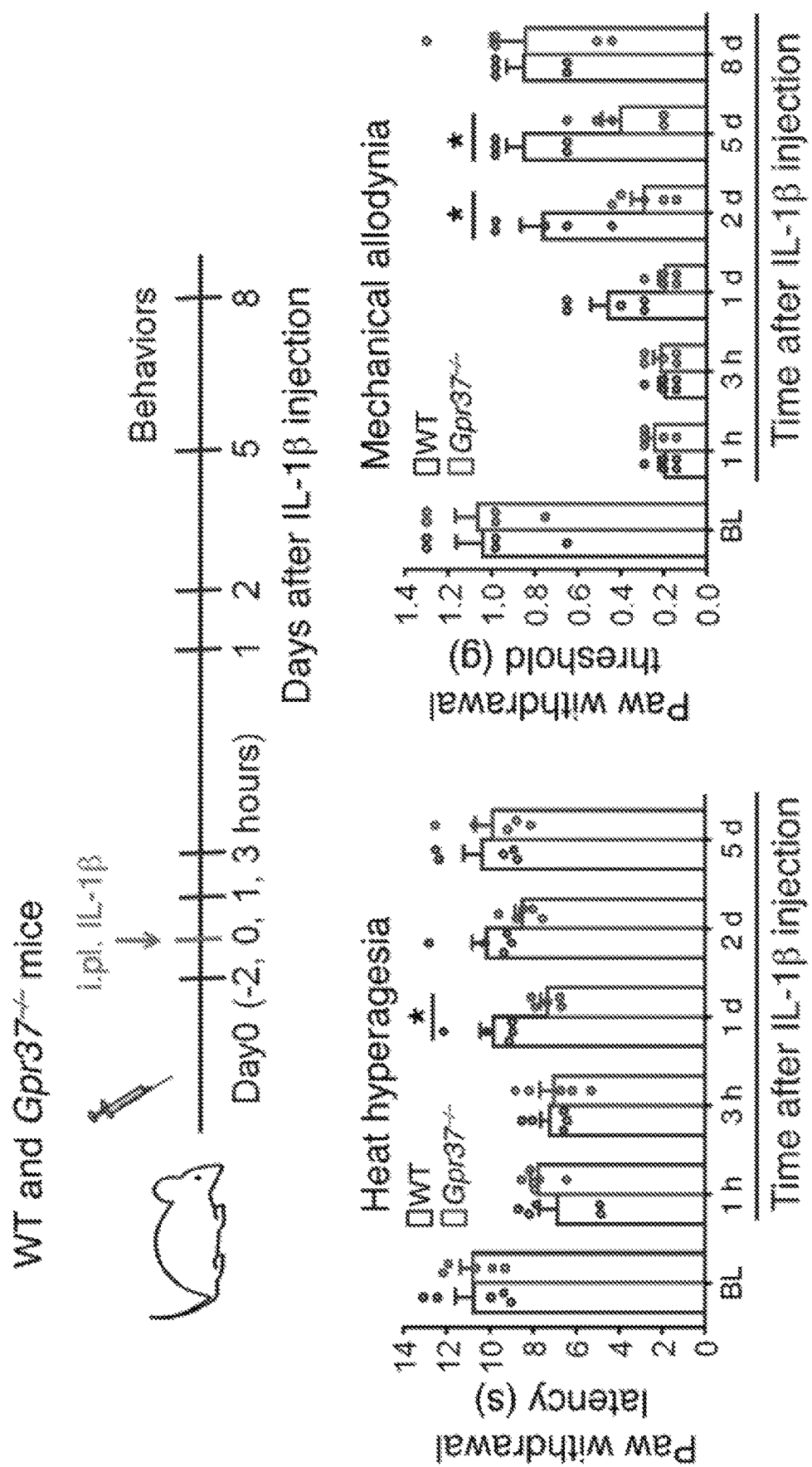
Figure 7A:
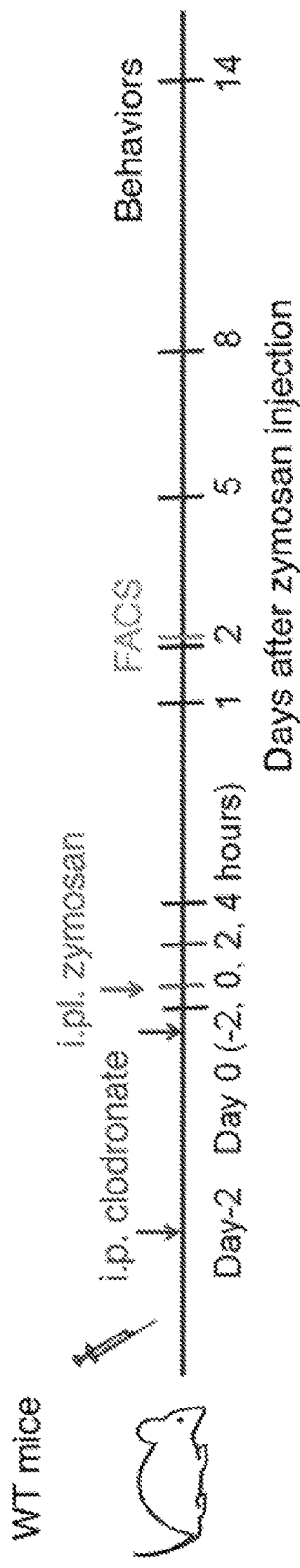
FIG. 7A-FIG. 7E. Macrophages and macrophage GPR37 are critical for the resolution of inflammatory pain.
Figure 7B:
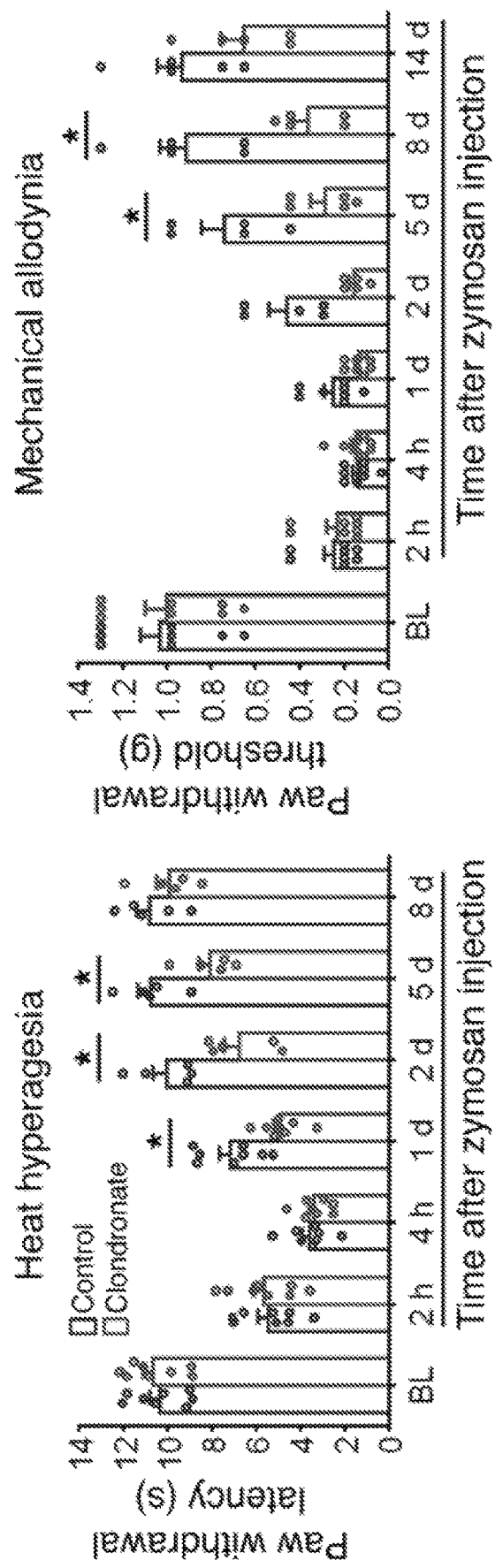
Figure 7C:
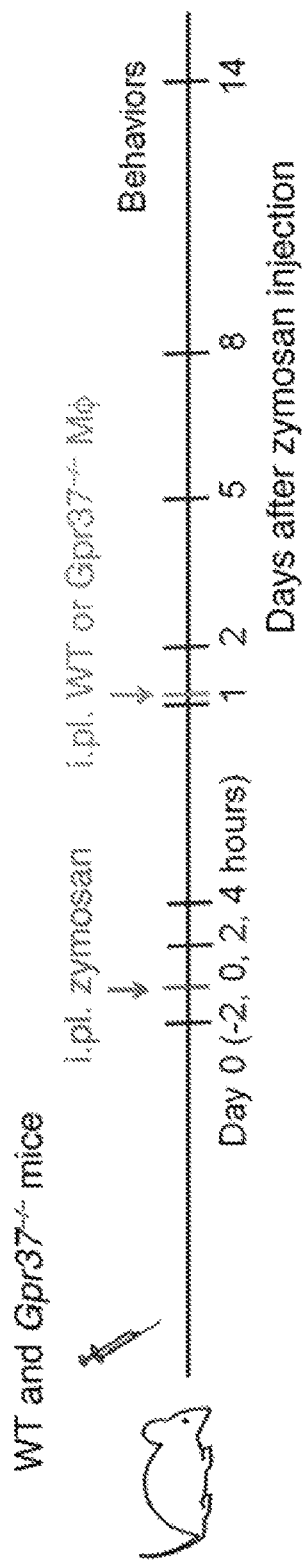
Figure 7D:
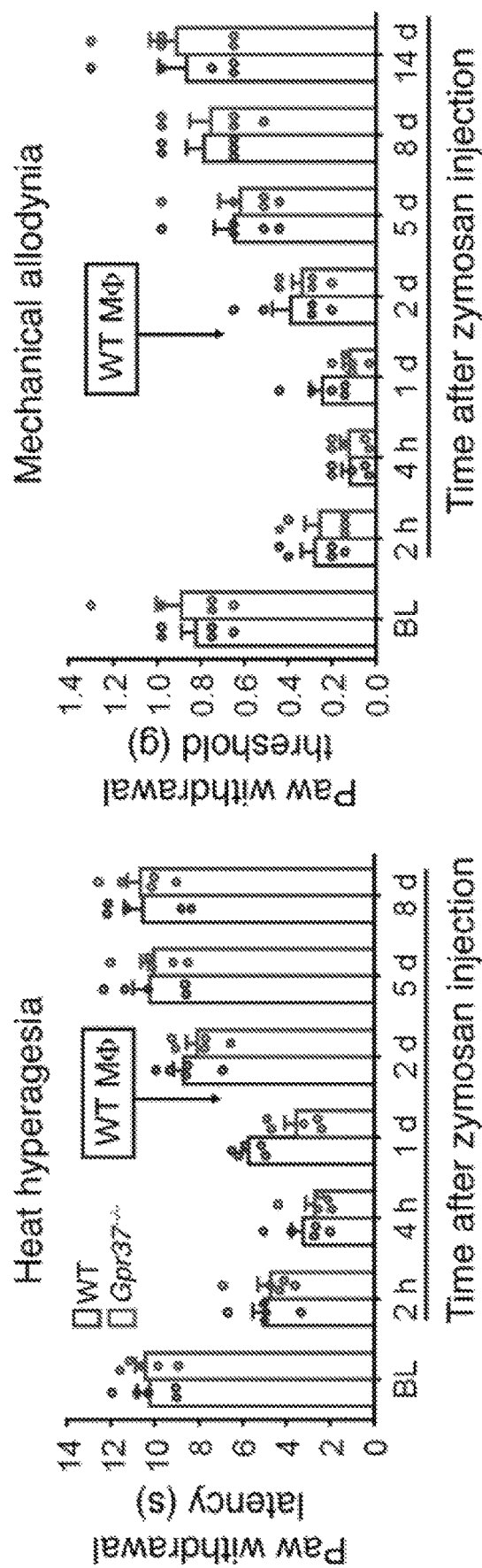
Figure 7E:
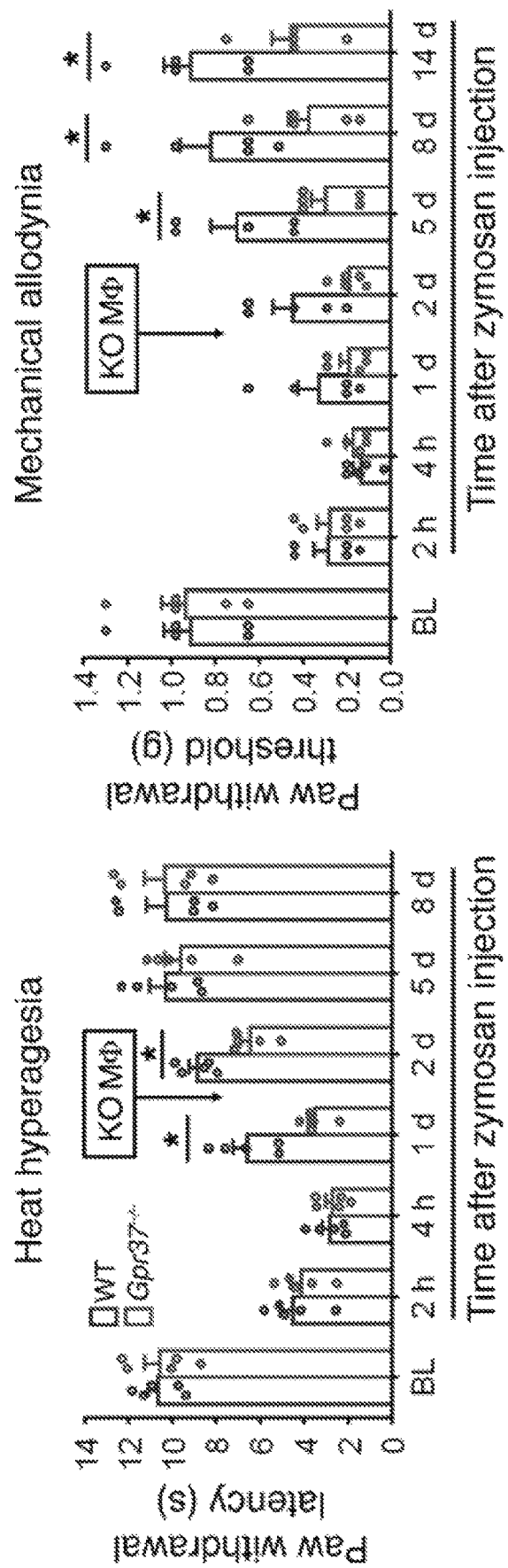
Figure 8A:
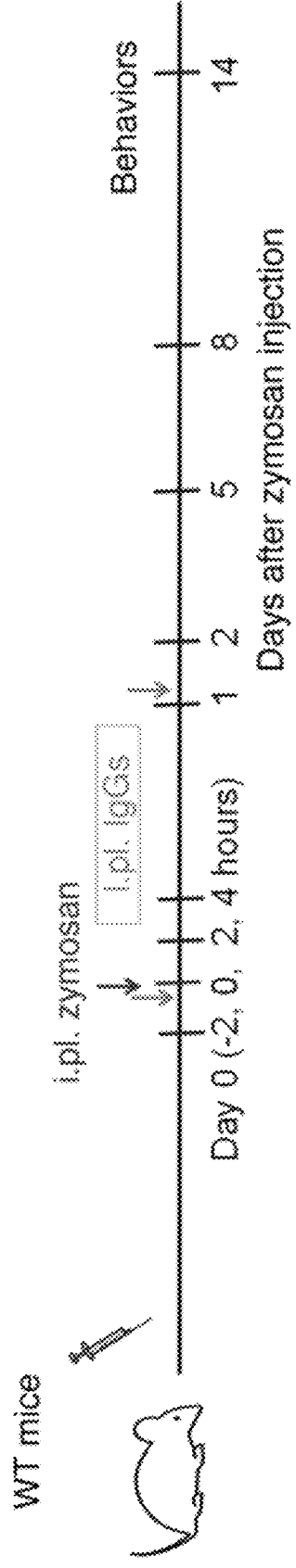
FIG. 8A-FIG. 8D. IL-10 contributes to the resolution of inflammatory pain by macrophages.
Figure 8B:
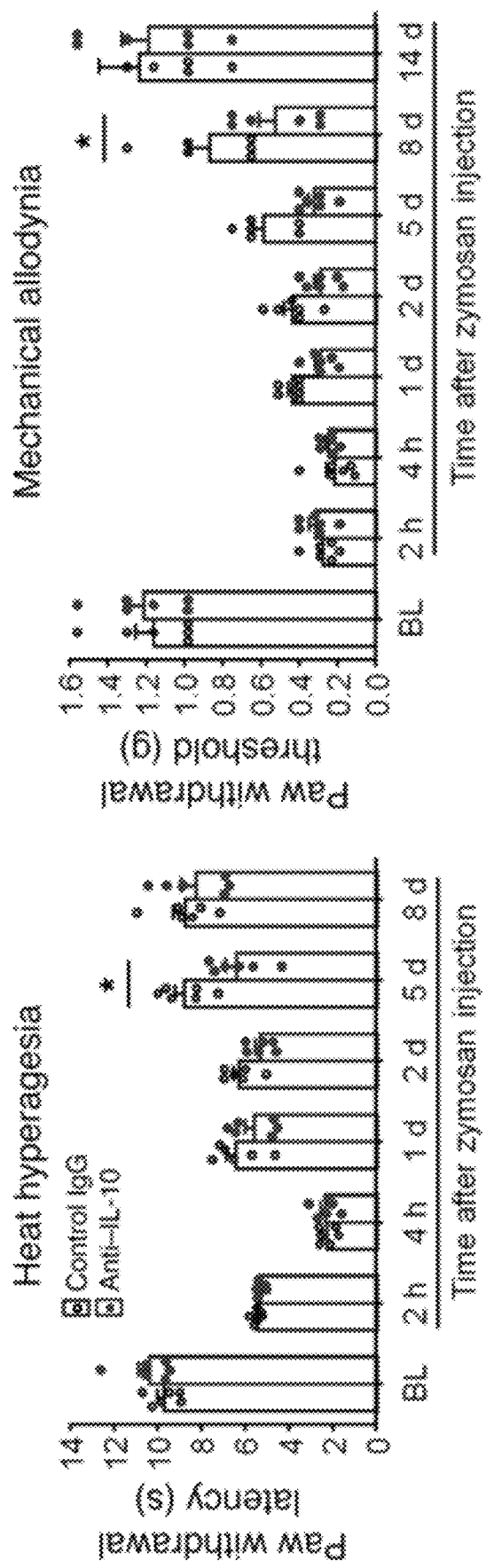
Figure 8C:
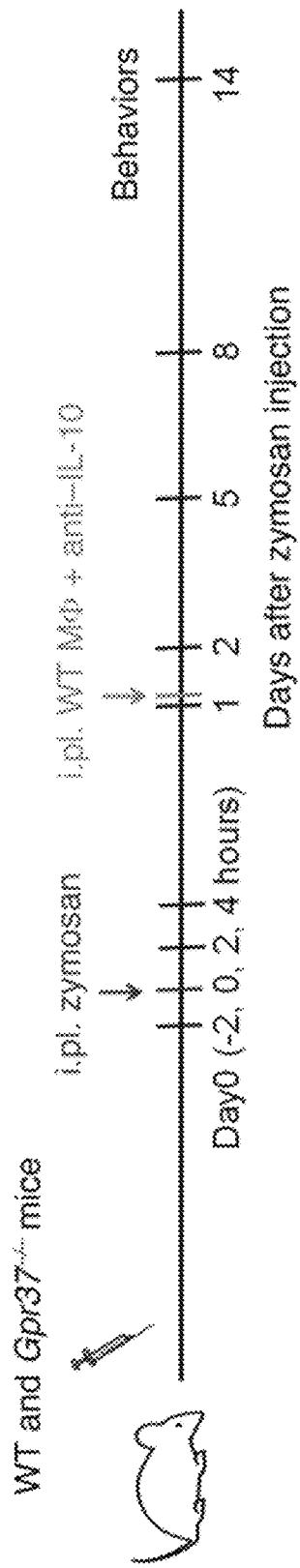
Figure 9C:
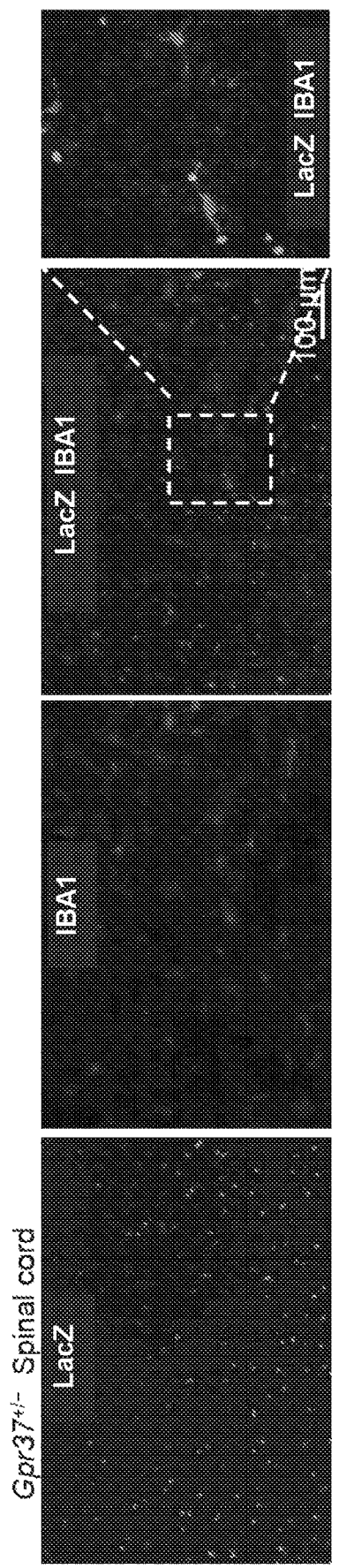
Figure 12A:
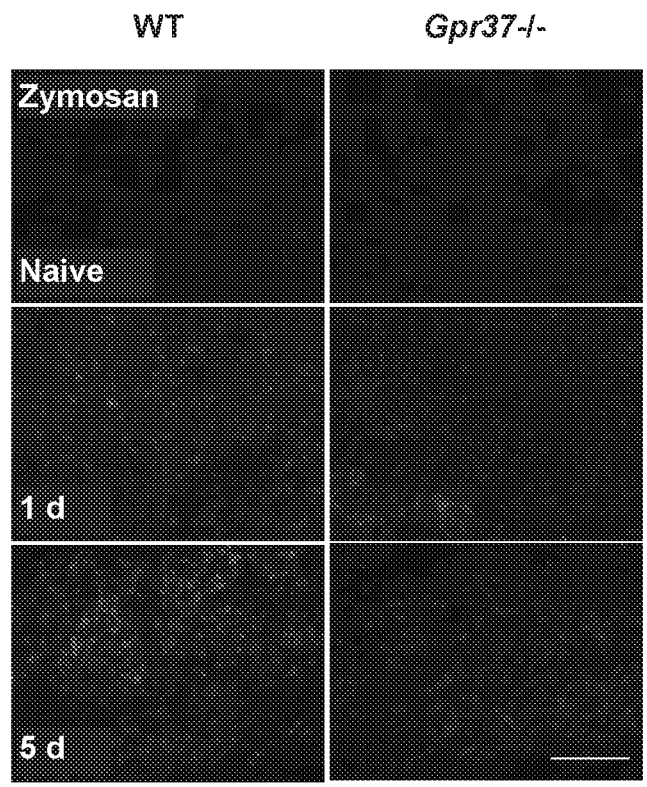
FIG. 12A-FIG. 12D. Further characterization of phagocytized zymosan particles and macrophages in non-inflamed and inflamed hindpaw skins of WT and Gpr37 KO mice.
Figure 12B:
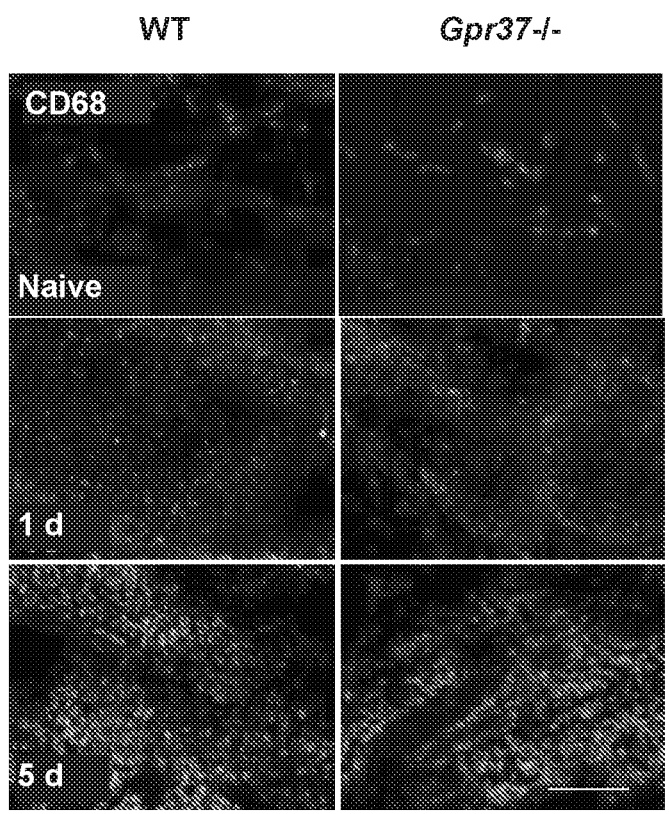
Figure 13A:
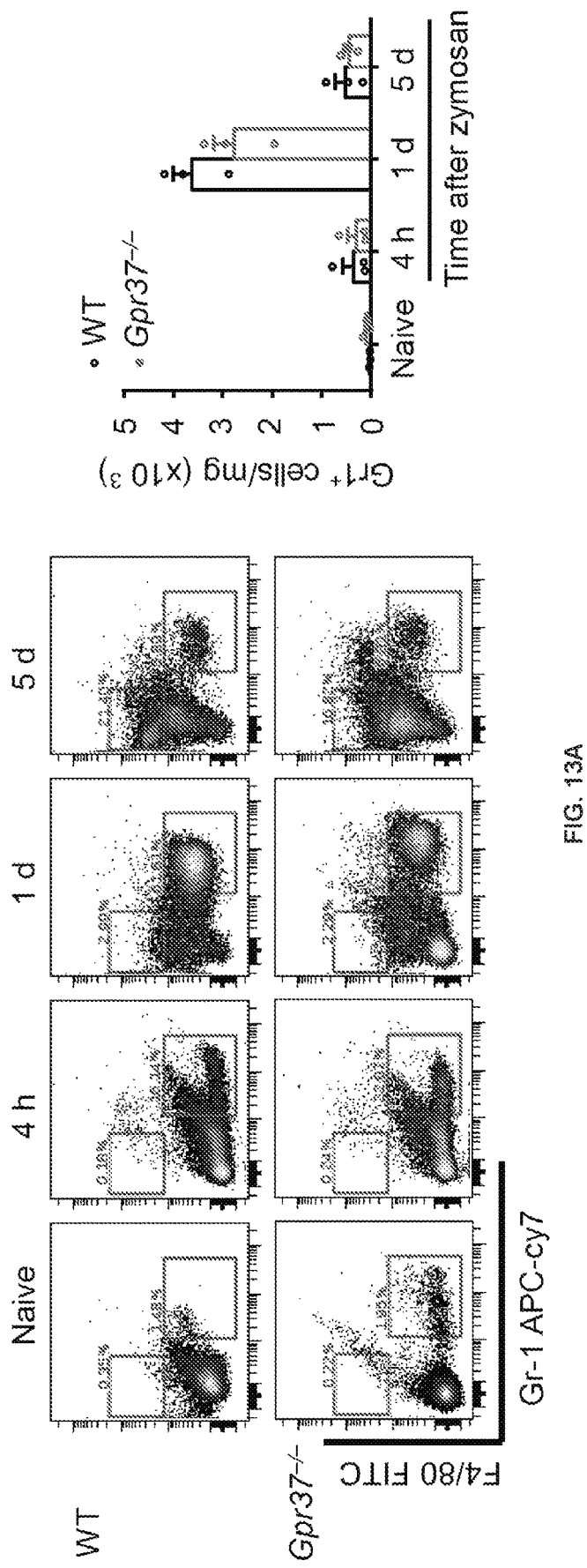
FIG. 13A-FIG. 13C. Characterization of neutrophils and phagocytized neutrophils by macrophages in non-inflamed and inflamed hindpaw skins of WT and Gpr37 KO mice.
Figure 13B:
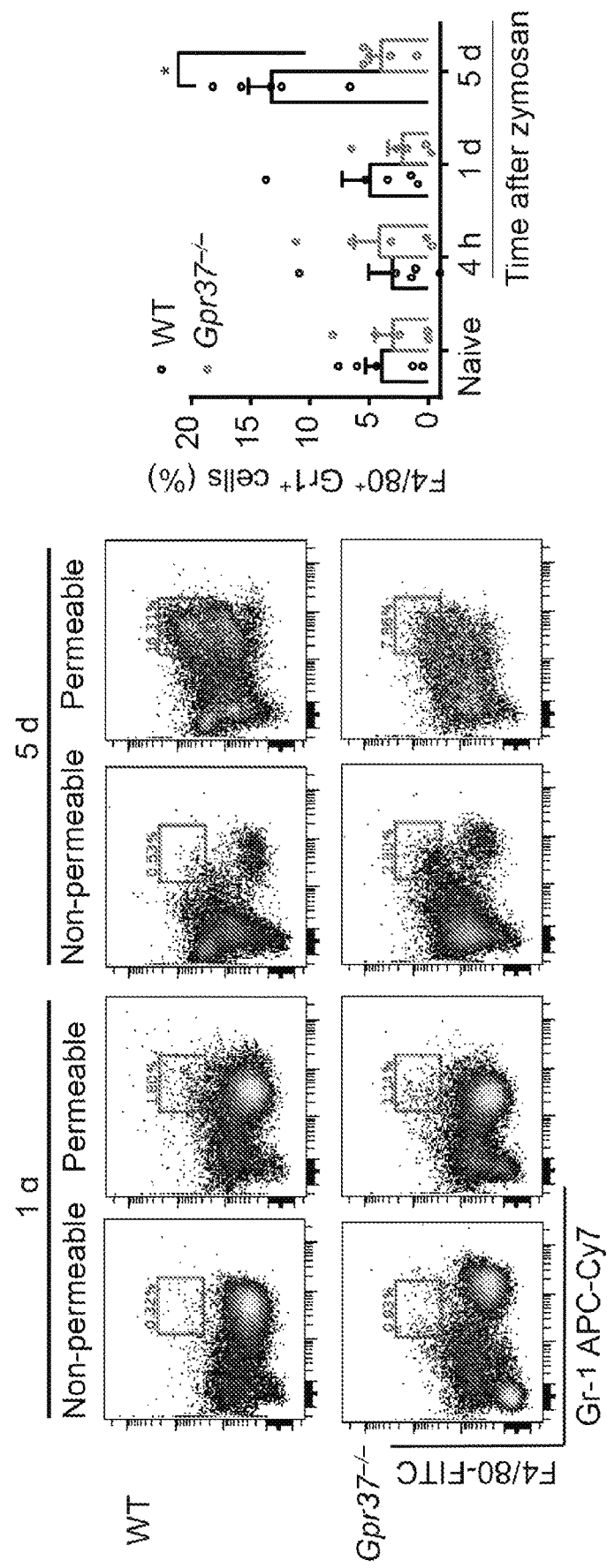
Figure 13C:
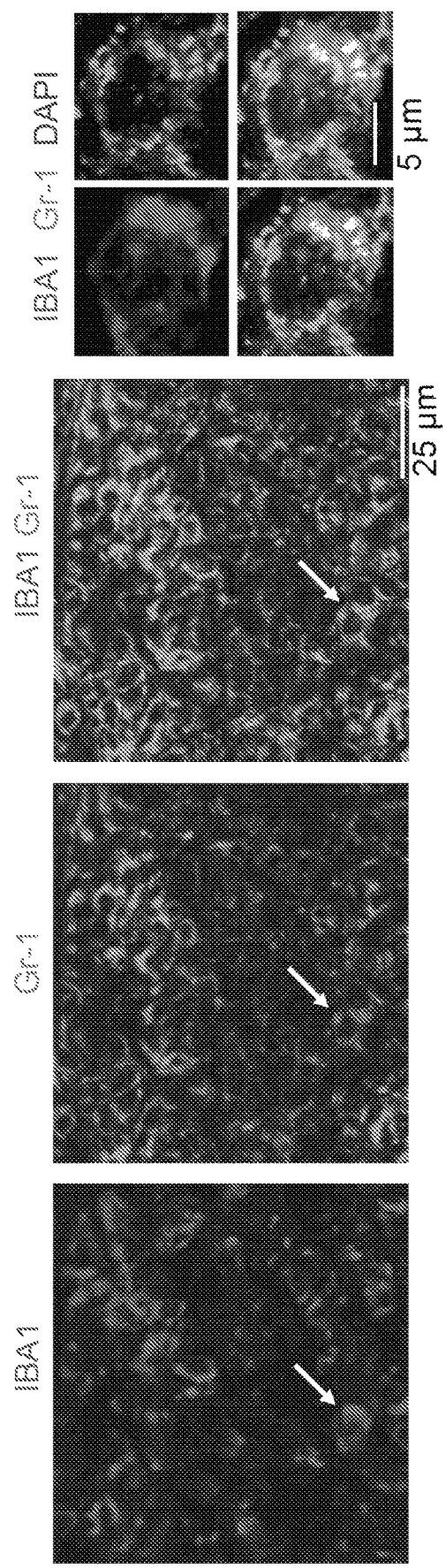
Figure 14A:
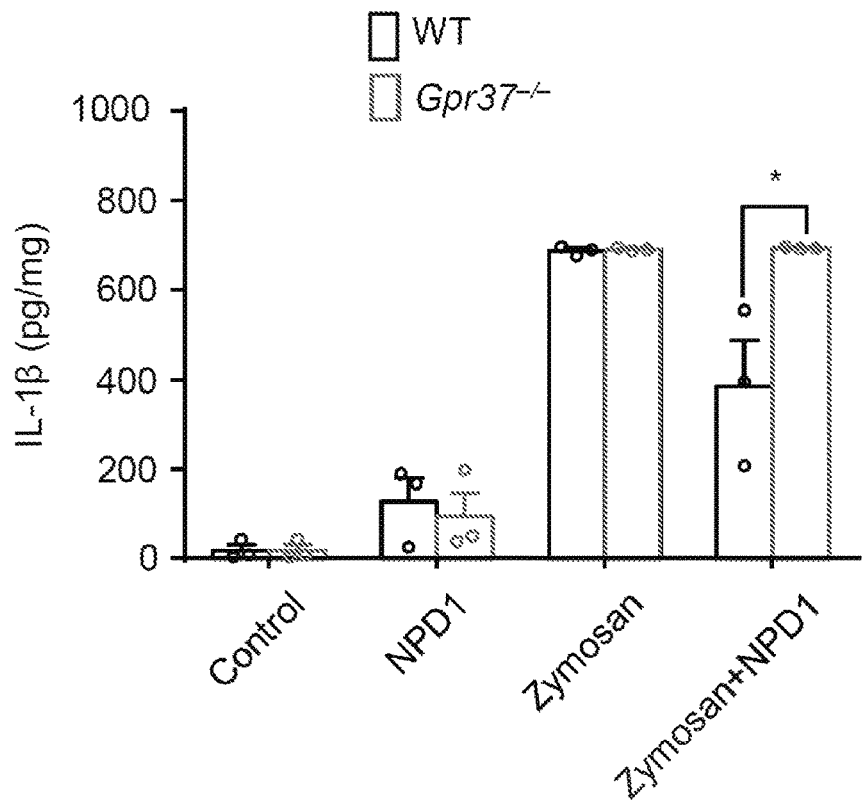
FIG. 14A-FIG. 14C. NPD1 regulates cytokine expression in cultured macrophages via GPR37. ELISA showing the expression of pro-inflammatory cytokine IL-1β (FIG. 14A) and anti-inflammatory cytokines IL-10 (FIG. 14B) and TGF-β (FIG. 14C) in pMΦ from WT and Gpr37$^{-/-}$ mice. pMΦ were stimulated with 100 µg/mL zymosan for 24 h. Note that NPD1 differentially regulates the expression of pro- and anti-inflammatory cytokines. *$P<0.05$; n=3 cultures/group. All the data are mean±SEM.
Figure 14B:
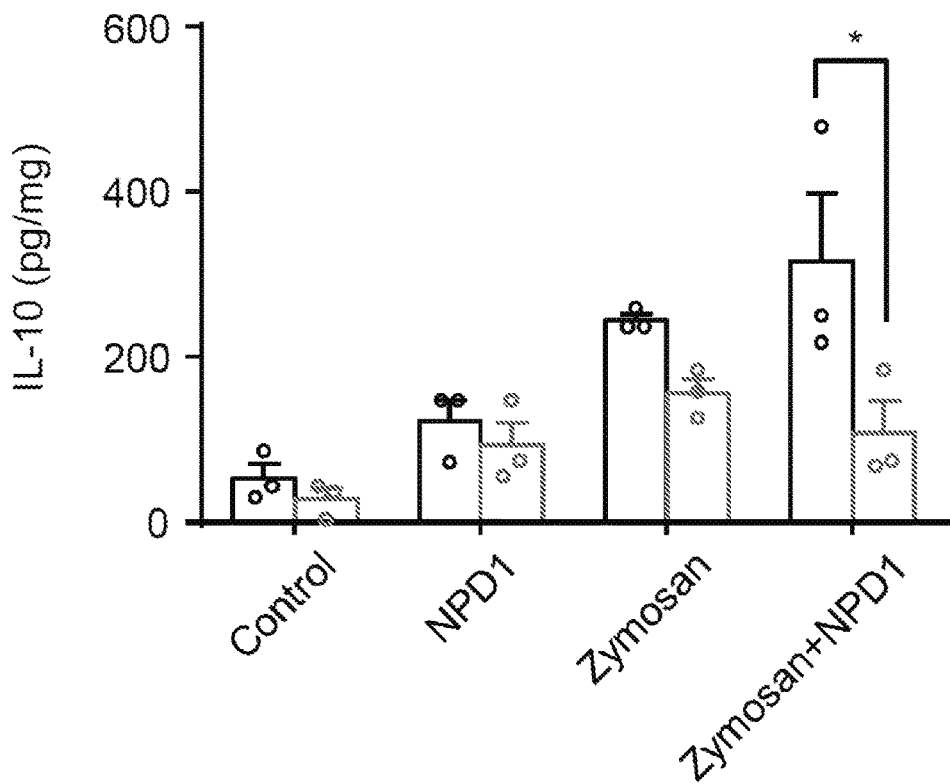
Figure 14C:
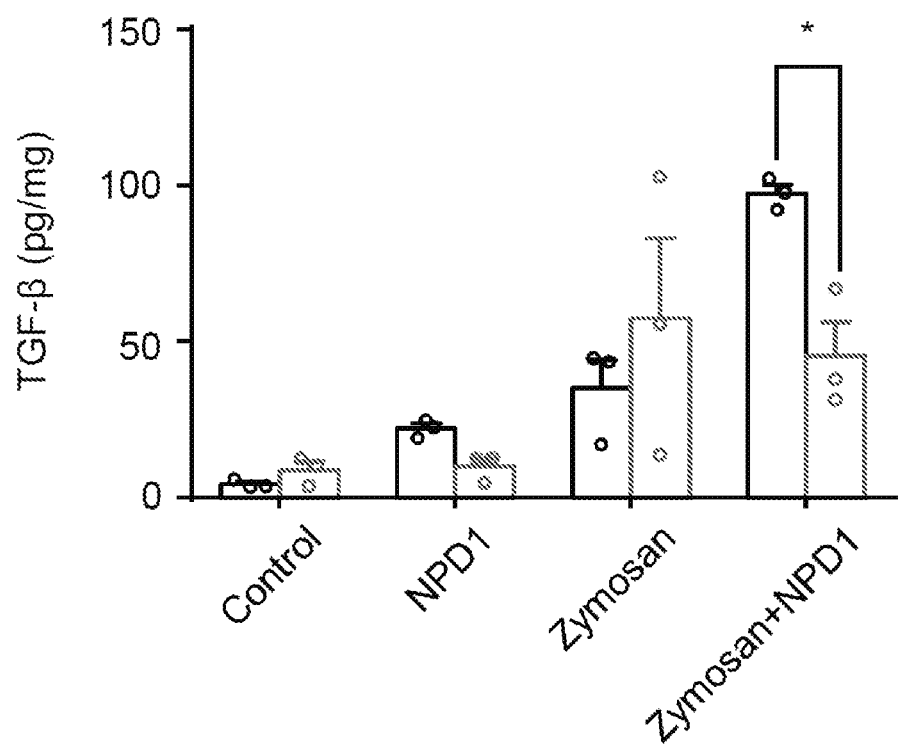
Figure 15A:
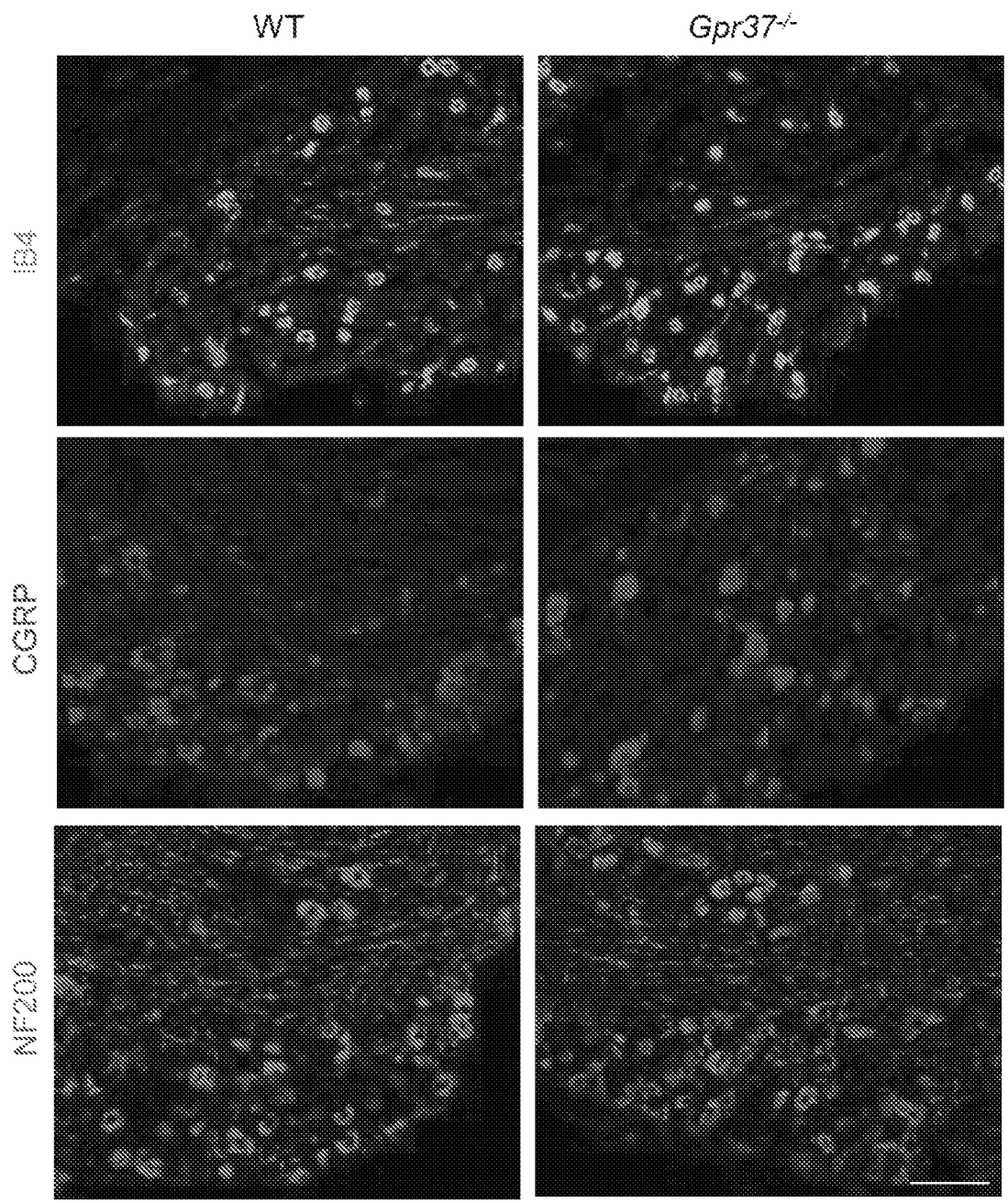
FIG. 15A-FIG. 15D. Gpr37 KO mice display normal development of sensory neurons and their peripheral and central innervations.
Figure 15B:
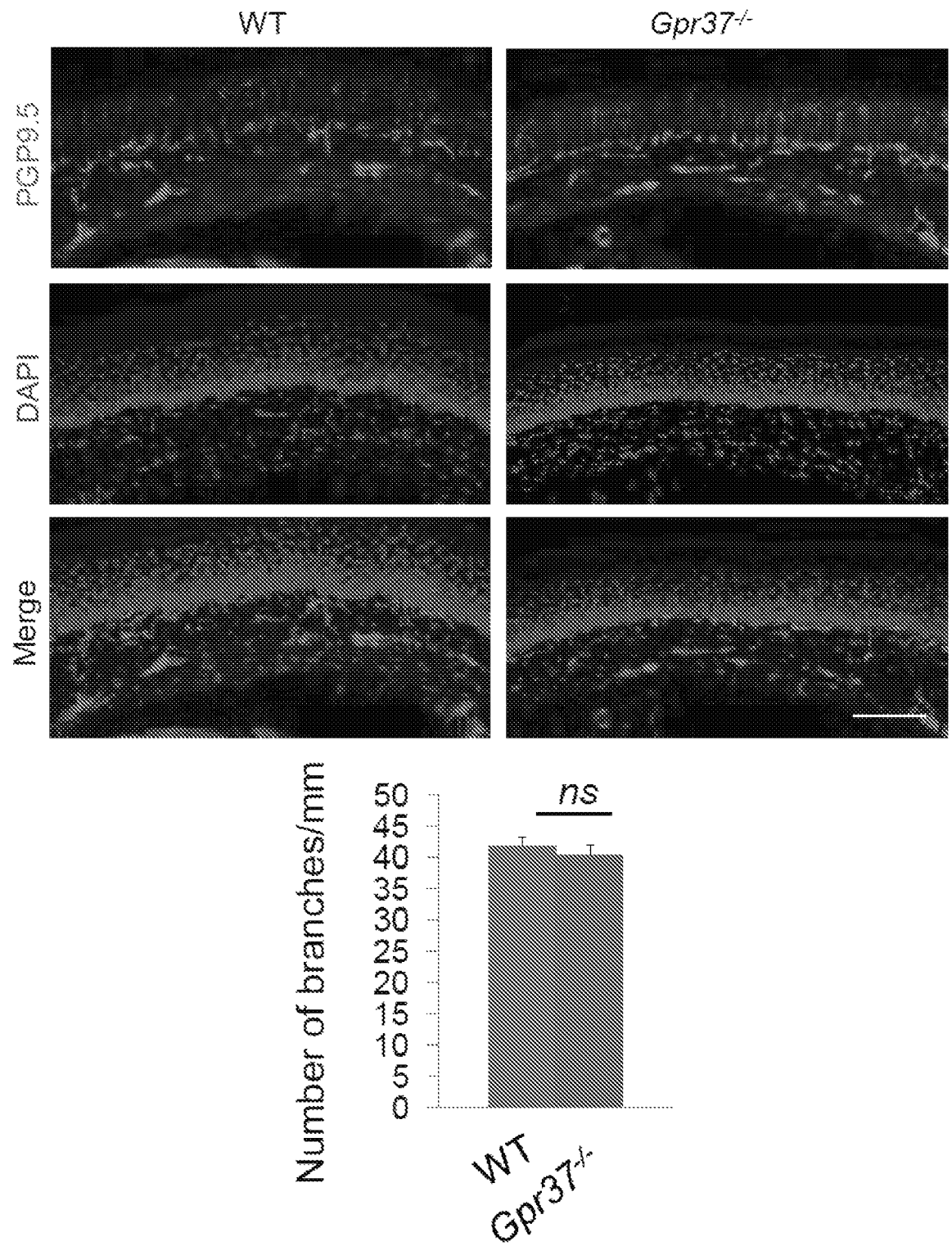
Figure 15C:
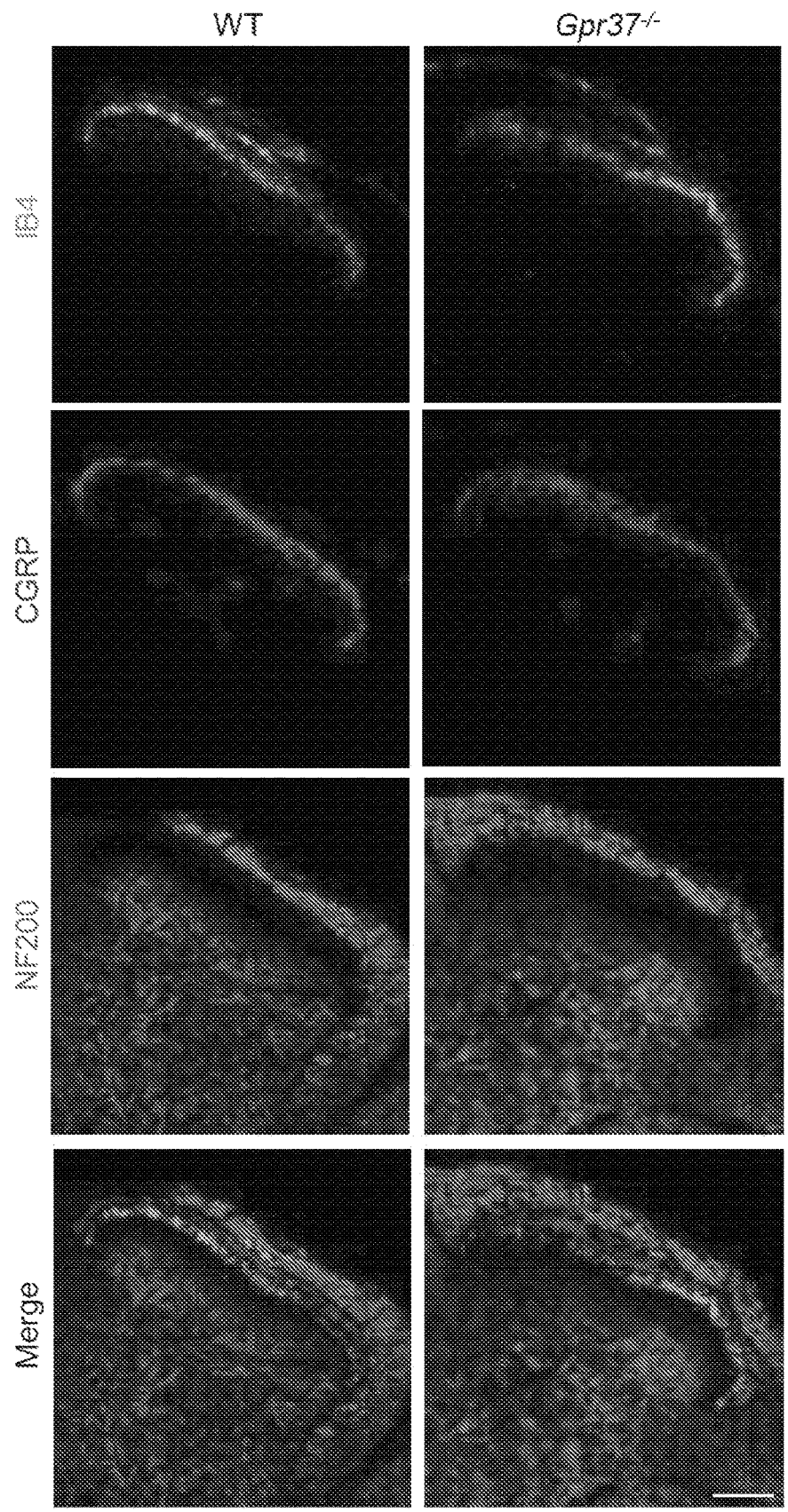
Figure 15D:
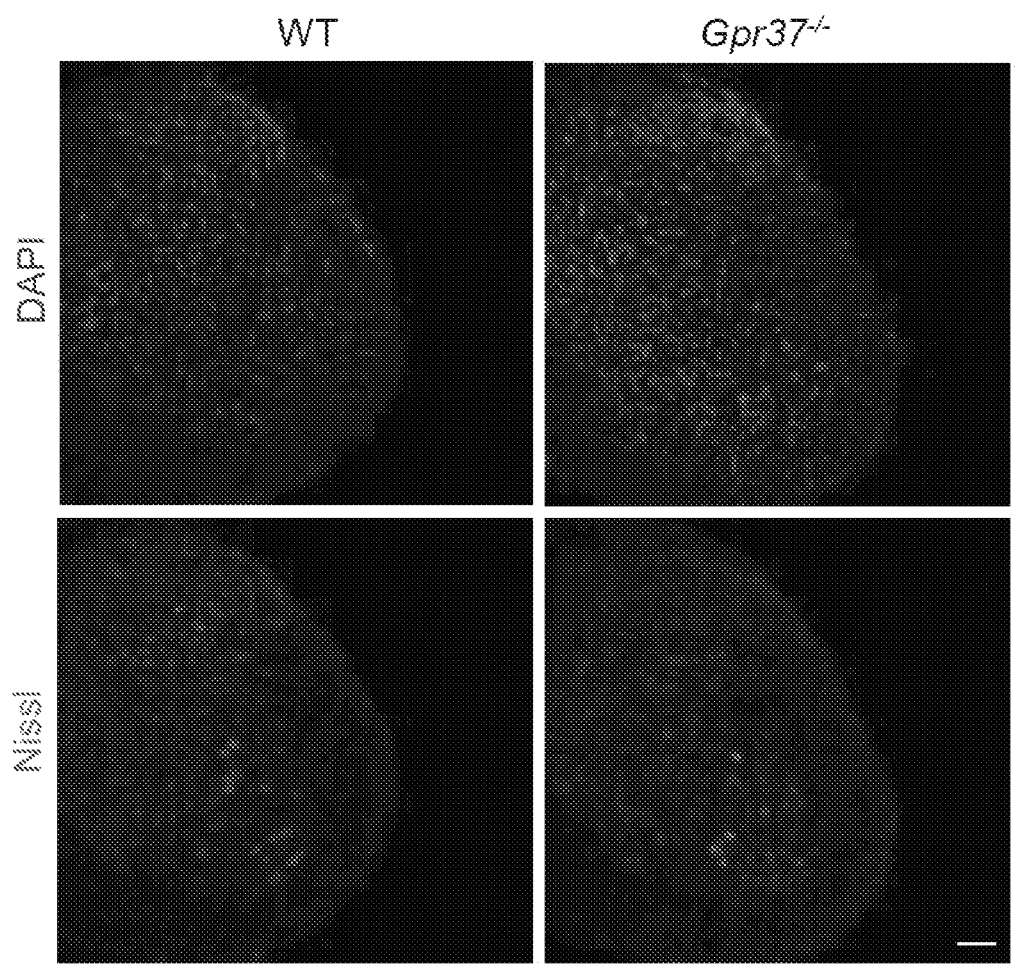
Figure 16A:
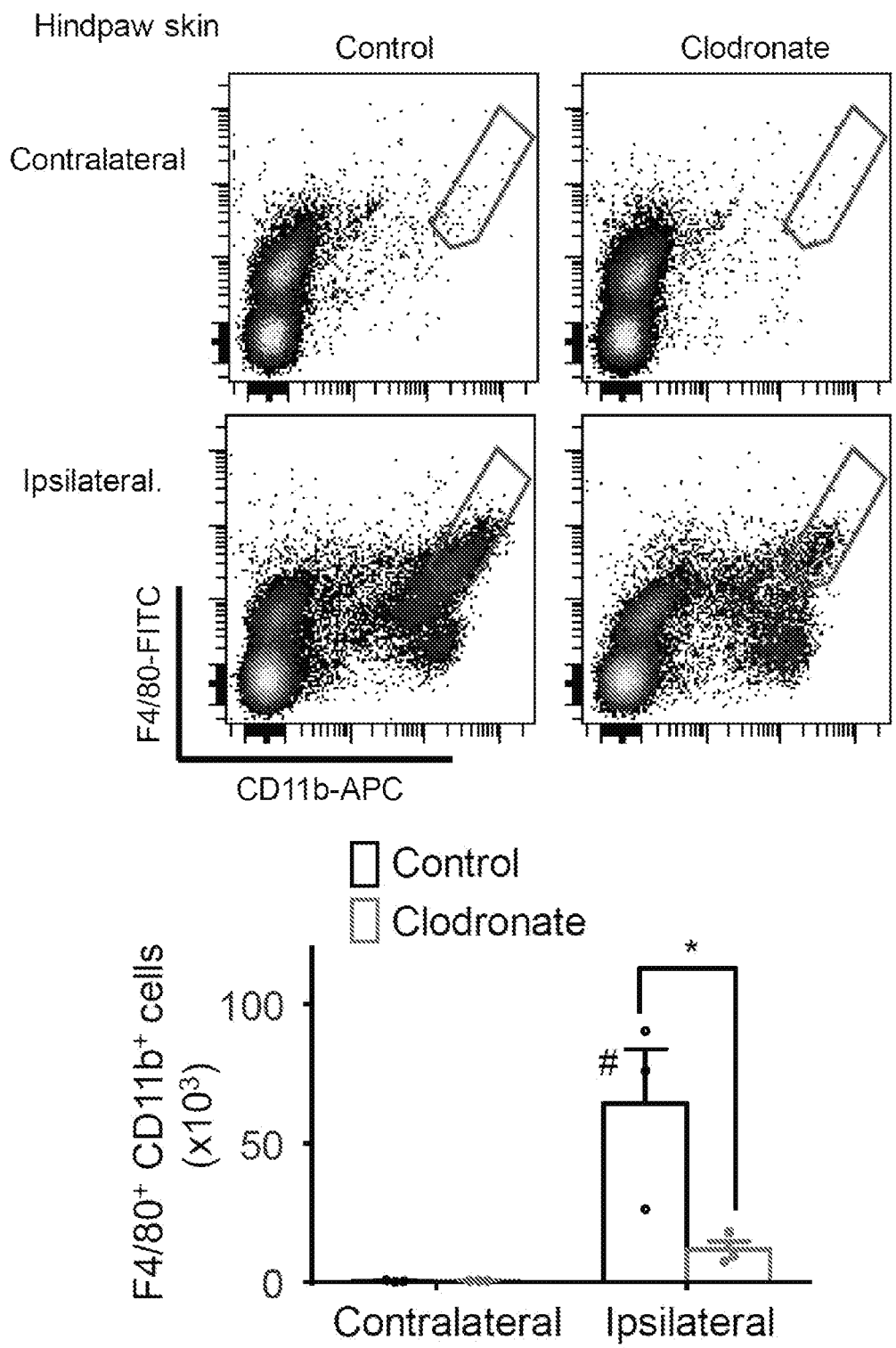
FIG. 16A-FIG. 16B. Depletion of hindpaw macrophages by systemic injection of clodronate-liposome. Flow cytometry showing reduction of F4/80$^+$ CD11b$^+$ MΦ (FIG. 16A) but not Gr1$^+$ CD11b$^+$ neutrophils (FIG. 16B) in inflamed hind paw skins by intraperitoneal injections (15 µL/g, 2 and 48 h prior to the zymosan injection) of a MΦ toxin clodronate-liposome. n=3 mice/group, *P<0.05, clodronate vs. control, #P<0.05, compared with contralateral, ns, not significant. All the data are mean±SEM.
Figure 16B:
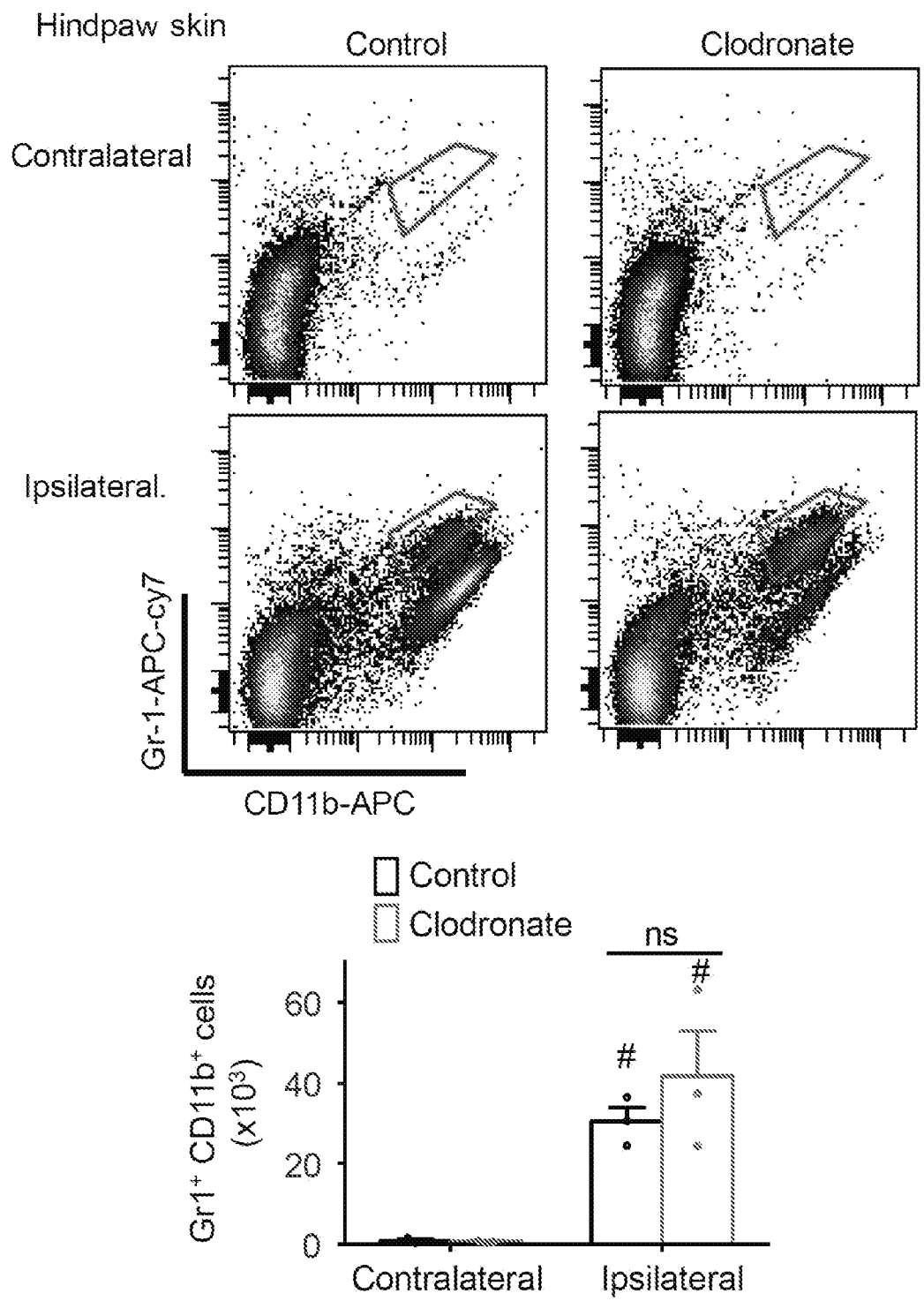

| Experiment | FIG. | Sample size | Groups | Number of samples | Number of mice |
|---|---|---|---|---|---|
| Immunohistochemistry | FIG. 1A, FIG. B | n = 3 mice | 2 | 6 mice | 6 |
| FACS | FIG. 1C-FIG. 1D | n = 3-5 mice | 2 | 10 mice | 10 |
| Immunohistochemistry | FIG. 1E-FIG. 1F | n = 3 mice | 2 | 6 mice | 6 |
| Western blot | FIG. 1G | n = 3 mice | 2 | 6 mice | 6 |
| Immunohistochemistry | FIG. 1H-FIG. 1I | n = 3 mice | 2 | 6 mice | 6 |
| Calcium image | FIG. 2F-FIG. 2I | n = 3-4 culture | 2 | 10 culture | 25 |
| Phagocytosis | FIG. 3A-FIG. 3D | n = 3-5 culture | 6 | 24 culture | 24 |
| Paw volume | FIG. 4B | n = 5 mice | 1 | 5 mice | 5 |
| Immunohistochemistry | FIG. 4C-FIG. 4E | n = 4 mice | 8 | 32 mice | 32 |
| Immunohistochemistry | FIG. 4F | n = 3 mice | 6 | 18 mice | 18 |
| FACS | FIG. 4G | n = 4-5 mice | 8 | 40 mice | 40 |
| RT-PCR | FIG. 5A, FIG. 5C, FIG. 5E | n = 3 mice | 8 | 24 mice | 24 |
| ELISA | FIG. 5B, FIG. 5D, FIG. 5F | n = 3-5 mice | 8 | 30 mice | 30 |
| Behavioral test | FIG. 6A | n = 10 mice | 2 | 20 mice | 20 |
| Behavioral test | FIG. 6B | n = 5 mice | 2 | 10 mice | 10 |
| Behavioral test | FIG. 6C | n = 5 mice | 2 | 10 mice | 10 |
| Behavioral test | FIG. 6D | n = 5 mice | 2 | 10 mice | 10 |
| Behavioral test | FIG. 6E | n = 5 mice | 2 | 10 mice | 10 |
| Behavioral test | FIG. 6F | n = 5-10 mice | 2 | 10-20 mice | 20 |
| Behavioral test | FIG. 7A, FIG. 7B | n = 5-8 mice | 2 | 10-16 mice | 16 |
| Behavioral test | FIG. 7C, FIG. 7D | n = 5 mice | 2 | 10 mice | 10 |
| Behavioral test | FIG. 7E | n = 5 mice | 2 | 10 mice | 10 |
| Behavioral test | FIG. 8A, FIG. B | n = 6 mice | 2 | 12 mice | 12 |
| Behavioral test | FIG. 8C, FIG. D | n = 6 mice | 2 | 12 mice | 12 |
| In situ hybridization | FIG. 9A | n = 3 mice | 1 | 3 mice | 3 |
| Immunohistochemistry | FIG. 9B | n = 3 mice | 2 | 6 mice | 6 |
| Immunohistochemistry | FIG. 9C-FIG. 9D | n = 3 mice | 1 | 3 mice | 3 |
| Immunohistochemistry | FIG. 12A | n = 4 mice | 4 | 16 mice | 16 |
| Immunohistochemistry | FIG. 12B | n = 4 mice | 2 | 8 mice | 8 |
| Immunohistochemistry | FIG. 13A-FIG. 13C | n = 3 mice | 6 | 18 mice | 18 |
| FACS | FIG. 14A-FIG. 14B | n = 3-5 mice | 8 | 40 mice | 40 |
| Immunohistochemistry | FIG. 14C | n = 3 mice | 1 | 3 mice | 3 |
| ELISA | FIG. 15A-FIG. 15C | n = 3 culture | 2 | 6 culture | 12 |
| Immunohistochemistry | FIG. 16A-FIG. 16B | n = 4 mice | 2 | 8 mice | 8 |
| Total number of mice | | | | | 519 |

Mouse model of inflammatory pain. Inflammatory pain was induced by intraplantar injection of zymosan (1 μg/μL, 20 μL), IL-1β (1 ng, 20 μL), or capsaicin (5 μg, 10 μL) into a hind paw.

Drug injection. For local intraplantar injection, drugs (20 μL) were injected using a Hamilton microsyringe (Hamilton) with a 30-gauge needle.

In situ hybridization. We used probes directed against mouse Gpr37 designed by Advanced Cell Diagnostics (RNAscope® Probe-Mm-Gpr37, Cat No. 319291) and performed the RNAscope® multiplex fluorescent manual assay according to the manufacturer's instructions. Skin sections (20 μm thick) were used for in situ hybridization. Prehybridization, hybridization and washing were performed according to the manufacturer's instructions.

LacZ staining. Mice were anaesthetized and perfused with PBS followed by 4% paraformaldehyde (PFA). Spinal cord, skin, and brain tissues were collected and post-fixed with 1% glutaraldehyde and 2% PFA for 2 h at 4° C., then in 30% sucrose overnight at 4° C. Tissues were washed with PBS containing 2 mM $MgCl_2$, embedded in OCT, and sectioned (20-30 μm) in a cryostat. The sections were washed with 2 mM $MgCl_2$ and immediately used for LacZ staining. The staining was processed for 1-16 h at 37° C. in staining solution, containing 5 mM potassium ferrocyanide, 5 mM potassium ferricyanide, 0.01% sodium deoxycholate, 0.02% NP40, 2 mM $MgCl_2$ and 1 mg/mL X-gal.

Immunohistochemistry and quantification. After appropriate survival times, mice were deeply anesthetized with isoflurane and perfused through the ascending aorta with PBS, followed by 4% paraformaldehyde. After the perfusion, the L4-L5 DRGs, hind paw glabrous skins were removed and postfixed in the same fixative overnight. DRG and skin tissue sections (10 or 20 μm) and free-floating spinal cord and skin sections (30 μm) were cut in a cryostat. The sections were blocked with 2% goat or donkey serum for 1 h at room temperature and then incubated overnight at 4° C. with the primary antibodies: anti-GPR37 (mouse, 1:500, Santa-cruz, Catalog: SC390110), anti-CD68 (rat, 1:500, biolegend, Catalog: 137001), anti-F4/80 (rat, 1:1000, ebioscience, Catalog: 14-4801-82), anti-Iba1 (rabbit, 1:1000, Wako Catalog: 019-19741), and anti-Gr-1 (rat, 1:1000, biolegend, Catalog: 127601), anti-CGRP (goat, 1:1000; Bio-Rad; AB_2290729), Anti-NF200 (mouse, 1:1000, Millipore; AB_477257), and anti-PGP 9.5 (rabbit, 1:2000, UltraClone; AB_2313685) antibodies, followed by cyanine 3 (Cy3)-, cyanine 5 (Cy5)-, or FITC-conjugated secondary antibodies (1:400; Jackson ImmunoResearch) for 2 h at room temperature. For double immunofluorescence, sections were incubated with a mixture of polyclonal and monoclonal primary antibodies, followed by a mixture of Cy3- and FITC-conjugated secondary antibodies or FITC-conjugated IB4 (10 µg/mL; Sigma-Aldrich). In some cases, DAPI (1:1000, Vector laboratories, Catalog: H-1200) was used to stain cell nuclei in tissue sections. The stained sections were examined with a Nikon fluorescence microscope, and images were captured with a CCD Spot camera. For high resolution images, sections were also examined under a Zeiss 510 inverted confocal microscope. To confirm the specificity of GPR37 antibody, immunostaining was also conducted in Gpr37 KO mice. To quantify immmunofluorescence intensity in skin sections of WT and KO mice, 3-5 sections were included per animal and the fluorescence intensity was measured using NIH Image J software.

ELISA. Mouse ELISA kits for IL-1β, TGF-β and IL10 were purchased from R&D system (Minneapolis, MN, Catalog: MLB00C for IL-1β, Catalog: MB100B for TGF-β, and Catalog: M1000B for IL-10). ELISA was performed using culture medium and hindpaw skin tissues. Cultured cells and tissues were homogenized in a lysis buffer containing protease and phosphatase inhibitors. For each Elisa assay, 50 µg proteins or 50 µL of culture medium were used. ELISA was conducted according to manufacturer's instructions. The standard curve was included in each experiment.

Quantitative real-time RT-PCR. Hindpaw skins of mice were collected at different times of zymosan injection. Total RNAs from skin tissues and cultures were extracted using Direct-zol™ RNA MiniPrep Kit (Zymo Research Corporation) and 0.5-1 µg of RNA was reverse-transcribed using the iScript cDNA Synthesis® (Bio-Rad). Specific primers including GAPDH control were designed using IDT Sci-Tools Real-Time PCR software. We performed gene-specific mRNA analyses using the MiniOpticon Real-Time PCR system (BioRad). Quantitative PCR amplification reactions contained the same amount of Reverse transcription (RT) product, including 7.5 µL of 2×IQSYBR-green mix (Bio-Rad) and 100-300 nM of forward and reverse primers in a final volume of 15 µL. The primer sequences were as previously used and as shown in TABLE 2. Primer efficiency was obtained from the standard curve and integrated for calculation of the relative gene expression, which was based on real-time PCR threshold values of different transcripts and groups.

Western blot. Protein samples were prepared in the same way as for ELISA analysis, and 20-50 µg of proteins were loaded for each lane and separated by SDS-PAGE gel (4-15%; Bio-Rad). After the transfer, the blots were incubated overnight at 4° C. with polyclonal or monoclonal antibodies against GPR37 (1:1000, mouse; Santa cruz, Catalog: SC-390110). For loading control, the blots were probed with GAPDH antibody (1:20000, mouse; Sigma, Catalog: G8795). These blots were further incubated with HRP-conjugated secondary antibody and developed in ECL solution (Pierce), Chemiluminescence signal was revealed by Bio-Rad ChemiDoc XRS for 1-5 min. Specific bands were evaluated by apparent molecular sizes. The intensity of the selected bands was analyzed using NIH Image J software.

Lipids overlay assay. Lipids membrane coating and protein overlay assay was conducted as previously described (Ji R R, et al. *Science* 2016, 354, 572-577). Ethanol and chloroform soluble fatty acids were directly loaded on hydrophobic PVDF membrane (Bio-Rad). The fatty acids (NPD1, RvD1, RvE1, and DHA) coated membranes were dried and blocked with 1% BSA. The cell lysate and purified GPR37-V5 protein were incubated with the coating membrane for 2 h, and the binding was detected by anti-V5 tagged antibody (mouse, 1:1000, Thermo scientific, Catalog: 46-0705).

HEK cell culture and transfection. HEK293 flip-in cell line was purchased from Duke Cell Culture Facility. Cells were cultured in high glucose (4.5 g/L) Dulbecco's Modified Eagle's Medium containing 10% (v/v) fetal bovine serum (Gibco). Transfection (2 µg cDNA) was performed with Lonza electroporation (Lonza) at 70% confluency and the transfected cells were cultured in the same growth medium for 48 h before use. The hGPR37-V5 pLenti304 plasmids were obtained from DNASU (Tempe, AZ), and hGPR32, hChemR23 and hALX pcDNA3 plasmids were provided by Dr. Serhan from Harvard Medical School, Boston.

Peritoneal macrophage culture. Peritoneal macrophages were collected by peritoneal lavage with 10 ml warm PBS containing of 1 mM EDTA. Cells were incubated in DMEM supplemented with 10% FBS at 37° C. for 2 h in petri dish and washed with PBS to eliminate non-adherent cells. The adherent cells were used as peritoneal macrophages. Peritoneal macrophages were used after 3 days of culture.

Calcium imaging. HEK 293 cells, with or without transfection of Gpr37, GPR32, ChemR23 or ALX1 cDNA, were

TABLE 2

| | Sequences of PCR primers. | | |
|---|---|---|---|
| Gapdh | AGGTCGGTGTGAACGGATTTG | Forward | SEQ ID NO: 4 |
| Gapdh | GGGGTCGTTGATGGCAACA | Reverse | SEQ ID NO: 5 |
| Il-1β | TTGTGGCTGTGGAGAAGCTGT | Forward | SEQ ID NO: 6 |
| Il-1β | AACGTCACACACCAGCAGGTT | Reverse | SEQ ID NO: 7 |
| Tgf-β | TGGAGCAACATGTGGAACTC | Forward | SEQ ID NO: 8 |
| Tgf-β | CAGCAGCCGGTTACCAAG | Reverse | SEQ ID NO: 9 |
| Il-10 | TGTCAAATTCATTCATGGCCT | Forward | SEQ ID NO: 10 |
| Il-10 | ATCGATTTCTCCCCTGTGAA | Reverse | SEQ ID NO: 11 |
| Gpr37 | GATCTTTGGGACCGGCATTA | Forward | SEQ ID NO: 12 |
| Gpr37 | GGAGGCAGAAGAAGATGATGAG | Reverse | SEQ ID NO: 13 | loaded with 5 μM Fura-2AM (Invitrogen) for 1 hour and then were resuspended in normal external buffer (140 NaCl, 5 KCl, 2 CaCl$_2$, 2 MgCl$_2$, 10 HEPES, in mM, titrated to pH 7.4 with NaOH) or external Ca$^{2+}$-free buffer (140 NaCl, 2 MgCl$_2$, 5 EGTA, 10 HEPES, in mM, titrated to pH 7.4 with NaOH). Peritoneal macrophages, collected from WT and Gpr37 KO mice, were loaded with 5 μM Fura-4AM (Invitrogen) for 1 hour and then were resuspended in normal external buffer. Images of the HEK 293 cells and macrophages with the excitation wavelength of 340 nm and 380 nm were captured with a cooled Digital CMOS camera (ORCA-Flash 4.0, Hamamatsu Photonics K.K, Japan). The ratio of fluorescence intensity of the two wavelengths in each experiment was analyzed using MetaFluor (Molecular Devices). The Shutter speed and wavelength was controlled by Lambda DG-4 system (Sutter instrument Co., Novato, CA). Values from each of the experiments were normalized to the baseline ratio of 340/380 nm.

Collection of skin cells. The skin tissues were cut into small strips of 1-2 mm thickness and placed in 1 mg/ml collagenase A and 2.4 U/ml Dispase II (Roche Applied Sciences) in HBSS (Chiu I M, et al. Nature 2013, 501, 52-57). Tissues were incubated at 37° C. with continuous shaking at 200 rpm for 90 minutes. The skin cells were triturated by pipette, washed with HBSS and 0.5% BSA, and filtered through a 70-μm mesh and then treated with 1×RBC lysis buffer (Biolegend, San Diego, CA).

Flow Cytometry. Surface expression of GPR37, F4/80, CD11b and Ly-6G were determined by flow cytometry, as previously described (Ghasemlou N, et al. PNAS 2015, 112, E6808-17). The dissociated skin or peritoneal cells were counted, and 2×10$^6$ cells per sample were stained with Zombie Violet™ Fixable Viability Kit (Biolegend, Catalog: 423114) according to the manufacturer's instructions. All dissociated cells were blocked with Fc receptors staining buffer (1% anti-mouse-CD16/CD32, 2.4 G2, 2% FBS, 5% NRS and 2% NMS in HBSS; BD bioscience) and then stained with a standard panel of antibodies (see the TABLE 3 below). The detailed information of antibodies used are also included in TABLE 3. After staining, cells were washed in PBS with EDTA. The flow cytometry events were acquired in a BD FACS Canto II flow cytometer by using BD FACS Diva 8 software (BD Bioscience). Data were analyzed by using Cytobank Software (https://www.cytobank.org/cytobank). For neutrophil phagocytosis by macrophages in skin, dissociated cells were labelled with FITC-conjugated anti-mouse F4/80 Ab, permeabilized with 0.1% Triton X-100, then labelled with APC-Cy7-anti-Ly6G Ab and analyzed by flow cytometry.

TABLE 3

Antibodies used for flow cytometry.

| | | Laser | | | | | |
|---|---|---|---|---|---|---|---|
| | | 405 nm | 488 nm | | 633 nm | | |
| | | | Filter | | | | |
| Experiment | | 425/50 nm | 530/30 nm | 585/42 nm | 660/20 nm | 780/60 nm | incubation |
| Skin phagocytosis | Primary Ab | zombi violet | F4/80-FITC | | Mouse anti-GPR37 | Ly6G-APC Cy7 | 1-hour on ice |
| | Second Ab | | | | anti-mouse-Cy5 | | 30 min on ice |
| pMØ depletion | Primary Ab | zombi violet | F4/80-FITC | CD11b-PE | | Ly6G-APC Cy7 | 30 min on ice |
| Skin MØ depletion | Primary Ab | zombi violet | F4/80-FITC | | | Ly6G-APC Cy7 | 30 min on ice |

| antibody | company | cat no | dilution |
|---|---|---|---|
| FACS primary antibody | | | |
| rat-anti CD11b-PE | Biolegend | 101207 | 1:200 |
| rat anti mouse-CD68-alexa fluor 488 | Biolegend | 137011 | 1:200 |
| human anti mouse-F4/80-APC | miltenyl biotec | 130-102-379 | 1:10 |
| rat anti mouse-F4/80-FITC | Biolegend | 23108 | 1:200 |
| mouse GPR37 | Santa Cruz | SC-390110 | 1:100 or 1:500 |
| rat anti-mouse Ly6G-APCcy7 | Biolegend | 127623 | 1:200 |
| rat anti-mouse Ly6G | Biolegend | 127601 | 1:1000 |
| FACS second or control antibody | | | |
| rat anti-mouse IgG-FITC | eBioscience | 11-4011-85 | 1:200 |
| rat anti-mouse IgG-PE | BD Bioscience | 51-20415z | 1:200 |
| donkey anti-mouse IgG-Cy5 | Jackson ImmunoResearch | 715-175-151 | 1:500 |
| goat anti-rabbit igG-APC-Cy7 | Santa cruz | sc-3847 | 1:200 |

Phagocytosis assay. The phagocytosis assay was modified from a previously described protocol (Sommer C, and Kress M. NeurosciLett. 2004, 361, 184-187). pHrodo® Red Zymosan Bioparticles (diameter, 3 μm, Thermo scientific, Catalog: P35364) were rinsed and reconstituted in RPMI medium. Particles were centrifuged (1 min at 100 g) onto adherent peritoneal macrophages at a ratio of 10:1 to synchronize binding and internalization. After 30 min incubation at 37° C., non-adherent beads were removed with cold PBS and cells were fixed with 2% formalin. Four optic fields were photographed with epifluorescence microscopy. Quantification of zymosan particles ingested by MΦ was conducted on at least 200 macrophages/condition/well, and triplicates were included for statistical analysis.

Behavioral analysis in mice. The following behavioral measurements were conducted in a blinded manner. (1) Spontaneous pain: We measured the time (seconds) mice spent on licking or flinching the affected hindpaws for 5 min after the capsaicin injection (i.pl. 5 µg). (2) Von Frey test for mechanical pain: Animals were habituated to the testing environment daily for at least 2 days before baseline testing. The room temperature and humidity remained stable for all experiments. For testing mechanical sensitivity, we confined mice in boxes placed on an elevated metal mesh floor and stimulated their hindpaws with a series of von Frey hairs with logarithmically increasing stiffness (0.02-2.56 g, Stoelting), presented perpendicularly to the central plantar surface. We determined the 50% paw withdrawal threshold by Dixon's up-down method (Binshtok A M, et al. J. Neurosci. 2008, 28, 14062-14073). (3) Randall-Selitto test: We used Randall-Selitto analgesy-meter (Ugo basile, Italy) to examine mechanical sensitivity by applying ascending pressure to the tail of a mouse and determined the mechanical pain threshold when animal showed a clear sign of discomfort or escape, with a cutoff threshold of 250 g to avoid tissue damage (Serhan C N, et al. Nat. Rev. Immunol. 2008, 8, 349-361). (4) Hargreaves test for thermal pain: Thermal sensitivity was tested using Hargreaves radiant heat apparatus (IITC Life Science), the basal paw withdrawal latency was adjusted to 9-12 s, with a cutoff of 20 s to prevent tissue damage. (5) Hot plate test: Thermal sensitivity was also tested using hot plate (Bioseb in Vivo Research Instrument). The surface temperature of plate was controlled over the range of 50-56° C. Data is expressed as the time (seconds) spent on plate surface until paw withdrawal (Xu Z Z, et al. Nat. Med. 2010, 16, 592-597). (6) Acetone test for cold sensitivity. For testing cold sensitivity, a drop of acetone was applied to the ventral surface of a hind paw and the mouse's response was observed for 30 seconds after acetone application. Responses to acetone were graded according to the following 4-point scale: 0, no response; 1, quick withdrawal or flick of the paw; 2, prolonged withdrawal or flicking; 3, repeated flicking with licking (Sommer C, and Birklein F. Nat. Med. 2010, 16, 518-520). (7) Motor function assessment: A Rota-rod system (IITC Life Science Inc.) was used to assess the motor function. Mice were tested for three trails separated by 10 min intervals. During the tests, the speed of rotation was accelerated from 4 to 40 rpm in 5 min. The falling latency was recorded. (8) Measurement of paw volume: Paw swelling (edema) after zymosan injection was determined by water displacement plethysmometer (Ugo Basile, Italy). The Plethysmometer is a microcontrolled volume meter, specially designed for accurate measurement of the rat/mouse paw swelling. It consists of a water filled Perspex cell into which the paw is dipped. A transducer of original design records small differences in water level, caused by volume displacement. The digital read-out shows the exact volume of the paw (Park C K, et al. J. Neurosci. 2011, 31, 15072-15085).

Statistical analyses. All the data were expressed as mean±s.e.m, as indicated in the figure legends. The sample size for each experiment was based on our previous studies on such experiment (Xu Z Z, et al. Ann. Neurol. 2013). Statistical analyses were completed with Prism GraphPad 6.0. Biochemical and behavioral data were analyzed using two-tailed student's t-test (two groups) or Two-Way ANOVA followed by post-hoc Bonferroni test. The criterion for statistical significance was $P<0.05$.

Example 2

GPR37 is Expressed by Macrophages not Microglia

Immunohistochemistry revealed that GPR37 immunoreactivity (IR) is present in the dermis of hindpaw skins of wild-type mice (FIG. 1A). The specificity of the GPR37 antibody was validated by loss of staining in the skin of Gpr37$^{-/-}$ mice (FIG. 1B). Consistently, in situ hybridization showed that Gpr37 mRNA is co-expressed with GPR37 protein in the dermis (FIG. 9A). Double staining showed that GPR37 was largely co-localized with the MΦ marker CD68 (FIG. 1A). Flow cytometry demonstrated that GPR37 expressed in 30% of F4/80$^+$ MΦ (FIG. 1C and FIG. 1D). Thus, GPR37 is primarily expressed by skin MΦ (sMΦ). We also collected peritoneal Md (pMΦ) for flow cytometry analysis, and the result showed GPR37 expression in 65% pMΦ of WT but the GPR37 signaling was absent in Gpr37$^{-/-}$ mice (FIG. 1D). Interestingly, the number of F4/80$^+$ sMΦ and pMΦ is comparable in WT and Gpr37$^{-/-}$ mice (FIG. 1D), suggesting that GPR37 does not regulate the proliferation of MΦ. Immunocytochemistry in pMΦ showed high levels of co-localization of GPR37 and F4/80 in WT but not Gpr37$^{-/-}$ mice (FIG. 1E). Confocal analysis revealed surface and cytoplasm localization of GPR37 in pMΦ (FIG. 1F). Notably, the surface expression of GPR37 was detected by flow cytometry using a non-cell permeable method (FIG. 1C and FIG. 1D).

Figure 9E:
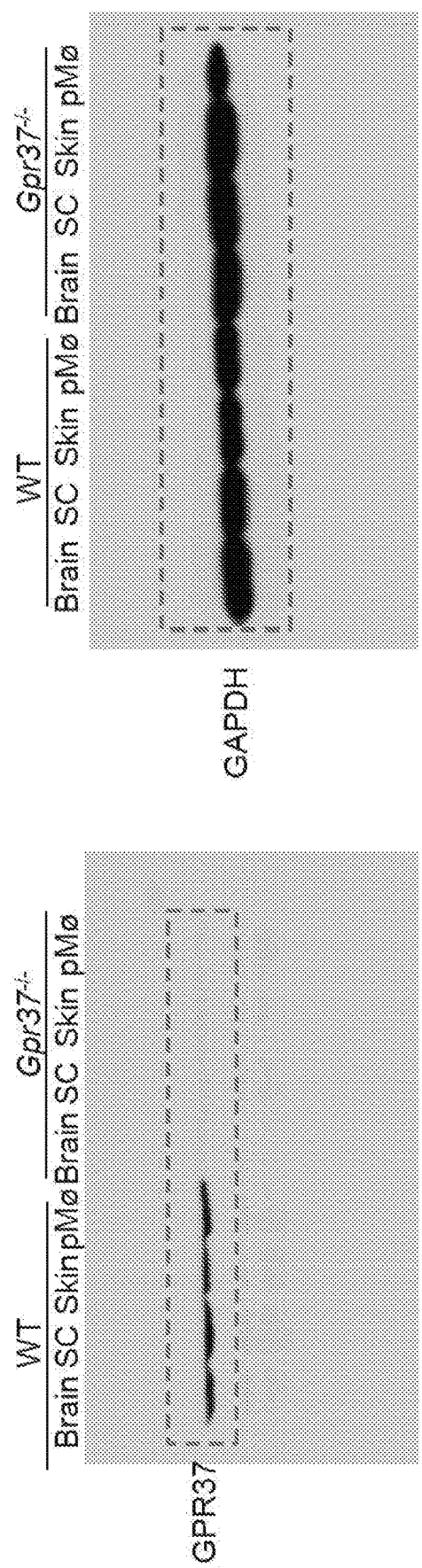

Since GPR37 plays a role in neurological and neuropsychiatric diseases (19), we next examined the GPR37 expression in the peripheral nervous system (dorsal root ganglia, DRG) and the central nervous system (spinal cord and brain). Immunohistochemistry showed GPR37 expression in F4/80$^+$ MΦ in DRG (FIG. 9B). Western blotting detected a single band of GPR37 in brain and spinal cord tissues of WT mice, but this band disappeared in KO mice (FIG. 1G, FIG. 9D, and FIG. 9E). As expected, the GPR37 band was also detected in skin and pMΦ (FIG. 1G and FIG. 9E).

Microglia are MΦ-like cells in the CNS and release proinflammatory cytokines to regulate neuroinflammation and pathological pain. Double staining revealed no co-localization of GPR37 with the microglial marker CX3CR1 in the spinal cord of Cx3cr1-GFP mice (FIG. 1H). We also employed LacZ staining to check for Gpr37 mRNA expression in the spinal cord and brain of Gpr37$^{+/-}$ mice. LacZ-labeled nuclei were primarily found in the white matter of the brain (e.g., corpus callosum, FIG. 1I) and the spinal cord (FIG. 9C and FIG. 9D). We did not see co-localization of Gpr37-expressing nuclei with IBA1, a marker for microglia (FIG. 1I). Collectively, these data suggest that GPR37 is expressed by MΦ but not microglia.

Example 3

NPD1 Induces Intracellular Ca$^{2+}$ Increases in HEK293 Cells and Macrophages Via GPR37

Figure 2A:
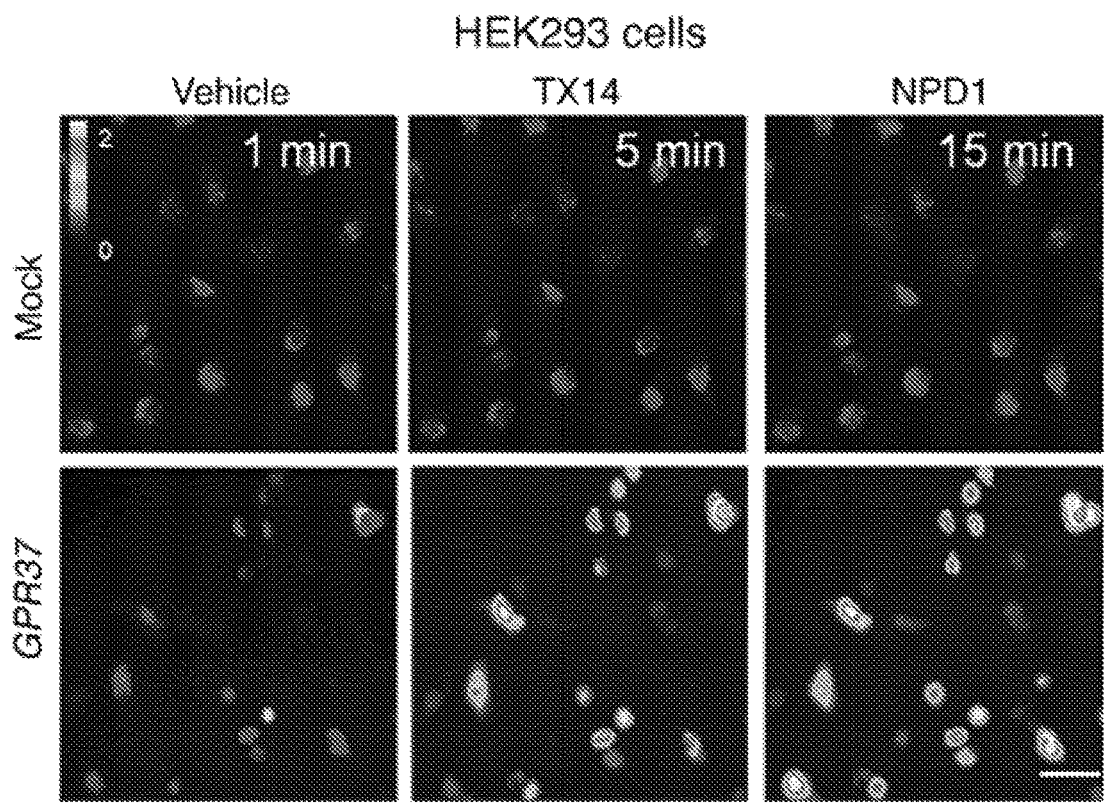
FIG. 2A-2J. NPD1 induces iCa$^{2+}$ increases in HEK293 cells and MΦs via GPR37.
Figure 2B:
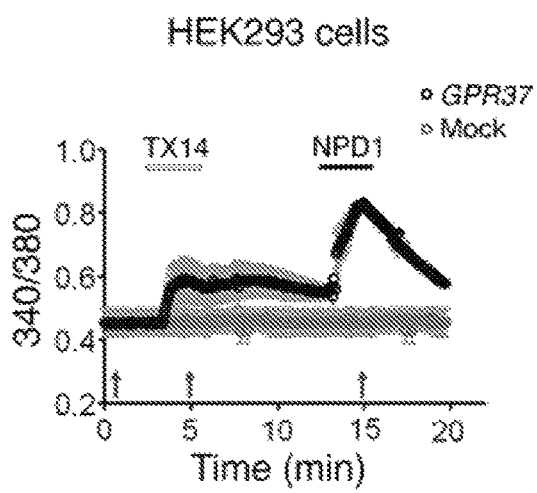
Figure 2C:
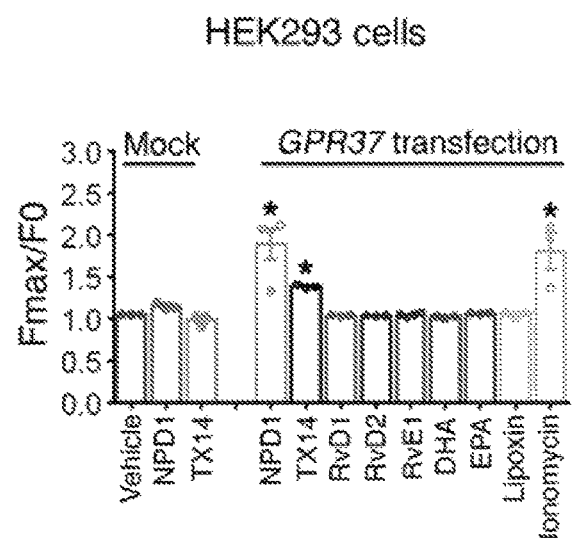
Figure 2D:
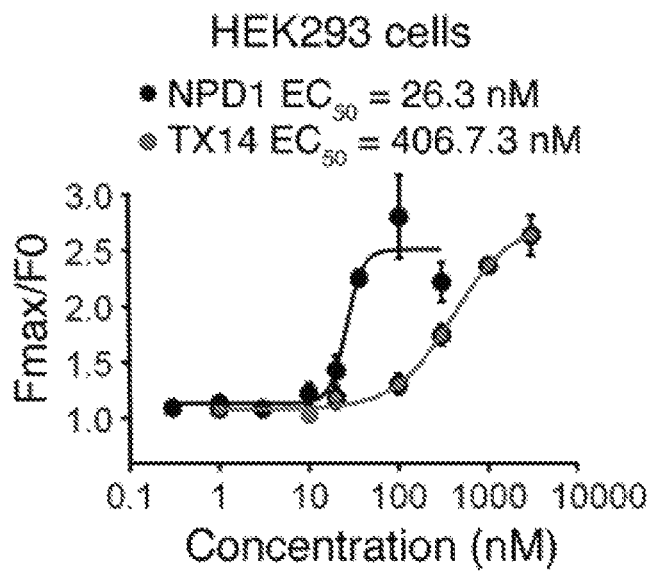
Figure 2E:
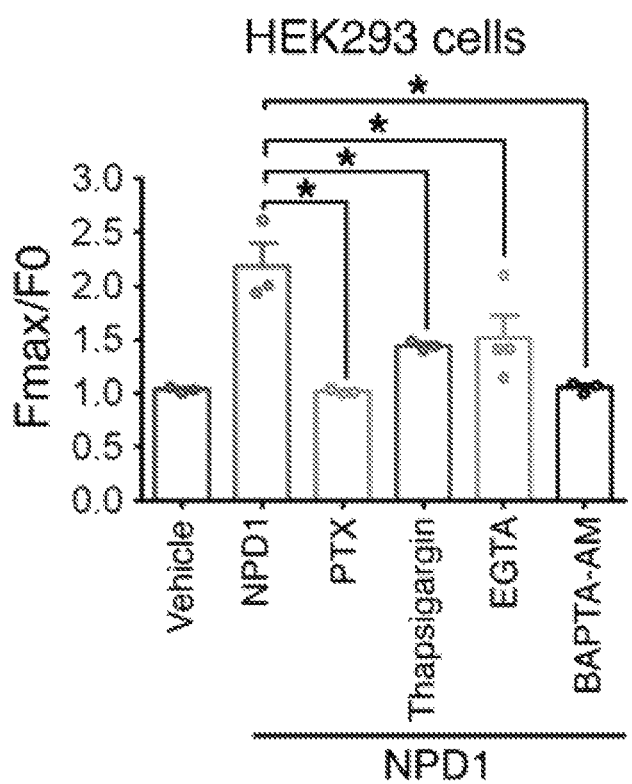

In order to investigate how GPR37 regulates intracellular signaling, we conducted Ca$^{2+}$ imaging in HEK293 cells that overexpress GPR37. Interestingly, prosaposin and prosaposin-derived 14-mer peptide (TX14) are ligands of GPR37 and exhibit neuroprotective and analgesic effects as NPD1. Thus, we hypothesized TX14 and SPM may activate the same receptors and elicit similar intracellular responses. We transfected HEK293 cells with human GPR37 cDNA, loaded these cells with $Ca^{2+}$ dye Fura-2AM, and stimulated them with TX14 and various SPMs, using ionomycin (2 µM) as a positive control for $Ca^{2+}$ influx (FIG. 2A, FIG. 2B, FIG. 2C). TX14 (1 µM) and NPD1 (30 nM) elicited significant increases in intracellular $Ca^{2+}$ ($iCa^{2+}$, P<0.05). Interestingly, other SPMs, such as resolvins (RvE1, RvD1, RvD2) and lipoxin A1, even at a higher concentration (100 nM), failed to increase $iCa^{2+}$ in GPR37-expressing HEK293 cells. Neither did the precursors of these SPMs (DHA and EPA), at a much higher concentration (1 µM), evoked calcium responses (FIG. 2C). Dose response analysis revealed that NPD1 is more potent than TX14 in inducing $iCa^{2+}$ increase in HEK293 cells (FIG. 2D), with a much lower $EC_{50}$ (26 nM for NPD1 vs. 407 nM for TX14). NPD1-induced $iCa^{2+}$ increase was completely blocked by pertussis toxin, indicating the involvement of Gi-mediated GPCR signaling (FIG. 2E). The NPD1-induced $iCa^{2+}$ increase was inhibited by thapsigargin, BAPTA-AM, and EGTA (FIG. 2E), suggesting that both influx of extracellular $Ca^{2+}$ and release from intracellular $Ca^{2+}$ store contribute to $iCa^{2+}$ increase.

Figure 10A:
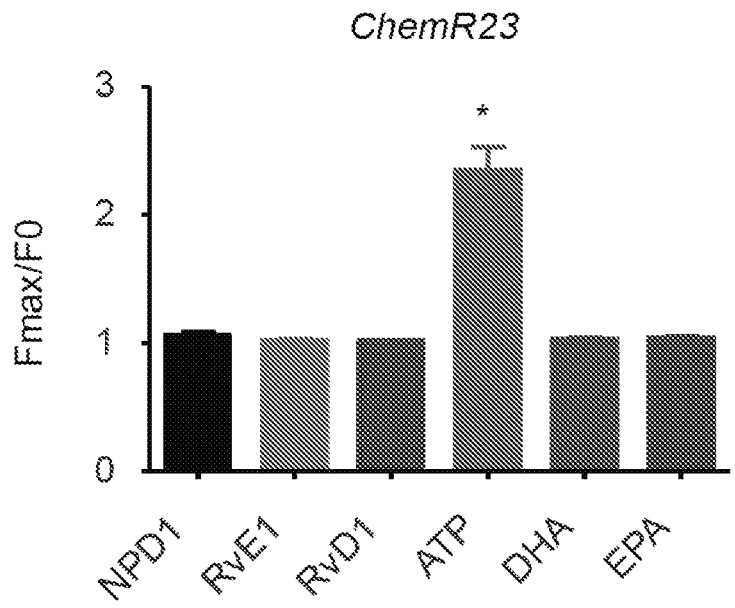
FIG. 10A-FIG. 10C. Characterization of intracellular Ca$^{2+}$ changes in HEK293 cells expressing ChemR23, GPR32, and ALX. Ca$^{2+}$ imaging with Fura-2AM indicator showing iCa$^{2+}$ levels in HEK293 cells transfected with ChemR23 (FIG. 10A), GPR32 (FIG. 10B), and ALX (FIG. 10C) cDNAs. Note that NPD1 fails to elicit iCa$^{2+}$ increase in HEK293 cells expressing ChemR23, GPR32, and ALX. Also, the SPM ligands for ChemR23 (100 nM RvE1), GPR32 (100 nM RvD1), and ALX (100 nM Annexin 1) and their precursors EPA and DHA (1 µM) fail to evoke Ca$^{2+}$ responses. ATP is included as a positive control. *$P<0.05$, compared with baseline n=44~97 cells from 3 cultures. All the data are expressed as mean±s.e.m.
Figure 10B:
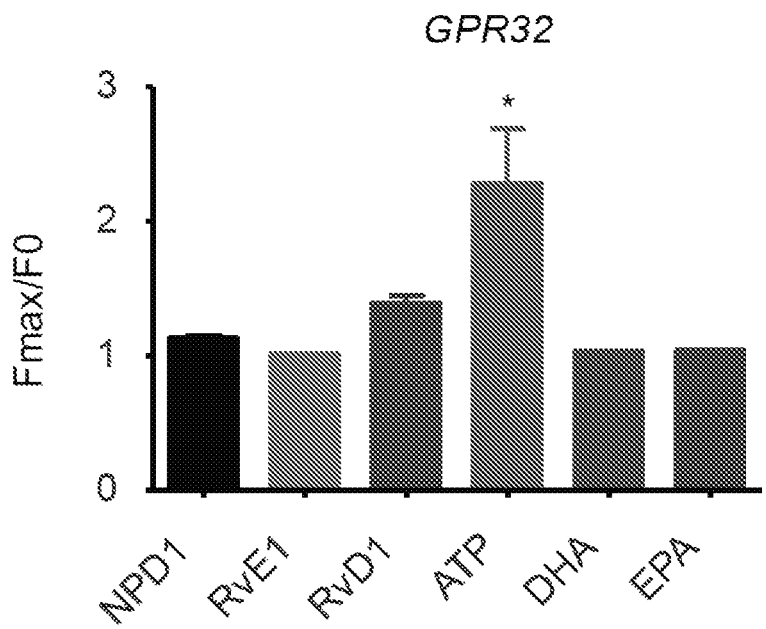
Figure 10C:
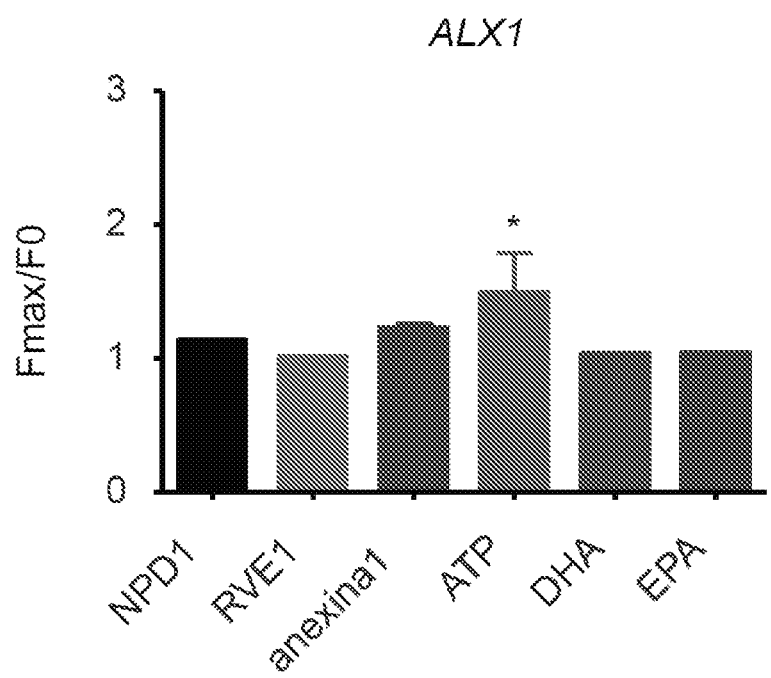

Several SPM receptors have been identified such as ChemR23 for RvE1, GPR32 for RvD1, and ALX for lipoxin A. We transfected human cDNAs of ChemR23, GPR32, and ALX in HEK293 cells and checked $Ca^{2+}$ responses following the treatment of each SPM. Notably, NPD1 failed to elicit $iCa^{2+}$ increase in HEK293 cells expressing CHEMR23, GPR32, and ALX (FIG. 10A, FIG. 10B, FIG. 10C), supporting a specific action of NPD1 on GPR37. RvE1, RvD1, and lipoxin A also failed to evoke $Ca^{2+}$ responses in HEK293 cells that express ChEMR23, GPR32, and ALX, respectively (FIG. 10A, FIG. 10B, FIG. 10C). This result also suggests that compared to other SPMs, $Ca^{2+}$ response is unique to NPD1.

Figure 2J:
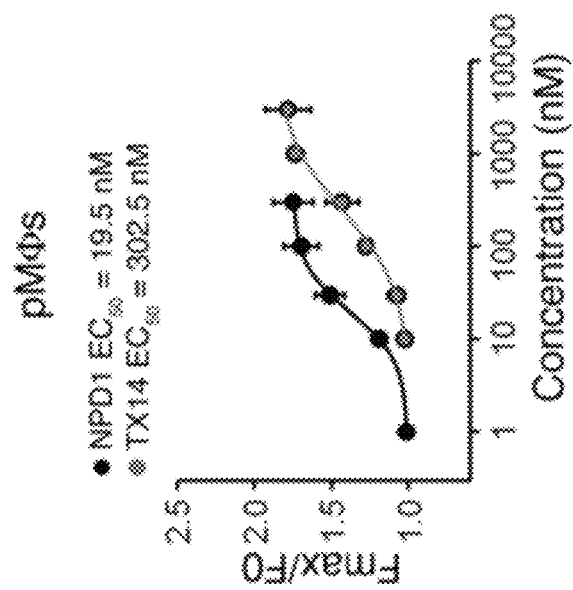
Figure 2I:
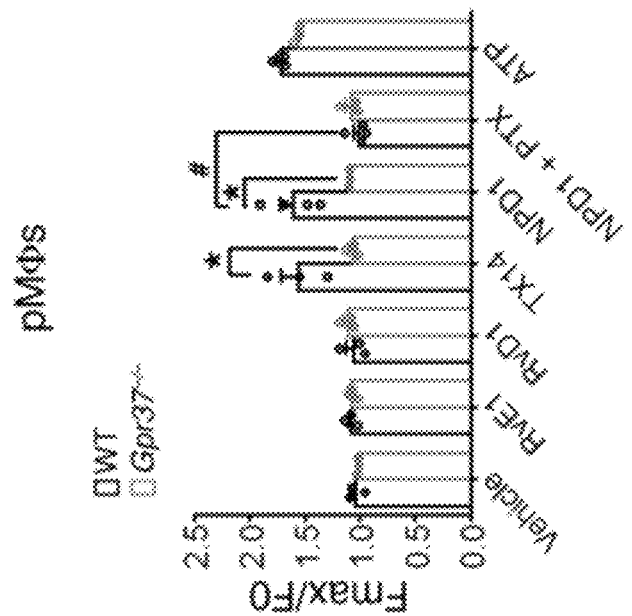

Next, we conducted GPR37-mediated $Ca^{2+}$ imaging in native pMΦ from WT and Gpr37$^{-/-}$ mice using Fluo-4AM as a $Ca^{2+}$ indicator, since this dye works better than Fura-2AM for pMΦ. NPD1 (30 nM) elicited a robust and sustained $iCa^{2+}$ increase in pMΦ, but this increase was abolished in Gpr37-deficient pMΦ (FIG. 2F and FIG. 2G). As compared to $iCa^{2+}$ increase in GPR37-expressing HEK293 cells, NPD1 trigger a slow-onset but more persistent $Ca^{2+}$ response in pMΦ (FIG. 2B and FIG. 2G). A relatively rapid calcium response in HEK293 cells may result from overexpression of GPR37. A sustained $iCa^{2+}$ increase in pMΦ may result from the expression of transient receptor potential (TRP) ion channels in these immune cells. It is noteworthy that macrophages express TRPV2 or TRPM2, which are involved in phagocytosis during bacterial infection. TX14 also elicited GPR37-dependent $iCa^{2+}$ increase in pMΦ (FIG. 2H). As expected, RvD1 and RvE1 (100 nM) did not alter $iCa^{2+}$ levels in pMΦ (FIG. 2H). NPD1-triggered $iCa^{2+}$ increase in pMΦ is also Gi-dependent, since PTX blocked this increase (FIG. 2H). For comparison, ATP-evoked $iCa^{2+}$ increase was not altered in GPR37-deficient pMΦ (FIG. 2H). Dose analysis showed that NPD1 is more potent than TX14 in inducing $iCa^{2+}$ increase in pMΦ: the EC50 value of NPD1 is much lower than that of TX14 (19.5 nM vs. 302.5 nM, FIG. 2I). Together, these data suggest GPR37 serves as a possible receptor for NPD1 and mediates NPD1-elicited $Ca^{2+}$ responses in both heterologous cells and native pMΦ.

To determine whether NPD1 and TX14 bind to GPR37, we conducted dot blot assay by coating the blots with different concentrations of NPD1 and TX14 and included RvE1 as a control. The blots were then incubated with cell lysates from HEK293 cells with GPR37 cDNA or Mock transfection. We found a dose-dependent binding of TX14 and NPD1 but not RvE1 to GPR37-containing lysates, whereas cell lysates form mock transfection (GPR37-negative) did not show binding activities to TX14 and NPD1 (FIG. 2J). Dose-response curve analysis revealed that NPD1 has a higher binding affinity to GPR37 than TX14. As positive controls, we also detected strong binding of RvD1 and RvE1 to GPR32 and CHEM23.

Example 4

NPD1 Increases Macrophage Phagocytosis In Vitro Via GPR37

We investigated whether $iCa^{2+}$ increases would trigger phagocytosis of pathogens such as zymosan by macrophages. Zymosan is a well-studied pathogen and activates TLR2 to trigger inflammation and inflammatory pain in rodents after intraplantar injection. We tested phagocytosis in pMΦ using fluorescence-labeled zymosan particles. NPD1 caused a dose-dependent increase in phagocytic activity; more zymosan particles were observed in pMΦ after the treatment (30 nM for 30 min, FIG. 3A and FIG. 3B). NPD1 further increased the percentage of pMΦ showing the phagocytosis of zymosan particles (FIG. 3B). These NPD1-evoked increases in phagocytic activity were dose dependent in wild-type MΦ and abolished in Gpr37-deficient MΦ (FIG. 3A and FIG. 3B). MΦ phagocytosis was also induced by TX14, RvD1, and RvE1, but only the TX14-induced phagocytosis required Gpr37 (FIG. 3C). The basal phagocytic activity did not change in pMΦ of Gpr37 KO mice (FIG. 3C).

We further explored the intracellular signaling mechanisms underlying phagocytosis in pMΦ. NPD1-induced phagocytosis, as well as baseline phagocytosis, was blocked by BAPTA-AM, supporting a critical involvement of $iCa^{2+}$ (FIG. 3D). By contrast, ionomycin (2 µM) markedly increased phagocytosis in both WT and Gpr37 KO mice (FIG. 3C), suggesting that $iCa^{2+}$ is sufficient for triggering phagocytosis. NPD1-induced phagocytosis was also inhibited by the Gi blocker PTX, the ERK pathway inhibitor U0126, and the PI3K/AKT pathway inhibitor LY294002 (FIG. 3D). Collectively, our results suggest that NPD1 induces phagocytosis of pMΦ via GPR37, $iCa^{2+}$, and the PI3K/AKT and ERK signaling pathways.

Example 5

GPR37 Regulates Macrophage Phagocytosis In Vivo in Inflamed Hindpaw Skin

Figure 4H:
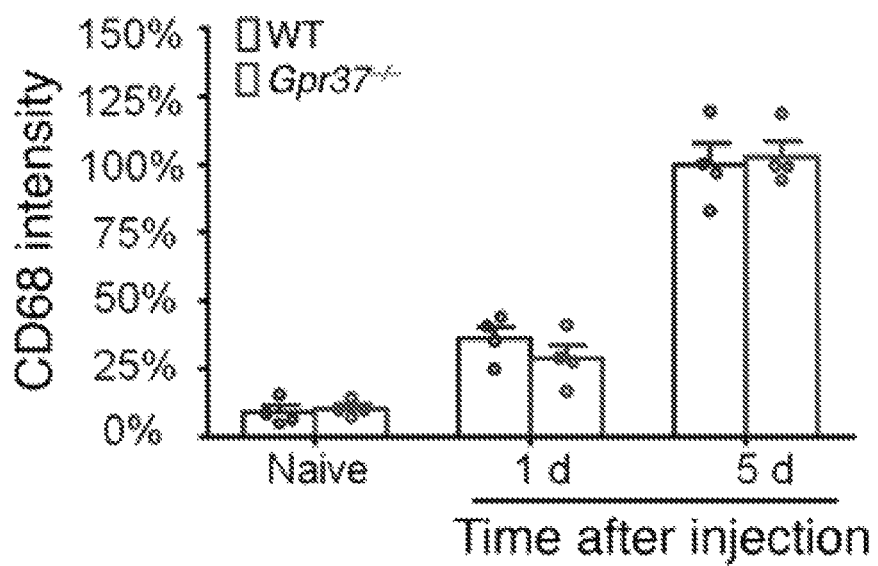
Figure 4I:
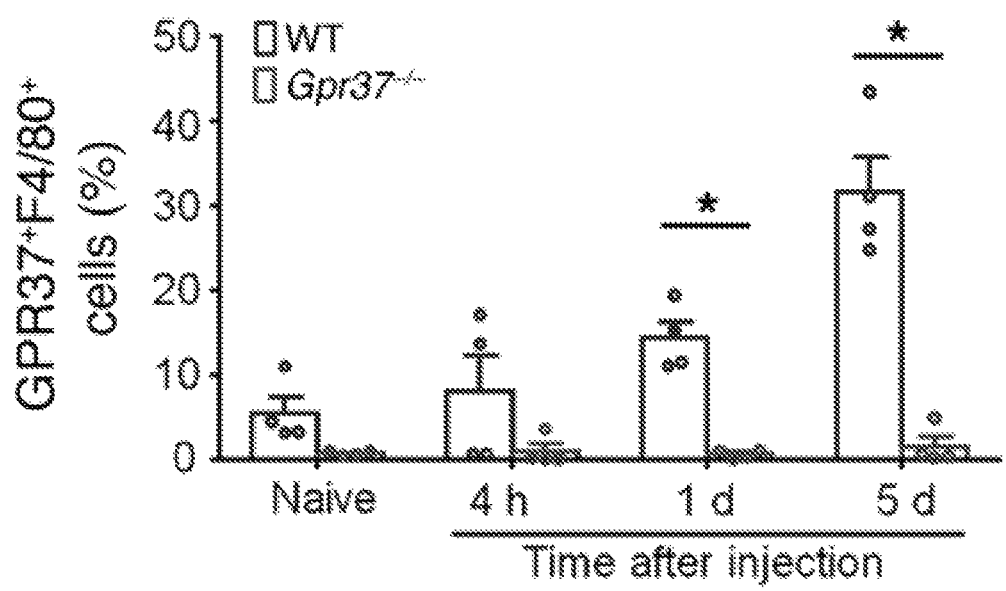
Figure 11A:
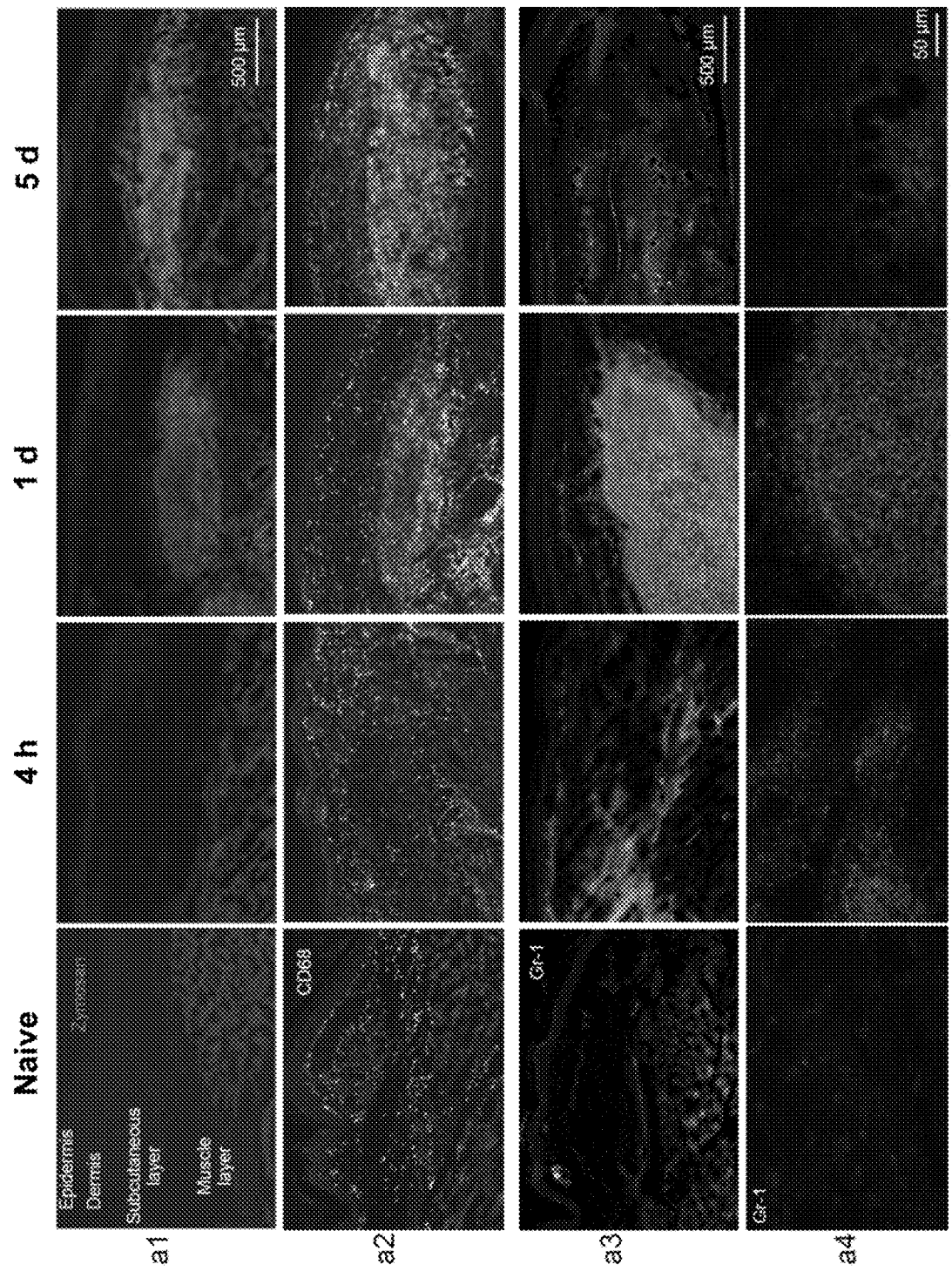
FIG. 11A-FIG. 11B. Characterization of phagocytized zymosan particles, neutrophils, macrophages, and GPR37 expression in non-inflamed and inflamed hindpaw skin of WT mice.
Figure 11B:
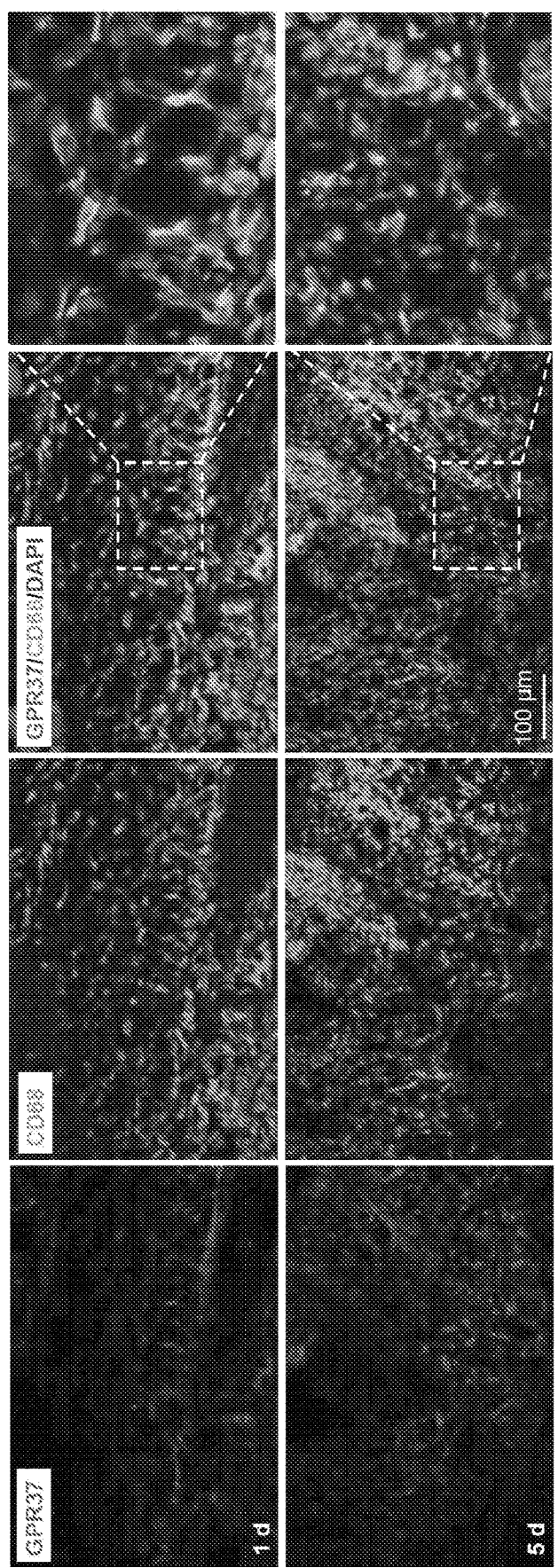
Figure 12C:
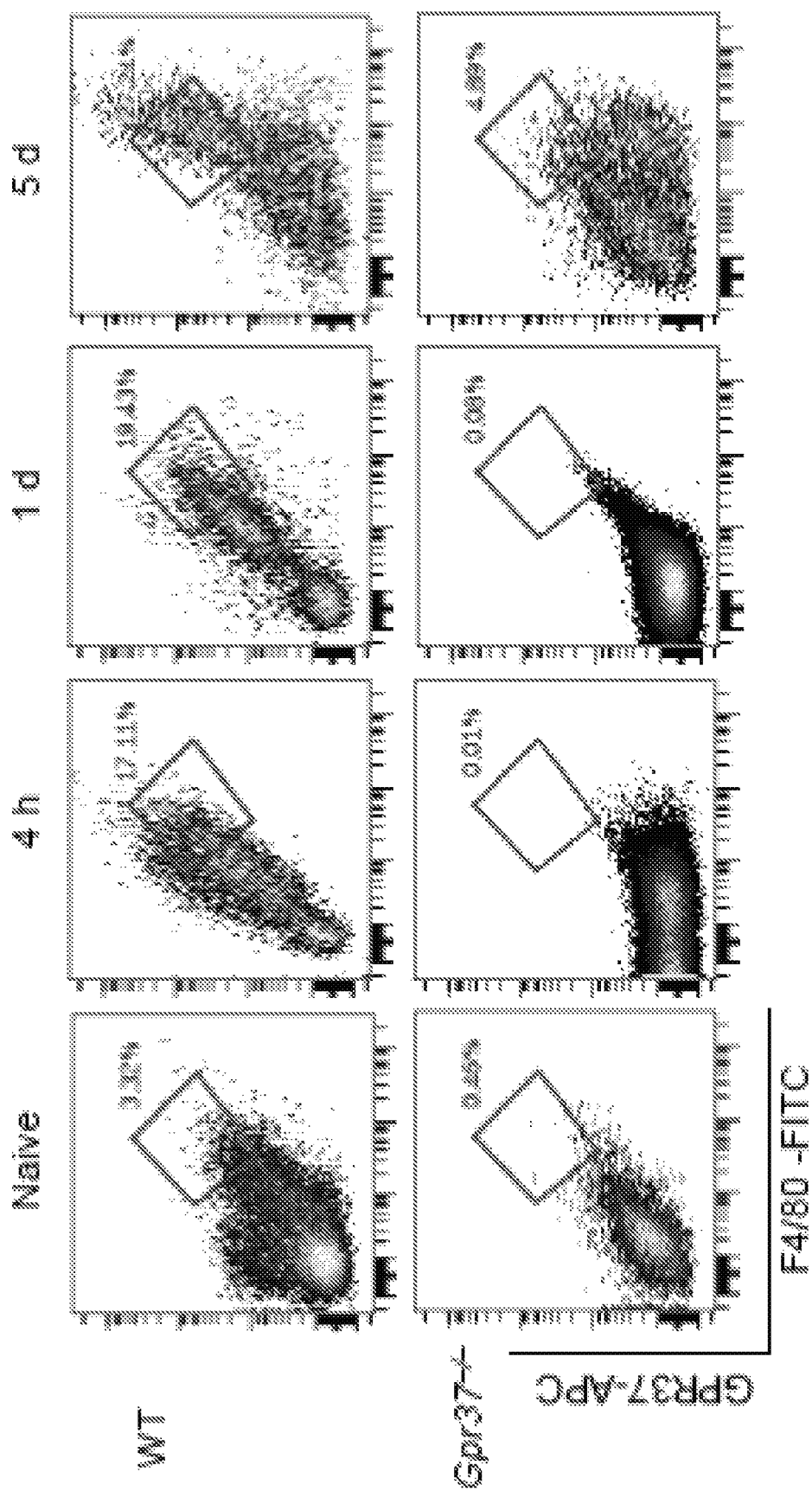
Figure 12D:
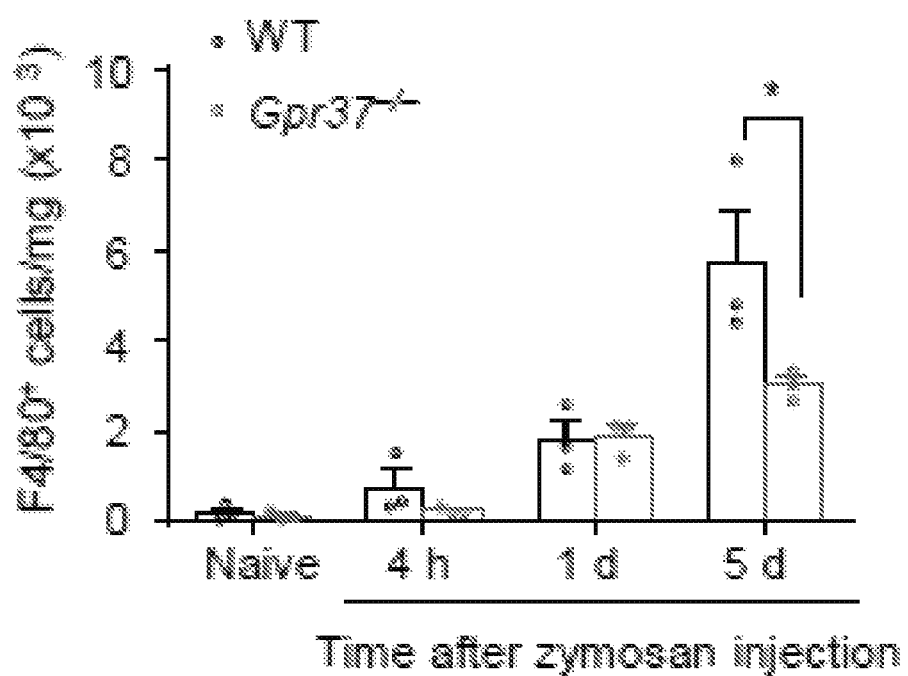

We took advantage of pHrodo® Red dye-conjugated zymosan, which shows red fluorescence after phagocytosis, due to lower pH values in intracellular compartments such as phagosomes (pH=5-6, FIG. 4A). Using the zymosan model, we compared the time course of edema, infiltration of immune cells (neutrophils and macrophages), and phagocytosis of zymosan particles and neutrophils by macrophages following intraplantar injection of labeled zymosan (20 µg/20 µL) in a hind paw (FIG. 4B). Zymosan produced rapid edema, as indicated by an increase in hindpaw volume. This edema was evident at 2 h, peaked at 4 h, declined but maintained on day 1, and recovered on day 8 (FIG. 4A, FIG. 4B, FIG. 4C). Immunohistochemistry revealed a sequential infiltration of immune cells, first neutrophils (Gr-1$^+$), then MΦ (CD68$^+$) in the inflamed hindpaw skins (FIG. 4D). Gr-1-immunoreactivity (IR) began to increase at 4 h, peaked at 24 h, and declined on day 2 (FIG. 4D and FIG. 11A). CD68-IR showed a delayed but sustained increase in inflamed paw: it began on day 1, peaked on day 5, declined but remained elevated on day 8 and 21 (FIG. 4D and FIG. 11A). The time courses of zymosan phagocytosis and GPR37-IR were very similar to that of CD68-IR in sMΦ, peaking on day 5 (FIG. 4D, FIG. 4E, FIG. 11A). Double immunostaining demonstrated that 1) GPR37 was expressed in CD68⁺ MΦ (FIG. 11B) and 2) phagocytized zymosan particles predominantly localized in sMΦ expressing GPR37 in the inflamed paws of wild-type mice (FIG. 4F). Phagocytized zymosan levels in the inflamed hindpaw skin were markedly reduced in Gpr37 KO mice (FIG. 4G and FIG. 12A). As compared with wild-type mice, KO mice did not show any changes in the intensity of CD68-IR in the skin of naïve mice and inflamed mice at 1 d and 5 d (FIG. 4H and FIG. 12B), but showed a partial reduction in F4/80⁺ sMΦ in the inflamed skins at 5 d (FIG. 12C). Thus, lack of GPR37 has limited impact on the general population of macrophages during the induction phase of inflammation. Notably, there was a delayed increase of GPR37⁺sMΦ in the inflamed paw in WT mic, with a peak on day 5 (FIG. 4I, FIG. 12D). This result suggests a role of GPR37-expressing sMΦ in the resolution of inflammation.

In addition to pathogens, phagocytic activity against apoptotic neutrophils is a factor for the resolution of inflammation. In agreement with immunohistochemical analysis, FACS study confirmed a time-dependent change in neutrophil number after zymosan injection: the number of skin neutrophils peaked on day 1 but returned to baseline on day 5 in WT mice, suggesting an elimination of neutrophils during the resolution phase (FIG. 13A). Compared with WT mice, neutrophil number in the inflamed skin of Gpr37$^{-/-}$ mice was unaltered ($P>0.05$, FIG. 13A). Importantly, the phagocytic activity of sMΦ against neutrophils was substantially reduced in Gpr37$^{-/-}$ mice compared with WT mice (FIG. 13B).

Histochemical examination also showed sMΦ engulfing Gr-1-labelled neutrophils in the inflamed skin of WT mice (FIG. 13C). Taken together, these findings indicate 1) zymosam induces distinct time courses in edema, neutrophil infiltration, and MΦ infiltration in the inflamed skin and 2) GPR37 plays an essential role in MΦ phagocytosis of pathogens (zymosan-particles) and apoptotic neutrophils in the inflamed skin.

Example 6

GPR37 Regulates Distinct Expression of Pro- and Anti-Inflammatory Cytokines in MΦ

MΦ may exhibit different phenotypes such as resting phenotype (M0), pro-inflammatory phenotypes (M1-like), and anti-inflammatory/pro-resolution phenotypes (M2-like) (34). These phenotypes are characterized by distinct expression of pro-inflammatory cytokines (e.g., IL-1β) and anti-inflammatory cytokines (IL-10, TGF-β). Zymosan increased both//1b mRNA levels and IL-1β protein levels in the inflamed skins of WT mice, but these increases were greater in Gpr37 KO mice (FIG. 5A and FIG. 5B). Zymosan also increased the expression of the anti-inflammatory cytokines IL-10 and TGF-β at both mRNA and protein levels in inflamed skin. Notably, these increases were impaired in the KO mice, especially in the resolution phase of inflammation at 5 d (FIG. 5C, FIG. 5D, FIG. 5E, FIG. 5F). In pMΦ cultures, NPD1 suppressed IL-1β levels but increased IL-10 and TGF-β levels following zymosan treatment; and these effects of NPD1 required GPR37 (FIG. 14A, FIG. 14B, FIG. 14C). Therefore, GPR37 regulates MΦ phenotypes by suppressing the expression of pro-inflammatory cytokines (IL-1β) and increasing the expression of anti-inflammatory cytokines (IL-10 and TGF-β) in the inflamed skins and zymosan-activated macrophages.

Example 7

GPR37 and Macrophages Contribute to the Resolution of Inflammatory Pain

We investigated whether zymosan-induced inflammatory pain would be altered in Gpr37/mice by examining a time course of inflammatory pain from 2 h to 28 d (FIG. 6A). Intraplantar zymosan elicited rapid (<2 h) inflammatory pain in WT mice, as characterized by heat hyperalgesia, a reduction in paw withdrawal latency to radiant heat stimulation, and mechanical allodynia, a reduction in paw withdrawal threshold to von Frey hair stimulation. Mechanical allodynia was more persistent than heat hyperalgesia in WT mice, resolving at day 5 and day 2, respectively (FIG. 6A and FIG. 6B). Compared with WT mice, zymosan-induced heat hyperalgesia and mechanical allodynia was prolonged in Gpr37$^{-/-}$ mice. The duration of heat hyperalgesia was prolonged from 2 d in WT mice to 8 d in KO mice (FIG. 6B). Especially, the duration of mechanical allodynia was prolonged from 5 d in WT mice to more than 28 d in KO mice. Indeed, mechanical allodynia failed to resolve in Gpr37$^{-/-}$ mice at day 28 (FIG. 6B). IL-1β is a key pro-inflammatory cytokine and critically involved in inflammatory pain. Intraplantar IL-1β injection induced heat hyperalgesia and mechanical allodynia in WT mice, but both pain symptoms were prolonged in Gpr37$^{-/-}$ mice (FIG. 6C).

Figure 6G:
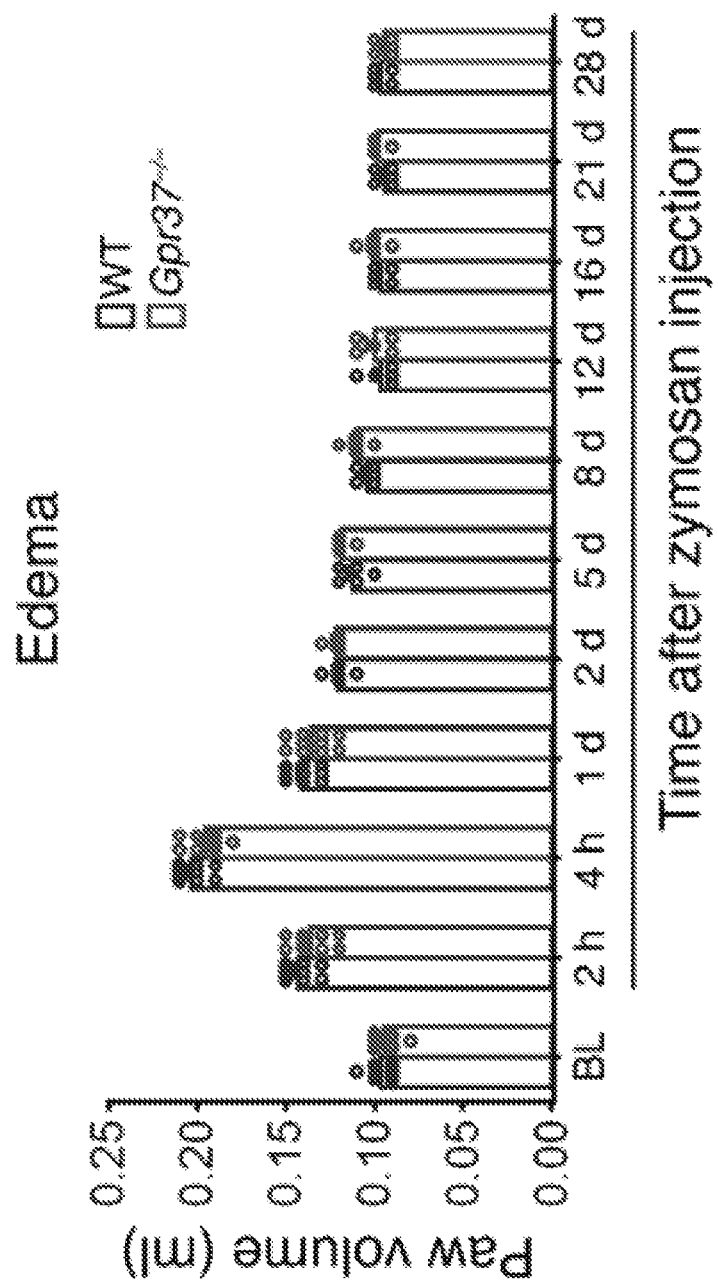

We also compared baseline pain sensitivity in WT and KO mice, by assessing heat sensitivity in Hargreaves and hot plate tests, mechanical sensitivity in von Frey, Randall-Selitto, and pinprick tests, and cold sensitivity in acetone test. We did not observe any change in these sensory tests in Gpr37$^{-/-}$ mice without tissue injury and inflammation (FIG. 6B and FIG. 6D). It is suggested that the neural pathways of normal pain perception are intact in KO mice. Neither did KO mice display impairment in motor function in Rotarod test (FIG. 6E). Compared with WT mice, Gpr37 KO mice exhibited a normal development of the sensory system and showed no loss of DRG sensory neurons and their peripheral and central innervations (FIG. 15A, FIG. 15B, FIG. 15C, FIG. 15D). WT and KO mice also showed comparable acute inflammatory pain induced by intraplantar injection of capsaicin, a highly potent pain inducer (FIG. 6F). Furthermore, the onset and early development of inflammatory pain, in the first several hours, were unaltered in the zymosan and IL-1β models (FIG. 6B and FIG. 6C). Zymosan induced identical edema (paw swelling) in WT and KO mice (FIG. 6G). Notably, the edema was associated with the induction phase of inflammatory pain, peaking in 4 h and resolving in 2 d in both WT and KO mice (FIG. 6G). Therefore, GPR37 regulates the resolution phase but not the induction phase of inflammatory pain.

Given an importantly role of GPR37 in MΦ signaling, we examined the specific contribution of MΦ to zymosan-induced inflammatory pain using both loss-of-function (macrophage toxin) and gain-of-function (cell adoptive transfer) approaches. Depletion of MΦ via systemic injection of a MΦ toxin clodronate (Van Rooijen N, and Sanders A. *Journal of Immunological Methods* 1994, 174, 83-93), given 2 and 48 hours before the zymosan injection, largely reduced the number of MΦ in the inflamed skin (FIG. 7A, FIG. 16A). In contrast, the number of neutrophils was not affected by the toxin (FIG. 16B). Importantly, this MΦ depletion recapitulated the pain phenotypes observed in Gpr37$^{-/-}$ mice: the resolution but not the induction of inflammatory pain (heat hyperalgesia and mechanical allodynia) was impaired by clodronate (FIG. 7B). To determine if MΦ are sufficient for the resolution of inflammatory pain, we conducted adoptive transfer of MΦ in WT and Gpr37-KO mice, 1 d after zymosan injection. Strikingly, the deficits in inflammatory pain resolution in KO mice were rescued by the transplantation of WT MΦ: no differences were found in the recovery of heat hyperalgesia and mechanical allodynia between WT and KO mice (FIG. 7C and FIG. 7D). As expected, adoptive transfer of Gpr37-deficient MΦ from KO mice failed to resolve inflammatory pain deficit in KO mice (FIG. 7E). Collectively, our data suggest that GPR37 in MΦ critically contribute to the resolution of inflammatory pain.

IL-10 was implicated in the protecting and resolving neuropathic pain. To define a role of IL-10 in the resolution of zymosan-induced inflammatory pain, we administered anti-IL-10 neutralizing antibody or control IgG one day after the induction of inflammation (FIG. 8A). Compared to control IgG, the neutralizing antibody impaired the resolution of heat hyperalgesia and mechanical allodynia (FIG. 8B).

Figure 8D:
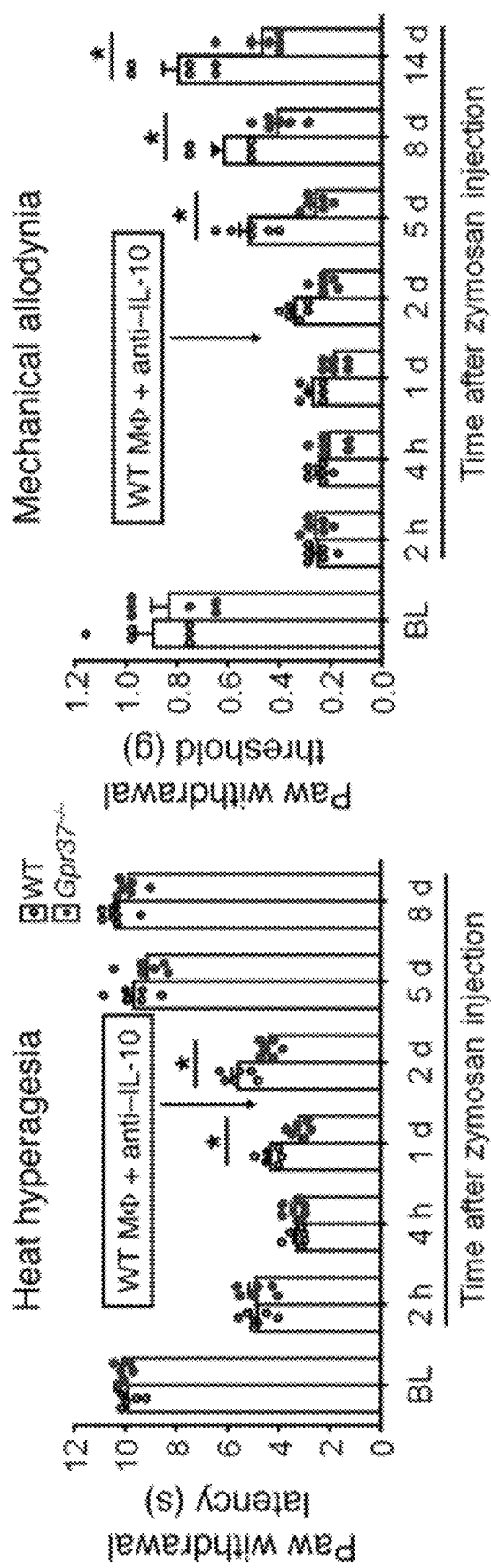

Finally, we investigated whether MΦ resolve inflammatory pain via releasing IL-10. To this end, we blocked IL-10 from MΦ by intraplantar co-administration of WT MΦ and the anti-IL-10 antibody into WT and KO mice (FIG. 8C). As shown FIG. 7D, we demonstrated that transplantation of WT MΦ into Gpr37-deficient mice could promote the resolution of inflammatory pain. However, the pro-resolving effect of WT MΦ was compromised by the co-administration of the anti-IL-10 antibody (FIG. 8D). This result suggests that WT MΦ may contribute to the resolution of inflammatory pain in KO mice via IL-10 secretion.

The foregoing description of the specific aspects will so fully reveal the general nature of the invention that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

All publications, patents, patent applications, and/or other documents cited in this application are incorporated by reference in their entirety for all purposes to the same extent as if each individual publication, patent, patent application, and/or other document were individually indicated to be incorporated by reference for all purposes.

For reasons of completeness, various aspects of the invention are set out in the following numbered clauses:

Clause 1. A method of treating a disease or disorder in a subject in need thereof, the method comprising administering to the subject a therapeutically effective amount of a GPR37 agonist, wherein the disease or disorder is selected from inflammation, inflammatory pain, chronic pain, viral infection, bacterial infection, malaria, sepsis, or a combination thereof.

Clause 2. The method of clause 1, wherein the phagocytosis of macrophages is increased.

Clause 3. A method of reducing the duration of inflammation in a subject in need thereof, the method comprising administering to the subject a therapeutically effective amount of a GPR37 agonist.

Clause 4. The method of clause 3, wherein the duration of inflammation in the subject is decreased by at least 25%.

Clause 5. The method of clause 3 or 4, wherein the phagocytosis of macrophages is increased.

Clause 6. A method of increasing phagocytosis of macrophages in a subject in need thereof, the method comprising administering to the subject a therapeutically effective amount of a GPR37 agonist.

Clause 7. The method of any one of clauses 2, 5, or 6, wherein the phagocytosis of macrophages in the peripheral nervous system is increased.

Clause 8. The method of clause 7, wherein the phagocytosis of macrophages is increased in at least one of dorsal root ganglia, skin, blood, or peritoneal space, or a combination thereof.

Clause 9. The method of any one of clauses 2, 5, or 6, wherein the phagocytosis of macrophages in the central nervous system is increased.

Clause 10. The method of any one of the above clauses, wherein the GPR37 agonist comprises a polynucleotide, polypeptide, small molecule, carbohydrate, lipid, or a combination thereof.

Clause 11. The method of any one of the above clauses, wherein the GPR37 agonist is selected from NPD1, TX-14, artisunate, apigenin, honokiol, any derivatives, esters, or salts thereof, or a combination thereof.

Clause 12. The method of any one of the above clauses, wherein intracellular calcium influx is increased.

Clause 13. The method of any one of the above clauses, wherein expression of pro-inflammatory cytokines in macrophages is decreased.

Clause 14. The method of clause 13, wherein the pro-inflammatory cytokines include at least one of IL-1β, IL-6, TNF, or CXCL1, or a combination thereof.

Clause 15. The method of any one of the above clauses, wherein expression of anti-inflammatory cytokines in macrophages is increased.

Clause 16. The method of clause 15, wherein the anti-inflammatory cytokines comprise at least one of IL-10, TGF-β, or a combination thereof.

Clause 17. A pharmaceutical composition comprising a GPR37 agonist.

Clause 18. The composition of clause 17, further comprising a carrier for oral, intranasal, intravaginal, transdermal, intravenous, intraarterial, intratumoral, intraperitoneal, or topical administration.

Clause 19. The composition of any one of clauses 17-18, wherein the GPR37 agonist comprises a polynucleotide, polypeptide, small molecule, carbohydrate, lipid, or a combination thereof.

Clause 20. The composition of any one of clauses 17-18, wherein the GPR37 agonist is selected from NPD1, TX-14, artisunate, apigenin, honokiol, any derivatives, esters, or salts thereof, or a combination thereof.

| SEQUENCES |
|---|

GPR37 polypeptide, human, 613 amino acids, Accession No. EAL24325
SEQ ID NO: 1

MRAPGALLAR MSRLLLLLLL KVSASSALGV APASRNETCL GESCAPTVIQ

RRGRDAWGPG NSARDVLRAR APREEQGAAF LAGPSWDLPA APGRDPAAGR

GAEASAAGPP GPPTRPPGPW RWKGARGQEP SETLGRGNPT ALQLFLQISE

EEEKGPRGAG ISGRSQEQSV KTVPGASDLF YWPRRAGKLQ GSHHKPLSKT

ANGLAGHEGW TIALPGRALA QNGSIGEGIH EPGGPRRGNS TNRRVRLKNP

FYPLTQESYG AYAVMCLSVV IFGTGIIGNL AVMCIVCHNY YMRSISNSLL

ANLAFWDFLI IFFCLPLVIF HELTKKWLLE DESCKIVPYI EVASLGVTTE

TLCALCIDRE RAATNVQMYY EMIENCSSTT AKLAVIWVGA LILALPEVVL

RQLSKEDLGF SGRAPAERCI IKISPDLPDT IYVLALTYDS ARLWWYFGCY

FCLPTLFTIT CSLVTARKIR KAEKACTRGN KRQIQLESQM NCTVVALTIL

YGFCIIPENI CNIVTAYMAT GVSQQTMDLL NIISQFLLFF KSCVTPVLLE

CLCKPFSRAF MECCCCCCEE CIQKSSTVTS DDNDNEYTTE LELSPESTIR

REMSTFASVG THC

GPR37 polynucleotide, human, 5614 bp, Accession No. NM_005302
SEQ ID NO: 2 ggctccgcgc ctccgccctt gttccctccc agctcctccg agtggaagcc gctacaaatg gcttgaatga aacgtgtgtg ggtttagtga gtggtgaacc accaggggat cccgtctccc cacaaaccag tatctctccg aggaggaggc gaaggagtgg gaggaggcaa cgagccgaga gtcgagcttc gcgggcgcgc gcagcggctg gagcgcgggg gcgaggccgg gccacctccc cttcccggcc gcgcactgcc tggcccgcgg cggttccagg caccaccctt cccgtccggg ctgagcccgc tgtggcagtg actagctccc gcggctagcg gcactgtcca ccgacgagcg gcgccctctt ctcccccttc tccccacgat ttccttctct gcggcggcac gccgtccagc agcctgcttc gccccgtcgt caactttgag ctggaggaga agcaactttg gcagtggccg cggggttgga atcccgcttc tcctcggcag cagtaggctc gcaagtcgct ggggttaggt ggggcaagag tttcgccggc gcatcagcgc tgcttcggac tgtttgcaac gtgtttccag cgagctggga gcggggttgt gactgcgagt cgtctggggg aggggggactt gttttttcttt tcctctagag acctcggctt gcaactggat caaacgctgt cgaaaggatg taaataggca gagcaactgt taccaagaag gccaccaccc ccacccaaag gcagtgagga gtgtggggct tcgtctgggc tcccccgagt ctcaacagta atcaacagtc aggtgttgat tgcaactttt caaggtcagc caccgggagt agcctattcc ctctaggaac cttggagggc ataccttgct gggactcaac ttggctgaga aatgcacaag atgccaaagg aggaaggatt ataggggggcg tgtgtgtgac ccccaagacc gatcttccgc tatcacccta atctccggtt ccccgctacc cgggcggggg tgagtatgtg acatgtgcct aactctcagc agcaacttcg gcagcaggtg tcgatcctaa ctaagcagga gctgcggctg ccgggtgtgc cctcaccaag ccatgcgagc cccgggcgcg cttctcgccc gcatgtcgcg gctactgctt ctgctactgc tcaaggtgtc tgcctcttct gccctcgggg tcgcccctgc gtccagaaac gaaacttgtc -continued

| SEQUENCES |
|---|

```
tgggggagag ctgtgcacct acagtgatcc agcgccgcgg cagggacgcc tggggaccgg gaaattctgc aagagacgtt ctgcgagccc gagcacccag ggaggagcag ggggcagcgt ttcttgcggg accctcctgg gacctgccgg cggccccggg ccgtgacccg gctgcaggca gaggggcgga ggcgtcggca gccgaccccc cgggacctcc aaccaggcca cctggcccct ggaggtggaa aggtgctcgg ggtcaggagc cttctgaaac tttggggaga gggaacccca cggcccctcca gctcttcctt cagatctcag aggaggaaga gaagggtccc agaggcgctg gcatttccgg gcgtagccag gagcagagtg tgaagacagt ccccggagcc agcgatcttt tttactggcc aaggagagcc gggaaactcc agggttccca ccacaagccc ctgtccaaga cggccaatgg actggcgggg cacgaagggt ggacaattgc actcccgggc cgggcgctgg cccagaatgg atccttgggt gaaggaatcc atgagcctgg gggtccccgc cggggaaaca gcacgaaccg gcgtgtgaga ctgaagaacc ccttctaccc gctgacccag gagtcctatg gagcctacgc ggtcatgtgt ctgtccgtgg tgatcttcgg gaccggcatc attggcaacc tggcggtgat gtgcatcgtg tgccacaact actacatgcg gagcatctcc aactccctct ggccaacct ggccttctgg gactttctca tcatcttctt ctgccttccg ctggtcatct tccacgagct gaccaagaag tggctgctgg aggacttctc ctgcaagatc gtgccctata tagaggtcgc ttctctggga gtcaccactt tcaccttatg tgctctgtgc atagaccgct tccgtgctgc caccaacgta cagatgtact acgaaatgat cgaaaactgt tcctcaacaa ctgccaaact tgctgttata tgggtgggag ctctattgtt agcacttcca gaagttgttc tccgccagct gagcaaggag gatttggggt ttagtggccg agctccggca gaaaggtgca ttattaagat ctctcctgat ttaccagaca ccatctatgt tctagccctc acctacgaca gtgcgagact gtggtggtat tttggctgtt acttttgttt gcccacgctt ttcaccatca cctgctctct agtgactgcg aggaaaatcc gcaaagcaga gaaagcctgt acccgaggga ataaacggca gattcaacta gagagtcaga tgaactgtac agtagtggca ctgaccattt tatatggatt ttgcattatt cctgaaaata tctgcaacat tgttactgcc tacatggcta caggggtttc acagcagaca atggacctcc ttaatatcat cagccagttc cttttgttct ttaagtcctg tgtcacccca gtcctccttt tctgtctctg caaacccttc agtcgggcct tcatggagtg ctgctgctgt tgctgtgagg aatgcattca gaagtcttca acggtgacca gtgatgacaa tgacaacgag tacaccacgg aactcgaact ctcgcctttc agtaccatac gccgtgaaat gtccactttt gcttctgtcg gaactcattg ctgaaggaca gtacttggtt gggtcagatt tatttgtttg attttcatat cccgtgaaag tttttaattc atattttcc ttatagggaa aaatgcaaaa aagaaacaat aaagaaagaa atattaacta ctgtagaact gattttacaa attaatattt gtgctttgaa aaaaagtttc
```

-continued

| SEQUENCES |
|---|
| tatttagtta tttaagaaga atgagaaggc caatagtttt agattatttt |
| atctggtatg gtgctaatat tttatttgaa aaaagttact gcaacttaac |
| ttaaaattgc taacgttttt tcttctttta aaaatacaat tattgtatat |
| tgattatagc aatgtgattt tgtaggttat tttatatttg agttgtgatt |
| gaaagtatgt tgtatatggt attgtgagat gatttgtact tggaagcatt |
| cacaaagtag caccaaataa attcactttt attctttaat gtcattgtca |
| atctactttt aaccaatatt caataaatct tctaattgcc ttaaagatac |
| aattactggt tctatgcaca atttaaaacc ggccttactg ttttataacg |
| tattttcttt taaggcaggt aatcattatg ttataaagaa gttttctaa |
| tagcagtatt ttatatgcat gattcataaa actatgttgt atgttaaaac |
| aaagctgtat ttttaatatt caggtataga tgtcaaatta cttctgaata |
| cttataaaat atgaataaat agcagagtag gaagaaagtt tctttttaa |
| aaaattcacc tctgaactag cacatagagc tacagattt cccttgggga |
| attatgggca gaatcaagaa ttttaaaatg cagttgtcat ctgatttcct |
| ctgaacactg acctttgaag ctttgtgaat cctacgtaaa gcactctgag |
| ttctaatttt tctccttttg aaaaataaac ttgatgaaat ctatacaact |
| taatttcttt aagtgcaatg aaagtatagg agtggaataa taaaatattt |
| atatatttt attagaacat tctaccttta acttgatact tcataaactc |
| tgaataaaaa aacctaacct cctccattgg gaatatttga atccctctt |
| ttgcctcttc tggagtttaa aatgcagcag ttgtgtagga tgcttgctgt |
| gtgggacaca tgtctaactc aggtggcaga gaccatgacc tagtgacaca |
| gtgatattta aaagctacca aagaagatgt gtagttggat gtctttgtct |
| tcagaaaaat cttgttatag agaacccagt tttcttgctg ggaaaacgta |
| gtttctgctt gttgatttct gttctactcg gcataagtaa gtcagtattc |
| ctttttccaa attataacat gatgttattt aaaaatcatt aaagagattg |
| gtgcaggtga aacttaaatg gcagtgccca ggctatctcc ttttcccag |
| tccaatactt ttcaaagggg ttttccctc cattgtgtgt attctgtggg |
| atctgcagga gaattcaaac aaggtgccct tgtcttcttg tagatccctg |
| taataggtct ttggaaaatt tctcaagagg acacctgagc taggttttgg |
| ctgctgagca gaacagcaac tgtgattcca tagtgtctct cctgatattt |
| agtcacttta taaatcaagg aacaattgag catgtcatgt ggaaaagatt |
| ctatcctatt acctgagtaa ctaaaggtaa ataggtcaca gcctcagacc |
| ttacagaatc aggcagggat gacatggatg ggaaggaata aaataaatac |
| atagacaact atgatataag ctggggcttg ttaggtgcct caggaagatg |
| tgaagttctg cgatactttg gaatagaggg aatgcttata gggttagaag |
| agagcatgaa aggctttatg agataactgg atgagtgggc ttttagaagg |
| agctgatgaa agatggtgtg aggagtggac acttcaggag gagagagcta |
| atttataaag gaatagaaga agaaatcagt gggtgtgatt gaagaataaa |
| cagcccagtt tgacttctgt gctacgtgtg catagcagcc ttgtgggaaa |

-continued

SEQUENCES tattaaagaa aatatgcacc aaggccatct aataatagga ccatgttttg aaagatgttt acatggtggt gcttcaggaa atggggcttt gcttttaagg tttttgagta tggagaaata gtatcccagc tctgcaatag gaagatcaac ttgcaaacag tttaaatagg ctggtagggg acagtctgat catgaaaaag caactaggaa gctattataa gagattgaac cacaatggag gcagcaggaa cttaaatttc ttttttcatt tatacttgcc tttcaactt ttgtagttgc aacatgtact ttcttattga atcctacctc tgtcaaagtg gaaactttga taactcaaat tgtcccaagt ataaagtgat ttcaaagttt tctcatagtc gtcttgtgtt tttcacaaaa accaatttct ataatatact tttaaaaaat tgttaatcat ttctgttcaa catttcttca gtctggatct tatccaatgt cttacgctcc tcgt

| TX14, polypeptide, human, 14 amino acids | SEQ ID NO: 3 |
|---|---|
| TALIDNNATEEILY | |
| Gapdh Forward PCR Primer | SEQ ID NO: 4 |
| aggtcggtgtgaacggatttg | |
| Gapdh Reverse PCR Primer | SEQ ID NO: 5 |
| ggggtcgttgatggcaaca | |
| Il-1β Forward PCR Primer | SEQ ID NO: 6 |
| ttgtggctgtggagaagctgt | |
| Il-1β Reverse PCR Primer | SEQ ID NO: 7 |
| aacgtcacacaccagcaggtt | |
| Tgf-β Forward PCR Primer | SEQ ID NO: 8 |
| tggagcaacatgtggaactc | |
| Tgf-β Reverse PCR Primer | SEQ ID NO: 9 |
| cagcagccggttaccaag | |
| Il-10 Forward PCR Primer | SEQ ID NO: 10 |
| tgtcaaattcattcatggcct | |
| Il-10 Reverse PCR Primer | SEQ ID NO: 11 |
| atcgatttctcccctgtgaa | |
| Gpr37 Forward PCR Primer | SEQ ID NO: 12 |
| gatctttgggaccggcatta | |
| Gpr37 Reverse PCR Primer | SEQ ID NO: 13 |
| ggaggcagaagaagatgatgag | |

The invention claimed is:

1. A method of treating a disease or disorder in a subject in need thereof, the method comprising administering to the subject a therapeutically effective amount of a GPR37 agonist, wherein the GPR37 agonist is NPD1,
   wherein the GPR37 agonist is administered to the subject intravenously;
   wherein the disease or disorder is inflammatory pain, chronic pain, or a combination thereof;
   wherein the therapeutically effective amount of the GPR37 agonist is from about 6 µg/kg to about 10 µg/kg, and
   wherein macrophage-mediated phagocytosis is increased in the subject.

2. The method of claim 1, wherein the macrophage-mediated phagocytosis in the peripheral nervous system is increased.

3. The method of claim 2, wherein the macrophage-mediated phagocytosis is increased in at least one of dorsal root ganglia, skin, blood, or peritoneal space, or a combination thereof.

4. The method of claim 1, wherein the macrophage-mediated phagocytosis in the central nervous system is increased.

5. The method of claim 1, wherein intracellular calcium influx is increased.

6. The method of claim 1, wherein expression of pro-inflammatory cytokines in macrophages is decreased.

7. The method of claim 6, wherein the pro-inflammatory cytokines include at least one of IL-1β, IL-6, TNF, or CXCL1, or a combination thereof.

8. The method of claim 1, wherein expression of anti-inflammatory cytokines in macrophages is increased.

9. The method of claim 8, wherein the anti-inflammatory cytokines comprise at least one of IL-10, TGF-β, or a combination thereof.

10. The method of claim 1, wherein the subject has inflammation and the duration of the inflammation in the subject is decreased.

11. The method of claim 10, wherein the duration of inflammation in the subject is decreased by at least 25%.

* * * * *